United States Patent
Ponasik et al.

(10) Patent No.: US 12,446,576 B2
(45) Date of Patent: Oct. 21, 2025

(54) AGROCHEMICAL FORMULATION CONTAINING A SULFOPOLYMER

(71) Applicant: Eastman Chemical Company, Kingsport, TN (US)

(72) Inventors: James Allen Ponasik, Kingsport, TN (US); Ana Margarida dos Santos, Aalst (BE); Michiel Van den Hende, Ertvelde (BE); Nico De Pauw, Zaffelare (BE); Joseph Alexander DeLoach, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 612 days.

(21) Appl. No.: 17/753,841

(22) PCT Filed: Sep. 15, 2020

(86) PCT No.: PCT/US2020/050799
§ 371 (c)(1),
(2) Date: Mar. 16, 2022

(87) PCT Pub. No.: WO2021/055307
PCT Pub. Date: Mar. 25, 2021

(65) Prior Publication Data
US 2022/0338466 A1    Oct. 27, 2022

Related U.S. Application Data

(60) Provisional application No. 62/900,744, filed on Sep. 16, 2019, provisional application No. 62/900,739, filed on Sep. 16, 2019.

(51) Int. Cl.
*A01N 25/04*    (2006.01)
*A01N 25/24*    (2006.01)
(Continued)

(52) U.S. Cl.
CPC ............ *A01N 25/04* (2013.01); *A01N 25/24* (2013.01); *A01N 31/08* (2013.01); *A01N 47/26* (2013.01); *A01P 3/00* (2021.08)

(58) Field of Classification Search
None
See application file for complete search history.

(56) References Cited

U.S. PATENT DOCUMENTS 3,018,272 A    1/1962  Griffin et al.
3,528,947 A    9/1970  Lappin et al.
(Continued)

FOREIGN PATENT DOCUMENTS

CA    2106780 A1    9/1992
CN    101 712 754 A    5/2010
(Continued)

OTHER PUBLICATIONS

Co-pending U.S. Appl. No. 17/753,783, filed Mar. 15, 2022; Ponasik et al.
(Continued)

*Primary Examiner* — Dominic Lazaro
(74) *Attorney, Agent, or Firm* — Polly C. Owen; Steven A. Owen

(57) ABSTRACT

The present disclosure describes agrochemical formulations that include optionally a rosin, one or more agrochemical active ingredient(s), and a sulfopolymer, such as a sulfopolyester. The present disclosure also describes methods of making and using such formulations in agriculture.

9 Claims, 12 Drawing Sheets

(51) Int. Cl.
*A01N 31/08* (2006.01)
*A01N 47/26* (2006.01)
*A01P 3/00* (2006.01)

(56) References Cited

U.S. PATENT DOCUMENTS

| | | | |
|---|---|---|---|
| 3,779,993 | A | 12/1973 | Kibler et al. |
| 4,304,901 | A | 12/1981 | O'Neill et al. |
| 4,719,009 | A | 1/1988 | Furey et al. |
| 4,818,536 | A | 4/1989 | Meyers et al. |
| 5,187,011 | A | 2/1993 | Manalastas et al. |
| 5,435,821 | A | 7/1995 | Duvdevani et al. |
| 5,543,488 | A | 8/1996 | Miller et al. |
| 5,674,514 | A | 10/1997 | Hasslin |
| 5,710,101 | A | 1/1998 | Carstairs et al. |
| 6,039,966 | A | 3/2000 | Kostka et al. |
| 6,162,890 | A | 12/2000 | George et al. |
| 6,255,366 | B1 | 7/2001 | Adams et al. |
| 6,916,481 | B1 | 7/2005 | Prud'Homme et al. |
| 8,752,328 | B2 | 6/2014 | Kaiser et al. |
| 9,668,472 | B2 | 6/2017 | Meredith et al. |
| 2004/0048749 | A1 | 3/2004 | Zerrer et al. |
| 2006/0058438 | A1 | 3/2006 | Williams et al. |
| 2006/0166898 | A1 | 7/2006 | Chen |
| 2007/0244216 | A1 | 10/2007 | Stern |
| 2007/0264216 | A1 | 11/2007 | McEntire |
| 2007/0275191 | A1 | 11/2007 | Halahmi |
| 2008/0092776 | A1 | 4/2008 | Stockl et al. |
| 2009/0120182 | A1 | 5/2009 | Reeves |
| 2009/0163449 | A1* | 6/2009 | Wempe .................. A61K 8/85 514/159 |
| 2011/0218108 | A1 | 9/2011 | Brasher et al. |
| 2012/0045497 | A1 | 2/2012 | Fowler et al. |
| 2012/0329655 | A1 | 12/2012 | Baseeth et al. |
| 2013/0123104 | A1* | 5/2013 | McKnight ............... A01N 25/04 504/362 |
| 2013/0244878 | A1 | 9/2013 | Goyal et al. |
| 2014/0018240 | A1* | 1/2014 | Crosby .................. A01N 37/40 504/206 |
| 2014/0357789 | A1 | 12/2014 | George et al. |
| 2015/0196023 | A1 | 7/2015 | Rodrigues et al. |
| 2016/0015033 | A1 | 1/2016 | Kramer et al. |
| 2018/0028415 | A1 | 2/2018 | Ehrman |
| 2018/0228146 | A1 | 8/2018 | Kumar et al. |
| 2022/0386593 | A1 | 12/2022 | Ponasik et al. |

FOREIGN PATENT DOCUMENTS

| | | |
|---|---|---|
| CN | 107 410 296 A | 12/2017 |
| CN | 109 627 960 A | 4/2019 |
| CN | 109 942 777 A | 6/2019 |
| DE | 10 2016 206831 A1 | 11/2016 |
| EP | 0 360 663 A1 | 3/1990 |
| EP | 0445603 A1 | 2/1991 |
| EP | 1 064 844 A1 | 1/2001 |
| EP | 1 774 853 A1 | 4/2007 |
| EP | 3248465 A1 | 5/2016 |
| EP | 3 260 437 A1 | 12/2017 |
| EP | 3 310 165 B1 | 9/2019 |
| FR | 2 791 906 A1 | 10/2000 |
| JP | 2005 002198 A | 1/2005 |
| KR | 2014 0045542 A | 4/2014 |
| WO | WO 87/06575 A1 | 11/1987 |
| WO | WO 89/03638 A1 | 5/1989 |
| WO | WO 89/03811 A1 | 5/1989 |
| WO | WO 92/17423 A1 | 10/1992 |
| WO | WO 97/23281 A1 | 7/1997 |
| WO | WO 2001 094002 A2 | 12/2001 |
| WO | WO 2002 043489 A1 | 6/2002 |
| WO | WO 2003 075659 A1 | 9/2003 |
| WO | WO 2005 065379 A2 | 7/2005 |
| WO | WO 2006 013972 A1 | 2/2006 |
| WO | WO 2006/028680 A1 | 3/2006 |
| WO | WO 2006 079079 A1 | 7/2006 |
| WO | WO 2006/116817 A1 | 11/2006 |
| WO | WO 2007 141182 A2 | 12/2007 |
| WO | WO 2008/002623 A1 | 1/2008 |
| WO | WO 2008/076807 A2 | 6/2008 |
| WO | WO 2009/120182 A2 | 10/2009 |
| WO | WO 2010/121976 A2 | 10/2010 |
| WO | WO 2012/177832 A1 | 12/2012 |
| WO | WO 2013/012556 A1 | 1/2013 |
| WO | WO 2015 031521 A1 | 3/2015 |
| WO | WO 2016/118699 A1 | 7/2016 |

OTHER PUBLICATIONS

Co-pending U.S. Appl. No. 17/753,785, filed Mar. 15, 2022; Ponasik et al.
Co-pending U.S. Appl. No. 17/753,787, filed Mar. 15, 2022; Ponasik et al.
Co-pending U.S. Appl. No. 17/753,790, filed Mar. 15, 2022; Ponasik et al.
Co-pending U.S. Appl. No. 17/753,829, filed Mar. 16, 2022; Ponasik et al.
Co-pending U.S. Appl. No. 17/753,795, filed Mar. 15, 2022; Ponasik et al.
Co-pending U.S. Appl. No. 17/753,814, filed Mar. 15, 2022; Ponasik et al.
Co-pending U.S. Appl. No. 17/753,830, filed Mar. 16, 2022; Ponasik et al.
Co-pending U.S. Appl. No. 17/753,839, filed Mar. 16, 2022; Ponasik et al.
Co-pending U.S. Appl. No. 17/753,847, filed Mar. 16, 2022; Ponasik et al.
Co-pending U.S. Appl. No. 17/753,845, filed Mar. 16, 2022; Ponasik et al.
Griffin, William C.; Classification of Surface-Active Agents by "HLB"; Journal of the Society of Cosmetic Chemists, 1(5), 1949, pp. 311-326.
Notification of Transmittal of The International Search Report and The Written Opinion of the International Searching Authority, or the Declaration with a Date of Mailing Dec. 29, 2020 received in International Application No. PCT/US2020/050792.
Notification of Transmittal of The International Search Report and The Written Opinion of the International Searching Authority, or the Declaration with a Date of Mailing Dec. 29, 2020 received in International Application No. PCT/US2020/050793.
Notification of Transmittal of The International Search Report and The Written Opinion of the International Searching Authority, or the Declaration with a Date of Mailing Dec. 24, 2020 received in International Application No. PCT/US2020/050805.
Notification of Transmittal of The International Search Report and The Written Opinion of the International Searching Authority, or the Declaration with a Date of Mailing Dec. 24, 2020 received in International Application No. PCT/US2020/050808.
Notification of Transmittal of The International Search Report and The Written Opinion of the International Searching Authority, or the Declaration with a Date of Mailing Dec. 24, 2020 received in International Application No. PCT/US2020/050811.
Notification of Transmittal of The International Search Report and The Written Opinion of the International Searching Authority, or the Declaration with a Date of Mailing Dec. 24, 2020 received in International Application No. PCT/US2020/050814.
Notification of Transmittal of The International Search Report and The Written Opinion of the International Searching Authority, or the Declaration with a Date of Mailing Dec. 24, 2020 received in International Application No. PCT/US2020/050818.
Notification of Transmittal of The International Search Report and The Written Opinion of the International Searching Authority, or the Declaration with a Date of Mailing Dec. 23, 2020 received in International Application No. PCT/US2020/050797.
Notification of Transmittal of The International Search Report and The Written Opinion of the International Searching Authority, or the Declaration with a Date of Mailing Dec. 24, 2020 received in International Application No. PCT/US2020/050800.
Notification of Transmittal of The International Search Report and The Written Opinion of the International Searching Authority, or the

(56) References Cited

OTHER PUBLICATIONS

Declaration with a Date of Mailing Dec. 24, 2020 received in International Application No. PCT/US2020/050799.
Notification of Transmittal of The International Search Report and The Written Opinion of the International Searching Authority, or the Declaration with a Date of Mailing Dec. 2, 2020 received in International Application No. PCT/US2020/050803.
Notification of Transmittal of The International Search Report and The Written Opinion of the International Searching Authority, or the Declaration with a Date of Mailing Dec. 24, 2020 received in International Application No. PCT/US2020/050822.
Lewis, R. W. et al., "Polymeric drift control adjuvants for agricultural spraying"; Macromolecular Chemistry and Physics, 2016. vol. 217, pp. 2223-2242.
Haas, Stefan, et al.; "Influence of polymeric surfactants on pesticidal suspension concentrates: dispersing ability, milling efficiency and stabilization power"; Colloids and Surface A: Physicochemical and Engineering Aspects 183-185 (2001) 785-793.
Wise, John; "Rainfast characteristics of insecticides on fruit" Michigan State University Extension, Department of Entomology—Jun. 18, 2019 https://www.canr.msu.edu/news/rainforest_characteristics_of_insecticides_on_fruit.
Fishel, Frederick M.; "Pesticide Formulations"; IFAS Extension, University of Florida, Jun. 2010; http://edis.ifas.edu/pdffiles/PI/PI23100.pdf.
Water Resources; "Map of Water Hardness in the United States"; 1975; www.usgs.gov/media/images/map-water-hardness-united-states.
"5-Sulfoisophthalic acid sodium salt" Product Sheet. Accessed online on Sep. 7, 2024 at https://www.sigmaaldrich.com/US/en/product/aldrick/142794, 2024.
Non-Final Office Communication notification date Sep. 10, 2024 received in U.S. Appl. No. 17/753,790.
Non-Final Office Communication notification date Sep. 16, 2024 received in U.S. Appl. No. 17/753,829.
Requirement for Restriction/Election received in U.S. Appl. No. 17/753,845 notification date Oct. 28, 2024.
Pohanish, R., "Sittig's Handbook of Pesticides and Agricultural Chemicals" (Second Edition), William Andrew Publishing, 2014, pp. 1-2, 33-35, 69-71, 96-99, 136-140, 640-642, 2015.
Ziram Factsheet from Extoxnet (downloaded Sep. 13, 2024 from extoxnet.orst.edu/pips/ziram.htm), 1996.
Requirement for Restriction/Election received in U.S. Appl. No. 17/753,783 notification date Feb. 13, 2025.
Non-Final Office Communication notification date Mar. 7, 2025 received in U.S. Appl. No. 17/753,839.

\* cited by examiner

Example SC1 (1% Dilution)

Example SC3 (1% Dilution)

Example SC2 (1% Dilution)

Example SC4 (1% Dilution)

Example SC1 (10% Dilution)

Example SC3 (10% Dilution)

Example SC2 (10% Dilution)

Example SC4 (10% Dilution)

AGROCHEMICAL FORMULATION CONTAINING A SULFOPOLYMER

CROSS-REFERENCE TO RELATED APPLICATION(S)

This application is a national stage filing under 35 USC § 371 of International Application Number PCT/US2020/050799, filed on, Sep. 15, 2020 which claims the benefit of the filing date to U.S. Provisional Application Nos. 62/900,739 and 62/900,744, both filed on Sep. 16, 2019, the entire disclosures of which are incorporated by reference herein.

FIELD OF THE DISCLOSURE

The current disclosure relates to agricultural formulations comprising a sulfopolymer, such as a sulfopolyester, and optionally a rosin. More specifically, the disclosure relates to suspension formulations and compositions that include a sulfopolymer and optionally a rosin, as well as methods of their use.

BACKGROUND OF THE DISCLOSURE

While there are a number of adjuvants and surfactants used in the agriculture industry, continuing regulatory changes and increasing complexity of the formulations demand development of new adjuvants. Additionally, the development of new active compounds and combinations of active compounds has resulted in very difficult formulation challenges. Simplifying compositions while increasing the feasible active ingredient loading are seen as important for any future adjuvant developments. Improving the stability of agriculture chemical formulations at high loadings is a continuing need for the industry.

Existing adjuvants were designed to perform specific functions, such as wetting, spreading, sticking, reducing evaporation, reducing volatilization, buffering, emulsifying, dispersing, reducing spray drift, or reducing foaming. Many adjuvants do not perform multiple functions, and in such cases, compatible adjuvants can in some circumstances be combined to perform multiple functions simultaneously.

Since most existing adjuvants were designed to perform a specific function, end users of such adjuvants are often required to buy, store, and formulate with several different adjuvants which is expensive and time consuming. Specific adjuvants also often require different formulation protocols. Incompatible mixtures of adjuvants can lead to formulation instability. Based on considerations as outlined above there exists still a clear commercial and industrial need to develop adjuvants that are by themselves capable of performing multiple functions in the agricultural industry.

As the agricultural industry is shifting more to blends of active ingredients, due to the high cost and lengthy process of getting a new active ingredient registered, the complexity of the formulations continues to increase. It is not unusual for two active ingredients to require different adjuvant packages, which in combination could be incompatible, resulting in crystallization, gelation, or some other form of formulation failure. It would be advantageous to have an adjuvant with functionality and effectiveness across a broad range of formulation types.

SUMMARY OF THE DISCLOSURE

This Summary is provided to introduce a selection of concepts, in a simplified form, that are further described below in the Detailed Description. This Summary is not intended to identify all key features or essential features of the claimed subject matter, nor is it intended to be used alone as an aid in determining the scope of the claimed subject matter.

Sulfopolymers are described herein as able to perform exceptionally well as adjuvants in a variety of agricultural chemical formulations. More particularly, sulfopolyesters are demonstrated to provide a wide array of adjuvant functions to agricultural chemical formulations.

Provided herein are agricultural compositions that contain at least one sulfopolymer that provides a stable formulation for the agricultural industry. While polymeric surfactants and ionic surfactants are known, it is surprising how well the herein-described sulfopolymers, in particular sulfopolyesters such as sulfopolyesters comprising a sulfoisophthalate moiety derived, for example, from sodiosulfoisophthalic acid (5-SSIPA) or esters or amides thereof, when used as agricultural adjuvants, provide stable formulations for diverse agricultural chemicals (agrochemicals). In one embodiment, or in combination with any of the mentioned embodiments, the agricultural compositions can further comprise a rosin.

The current disclosure provides in a first embodiment, or in combination with any of the mentioned embodiments, an agrochemical formulation, including: at least one agrochemical active ingredient, a sulfopolymer that has not been lyophilized. In one embodiment, or in combination with any of the mentioned embodiments, the agricultural formulation can further comprise a rosin.

Another embodiment, or in combination with any of the mentioned embodiments, is an agrochemical concentrate formulation, including: at least one agrochemical active ingredient, a sulfopolymer that has not been lyophilized. In one embodiment, or in combination with any of the mentioned embodiments, the formulation can further comprise a rosin.

Also provided is an agrochemical concentrate formulation including: 5 wt % to 90 wt % agrochemical active ingredient or a mixture of two or more agrochemical active ingredients, and up to 15 wt % of a sulfopolymer that has not been lyophilized. In one embodiment, or in combination with any of the mentioned embodiments, the formulation can further comprise a 0.1 wt % to 10 wt % of a rosin.

Another embodiment, or in combination with any of the mentioned embodiments, is an agrochemical concentrate formulation including: at least one agrochemical active ingredient; and no more than 15 wt % sulfopolymer that has not been lyophilized; which formulation is characterized by one or more of: dispersibility and/or reliable re-dispersibility of the active ingredient(s); high active ingredient loading capacity; and/or increased stability of the formulation. In one embodiment, or in combination with any of the mentioned embodiments, the formulation can further comprise a rosin.

Also described are as-applied agrochemical compositions including the formulation of any one of the above embodiments, diluted in water.

Additional embodiments, or in combination with any of the mentioned embodiments, include use of a sulfopolyester that has not been lyophilized to stabilize an agriculturally active agent in a formulation; use of a sulfopolyester that has not been lyophilized to homogenously disperse an agriculturally active agent in a formulation; and use of a sulfopolyester that has not been lyophilized as a surfactant adjuvant in an agrochemical formulation including an agriculturally active ingredient. In one embodiment, or in combination with any of the mentioned embodiments, the formulation can further comprise a rosin.

Also provided are uses of the concentrate formulation described herein in the preparation of an as-applied agrochemical composition for application to a plant, a plant part, or a growing medium.

Another embodiment, or in combination with any of the mentioned embodiments, is an as-applied agrochemical formulation including: at least one agrochemical active ingredient, and a sulfopolyester that has not been lyophilized. In one embodiment, or in combination with any of the mentioned embodiments, the formulation can further comprise a rosin.

Yet another embodiment, or in combination with any of the mentioned embodiments, is an as-applied agrochemical formulation including: at least one agrochemical active ingredient, and a sulfopolymer that has not been lyophilized. In one embodiment, or in combination with any of the mentioned embodiments, the formulation can further comprise a rosin.

Also provided are as-applied agrochemical formulations including: 0.05 wt % to 20 wt % agrochemical active ingredient or a mixture of two or more agrochemical active ingredients, and up to 5 wt % of a sulfopolymer that has not been lyophilized. In one embodiment, or in combination with any of the mentioned embodiments, the formulation can further comprise a rosin.

Another embodiment, or in combination with any of the mentioned embodiments, is an as-applied agrochemical formulation including: at least one insoluble or partially soluble agrochemical active ingredient; and no more than 15 wt % sulfopolymer that has not been lyophilized; which formulation is characterized by one or more of: dispersibility and/or reliable re-dispersibility of the active ingredient(s); high active ingredient loading capacity; and/or increased stability of the formulation. In one embodiment, or in combination with any of the mentioned embodiments, the formulation can further comprise a rosin.

Also provided are embodiments, or in combination with any of the mentioned embodiments, that include use of the any of the herein described as-applied agrochemical compositions, or any one of the herein described formulations, to treat a plant or a growth medium for an agricultural purpose.

A final embodiment, or in combination with any of the mentioned embodiments, is a method including: combining a sulfopolymer that has not been lyophilized, and at least one agrochemical active ingredient with water to produce a mixture. In one embodiment, or in combination with any of the mentioned embodiments, the method further comprises combining a rosin to produce the mixture.

DETAILED DESCRIPTION

Figure 1:
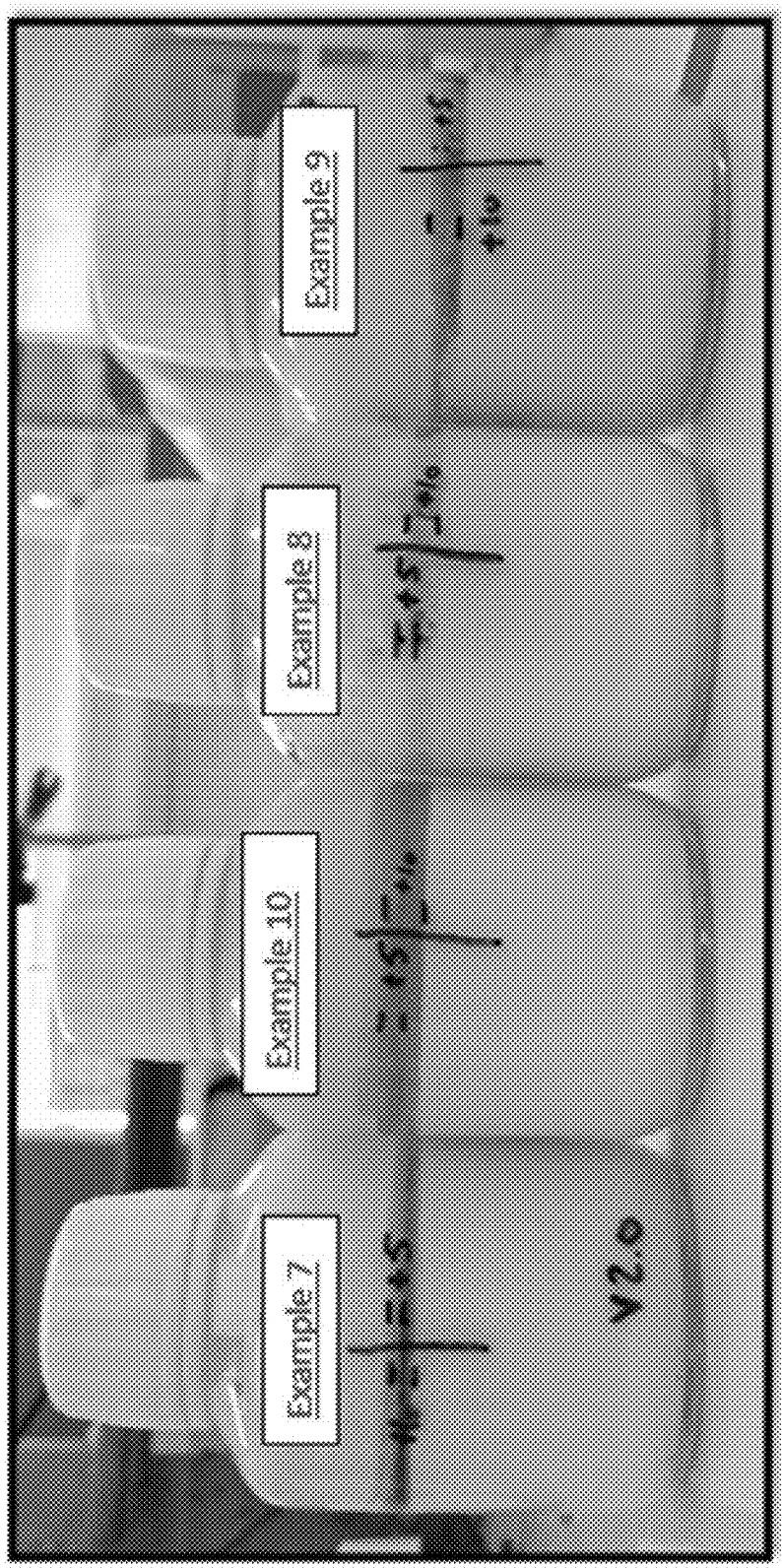
FIG. 1 is a photograph of SC formulations from Ex 7-10, showing the amount of splitting after 10 days at 54° C.

Aspects of the disclosure are now described with additional detail and options to support the teachings of the disclosure, as follows: (I) Select Abbreviations; (II) Select Definitions; (III) Sulfopolymers/Sulfopolyesters Useful in Formulations; (IV) Recovered Sulfopolyesters; (V) Additional Components in Formulations (including (i) Active Compounds; (ii) Optional Rosins; and (iii) Additional Adjuvant(s)); (VI) Additional Optional Ingredient(s)); (VII) Exemplary Component Ranges in Representative Formulations; (VIII) Methods of Making Concentrate Formulations; (IX) Characterization of Formulations; (X) Uses of Concentrate Formulations; (XI) Additional Disclosure; (XII) Examples; and (XIII) Closing Paragraphs.

(I) SELECT ABBREVIATIONS

5-SSIPA is sodiosulfoisophthalic acid; BO is Banana oil; cp is centipoise; dg is geometric mean diameter; EC is emulsifiable concentrate; EDTA is ethylenediaminetetraacetic acid; EO is emulsion, water-in-oil; EW is emulsion, oil-in-water; Ex is example(s); HLB is hydrophile-lipophile balance; h is hour(s); HS is high shear; min is minute(s); MSO is methylated seed oil; MW is molecular weight; OD is oil dispersion; PEG is polyethylene glycol; PWO is Petronas White oil (Petronas Lubricants); rpm is rotations per minute; rt is room temperature; RTU is ready to use; SC is suspension concentrate (a.k.a., flowable concentrate); SCMF is short cut multicomponent fibers; sec is second(s); $T_g$ is glass transition temperature; UAN is urea ammonium nitrate; UV is ultraviolet.

(II) SELECT DEFINITIONS

Use of the word(s), "exemplary" or "embodiment" or "desirably" in this document does not limit the definition or language with which the word(s) is used, and is intended to further illustrate in a non-limiting fashion meaning through use of an example or particular embodiments within the scope of the definition.

Active agent as used herein refers to a chemical or compound that has a particular biological activity. Active agents may include chemicals or compounds that have acaricidal activity, bactericidal activity, fungicidal activity, herbicidal activity, insecticidal activity, larvicidal activity, nematocidal activity, miticidal activity, molluscicidal activity, piscicidal activity, rodenticidal activity, slimicidal activity, or are a fertilizer, a hormone and/or other growth regulator. Additional active ingredients are listed herein. In addition, active agents may include chemicals or compounds that support or enhance plant growth. Active agents may also be referred to as active ingredients.

Adjuvants as used herein refers to an ingredient that aids or modifies the biological activity and/or physical properties of a formulation.

The use of adjuvants with agricultural chemicals generally falls into four categories: (1) activator adjuvants which generally enhance performance of a formulation, (2) spray modifier adjuvants which generally affect the application performance of spray solutions (e.g. drift retardants, stickers, evaporation aids), (3) utility modifiers which generally minimize handling and improve application (e.g., anti-foam agents), and (4) utility products that minimize application problems (e.g. foam markers and tank cleaners). An adjuvant package or formulation may contain and desirably contains a surfactant. In one embodiment, the surfactant in the adjuvant package or formulation, or the adjuvant, includes a sulfopolymer.

Agriculturally acceptable adjuvant as used herein refers to a substance that enhances the performance of an active agent in a composition that is used to influence (that is, inhibit or enhance, depending on circumstances) the growth or cultivation of plants and/or plant parts.

Agrochemical as used herein refers to any chemical substance used to help manage an agricultural ecosystem, such as, for example, a hormone or other growth regulator, a pesticide (such as an herbicide, insecticide, fungicide, nematicide, miticide, larvicide, molluscicide, and so forth), a fertilizer, a soil conditioner, a liming agent, an acidifying agent, or any other growth agent.

Ambient temperature as used herein refers to the temperature at a location or in a room, or the temperature which surrounds an object under discussion. This term is equivalent to "room temperature" (rt). By way of example, room temperature may be between 65° F. and 78° F. (about 18.3° C. to 25.5° C.); or between 68° F. and 72° F. (about 20° C. to 22.2° C.).

Anti freeze as used herein refers to a material that lowers the freezing point of a formulation.

Aqueous dispersion as used herein refers to a water-based formulation in which a compound has been dispersed. In specific embodiments, an aqueous dispersion of a sulfopolyester is a formulation in which a sulfopolyester compound has been dispersed in water. An aqueous dispersion formulation can have a continuous phase of water in contrast to a continuous phase of organic solvent.

Bloom as used herein refers to the spontaneous dispersal, with minimum agitation, of a concentrate formulation into a diluent, such as water. Bloom can refer to the dispersal of droplets of liquid into a liquid diluent, such as for an EC formulation, or to the dispersal of solid particles suspended in liquid, such as for an SC formulation.

Colorant as used herein is any substance used to intentionally alter the color of a formulation.

Concentrate formulation (a.k.a., formulate concentrate) as used herein refers to a formulation that contains at least one active agrochemical compound at a level at least two-times the level used in an as-applied formulation, or at a level higher than the level at which the active ingredient is in a ready to use (RTU) formulation. Thus, a concentrate formulation is expected or intended to be diluted (for instance, with water or another acceptable carrier or diluent) before use or application. In representative embodiments, a concentrate formulation includes at least one active ingredient at a level that is at least twice as concentrated as that ingredient would be used in an as-applied or RTU formulation. A concentrate formulation as the term is used herein is a liquid at 25° C. and 1 atm. Although concentrate formulations may contain dispersed solids, the formulation itself is nevertheless a liquid because it is flowable at this temperature and pressure.

Contact angle as used herein refers to a profile measurement of a drop of water in contact with a solid surface; the flatter a droplet, the lower the contact angle reading. In specific embodiments, adjuvants (e.g. surfactants), can reduce surface tension, spreading out a water droplet and decreasing the contact angle.

Control formulation as used herein is a formulation that contains the same ingredients as a reference formulation, but without any sulfopolymer. Optionally, the control formulation may include adjuvant(s) in place of the sulfopolymer, such as art-recognized adjuvant(s) that are believed to perform function(s) similar to the function(s) for which the sulfopolymer is included in one embodiment or in combination with any of the mentioned embodiments of the reference formulation.

Crashing as used herein refers to a liquid emulsion that dissociates (partially or fully) into two layers. This can include the droplets of the discontinuous phase coalescing into a non-dispersed phase, which for liquid in liquid emulsions is optionally termed "breaking," which includes creaming, settling and coalescence of one or both phases of the emulsion. For a suspension formulation, crashing can include caking, settling, flocculation, crystallization, or precipitation of a solid (previously dispersed and/or suspended) component out of the formulation into a cake or a clay. Usually a crashed formulation cannot readily be re-disbursed.

Diluent as used herein refers to a gas, liquid, or solid used to reduce the concentration of an active ingredient in the formulation or application of an agrochemical composition.

Dispersion as used herein refers to a system in which distributed particles of one material are uniformly dispersed in a continuous phase of another material. It is contemplated that the distributed particles may be solid or liquid particles, which may be dispersed in a continuous liquid phase.

Dispersibility as used herein refers to the ability of one material to uniformly disperse in a continuous phase of another material. Re-dispersibility as used herein refers to the ability of particles to disperse in a mixture after separating, settling or sedimenting of the particles.

Drift as used herein refers to the airborne movement of a compound from an area of application to any unintended (e.g., off-target) site. Drift can happen during agrochemical application, for instance when droplets or particles travel away from the target site. Drift can also happen after the application, when some chemicals become vapors that can move off of the application site.

Drift includes everything that comes off of or out of the target (plant, plant part, growth medium, etc.). Many phenomena contribute to drift, such as for instance evaporation or sublimation, as well as off-target spray deposition. These are the two predominant forms of drift that are often considered in agricultural embodiments; both are important to control impacts on neighboring fields. The two main forms are: Particle or Droplet drift (movement of spray droplets produced at the time of application), which can be influenced by rheology modifiers that affect the size of droplets coming out of the sprayer; and Vapor drift (movement of fumes/vapors after a volatile formulation is applied), which can be influenced by modifying the volatility of the formulation as well as modifying the circumstances under which a compound is applied.

Drift control as used herein refers to the act or effect of measurably reducing or preventing drift. In representative embodiments, drift control includes a statistically significant reduction in drift of a detectable compound, for instance in a comparison between formulations that have one component different in presence or amount. Drift control agents are chemical agents that reduce one or more of: wind drift experienced when spraying a tank mix composition, or vapor drift. Example drift control agents increase droplet size and/or reduce the proportion of driftable fines (droplets of less than 150 microns) in a formulation, for instance by increasing viscosity of the formulation.

There are art-recognized standard methods to measure drift; see, for instance, US Patent Publication 20160015033 A1. However, it is also recognized that different formulators may demonstrate or measure drift in different ways. The usual format for reporting a decrease in drift resulting from inclusion of a drift control agent in a formulation is to provide results for the "improved formulation" compared to the same formulation without the improvement formulant.

One way to view particle/droplet drift control relates to measuring droplet size using spray test equipment. In one embodiment or in combination with any of the mentioned embodiments, an optimized droplet size distribution is around 400 microns; droplets smaller than this are generally considered to be driftable, due to wind or temperature conditions in the field at the time of spray. Droplet size measurements can be made with laser systems using art-recognized techniques (similar to methods for determining sprayability of a formulation).

Vapor drift is generally considered more difficult to measure or quantify, in part because the amount of compound/ingredient loss by volatilization is generally quite low. Volatility is usually detected and measured in field tests, including observations of nearby plants for phytotoxic effects (up to and including plant death).

Effective amount as used herein refers to an amount sufficient to cause a beneficial and/or desired result. For example, an active ingredient can be present in a formulation at an amount effective to provide the desired effect linked to that active ingredient, such as a pesticide effect, a fertilizer effect, or any other agrochemical effect. The amount of any active or other ingredient that is effective for its desired use is usually influenced by what ingredient is being used, the context in which it is used (for instance, other components in a formulation), the method or manner in which the composition containing the ingredient is being used, and so forth. An effective amount for any particular ingredient and in various contexts can be determined using art-recognized methods.

Emulsion concentrate (EC) (or emulsifiable concentrate) as used herein refers to a liquid formulation that contains at least one active agrochemical compound (at a level at least two-times the level used in an as-applied or RTU formulation), one or more organic water-immiscible solvents, and an emulsifier (such as a surfactant). In one embodiment or in combination with any of the mentioned embodiments, the emulsion concentrate includes at least some water, or has a continuous phase of water. In one embodiment, or in combination with any of the mentioned embodiments, the agrochemical active compound and a water-immiscible solvent can be the same compound. In another embodiment or in combination with any of the mentioned embodiments, the agrochemical active compound and at least one water immiscible compounds are not the same compounds. In representative embodiments, the emulsifier is or includes a sulfopolymer, such as a sulfopolyester. When EC formulations are diluted with water, for instance in a spray tank, it is desirable that they form an emulsion with minimal mixing. It is even more desirable that they form an emulsion spontaneously, with no mixing. The formation of an emulsion upon dilution can be referred to as "bloom".

Diluted EC formulations contain small droplets of one liquid evenly dispersed in another liquid. A common type of EC formulation contains an active ingredient dissolved in a non-water soluble (water immiscible) solvent (such as an oil, an inorganic or organic solvent, a fatty acid amide or ester) evenly dispersed into water. It is important that the water immiscible droplet size stays small (for instance, 0.1 to 1.0 μm), otherwise the dispersion will collapse, resulting in a solvent/oil phase and a water phase. To avoid this collapse, agrochemical formulations often include a surfactant or emulsifier. Such emulsifiers interact with both the solvent/oil and water phases to maintain a balance enabling a stable emulsion. As formulations have gotten more complex, interactions with additional adjuvants has resulted in a need to find new dispersants to enable stable emulsions. Additionally, as the concentration of the active ingredient in the formulation has continued to increase, there is a need for improved emulsifiers. More stringent regulatory requirements are forcing the industry to find new solvents for ag formulations. As new oil-soluble solvents are introduced, the emulsifier package needed for a stable EC formulation continues to evolve. Emulsion stability and testing are discussed in Particle Sciences Technical Brief 2011, vol. 2 (available online at particlesciences.com/docs/technical_briefs/TB_2011_2.pdf).

Emulsion as used herein refers to a mixture that results when one liquid is added to another and is mixed with it but does not dissolve into it, creating a homogeneous dispersion of liquid droplets dispersed in a continuous phase. An emulsion is a made by combining two liquids that normally don't mix. The process of turning a liquid mixture into an emulsion is called emulsification.

Flowable concentrate as used herein refers to a suspension of one or more solid active ingredients (at a level at least two-times the level used in an as-applied or RTU formulation) in water.

Growth medium as used herein refers to any natural or artificial solid, semi-solid or liquid that is suitable for germination, rooting, and/or propagation of plants. Examples of growth media include peat moss, vermiculite, perlite, wood bark, coir, sawdust, certain types of fly ash, pumice, plastic particles, glass wool, rock wool, and certain polymer-based foams. These are commonly used either alone or in various combinations with each other and/or natural soil (with or without soil amendments). Suitable soil amendments include ground natural minerals, such as kaolins, clays, chalk, and talc; ground synthetic minerals, such as silicates and highly dispersed silica; anionic or non-ionic emulsifiers; surfactants, such as alkali metal salts lignosulfate and naphthalene sulfonic acid; and dispersing agents, such as methylcellulose. Natural soil is also contemplated as a growth medium herein, including in situ soil in fields. The term growth medium also specifically includes liquid media used for hydroponic plant growth, as well as growing support materials/substrates used in conjunction with hydroponic processes.

High load as used herein refers to a concentration or level of active ingredient or solvent that would either (i) not be attainable without the presence of a sulfopolymer, or (ii) at a concentration of at least 1 wt % based on the weight of liquids the formulation (in a concentrate formulation). In one embodiment or in combination with any of the mentioned embodiments, this concentration (w/w %) may be 1-80%. In additional embodiments, the concentration is 20-80%, or 30-80%, or 40-80%, or 50-80%, or 60-80%, or 20-70%, or 30-70%, or 40-70%, or 50-70%, or 20-30%, or 30-40%, 40-50%, 50-60%, 60-70%, or 70-80%. The target concentration is dependent on the specific active ingredient(s) and/or solvent that is used in the formulation. Relative to the industry accepted standard stable concentration of a concentrated formulation, embodiments provided herein enable an increase of at least 10%, or at least 20%, or at least 30%, or at least 40%, or at least 50%, or at least 60%, or at least 70%, or at least 80%, or at least 90%, or at least 100%, or more relative to the control formulation concentration. In examples, that control formulation is the same formulation but lacking the sulfopolymer; in other examples, it is the same formulation lacking the sulfopolymer but with an industry accepted substitute adjuvant in place of the sulfopolymer.

It will be understood that the phrase high load formulation generally refers to a concentrate formulation; such formulations can be diluted for use as described herein.

High shear (mixing) as used herein refers to a form of mixing that produces high shear forces, primarily via using a rotor, rotating at high speeds, to direct material outwards towards a stationary stator and thus shear the material. Variable rotor speeds provide the ability to uniquely tailor the amount of shear energy for each application. This technique can be used to mix a liquid, solid or gas into a liquid with which it ordinarily would not easily mix. High-shear mixing can be used for homogenization, dispersion, emulsification or particle size reduction.

Inert Ingredient or Component as used herein refers to any substance other than an active ingredient (such as an agrochemical active ingredient) that is intentionally included in a formulation. Non-limiting examples of inert ingredients include emulsifiers, solvents, carriers, sticker agents, surfactants, drift control agents, drought control agents, fragrances, dyes and adjuvants with spreader activity, with rain fastness activity, and so forth.

Inert Package as used herein refers to a pre-mixed composition the provides one or more inert component(s) for use in an agrochemical formulation. An inert package is added to a formulation (such as a concentrate formulation) that contains at least one active agrochemical ingredient, for instance concurrently with the formulation being diluted for application to a plant, plant part, or growth medium. Different inert packages can be formulated to be paired with different active ingredient formulations, as will be recognized by those of ordinary skill in the art.

An inert package may provide at least one adjuvant function, such as for instance an emulsifier, a sticker, a drift control agent, a spreader, a rain fastness agent, and so forth. Additional examples of inert packages provide two or more such adjuvant functions. A "complete" inert package provides all of the adjuvant function(s) that are needed for use with a particular agrochemical formulation.

By way of example, an inert package can include at least one sulfopolymer as described herein. In specific embodiments, the sulfopolymer in the inert package is a sulfopolyester, such as a sulfopolyester comprising a sulfoisophthalate moiety derived, for example, from sodiosulfoisophthalic acid (5-SSIPA) or esters or amides thereof.

Lipophilic compound as used herein is a compound tending to combine with or dissolve in lipids or fats. In general, lipophilic compounds have solubility in water that is in the "sparingly soluble" range, or lower. For compounds that are "sparingly soluble in water," the quantity of water needed to dissolve one gram of the compound will be in the range beginning at 30 ml and ending at 100 ml or higher. Compounds having solubility lower than "sparingly soluble" in water will require greater volumes of water to dissolve the compounds.

Loadings as used herein refers to the amount of a material in a given volume. For agricultural formulations, loading(s) often refers to the amount of active ingredient in the formulation, represented as a g/liter percentage.

Oil Dispersion (OD) as used herein refers to a system in which distributed particles (liquid or solid) of a material are uniformly dispersed in a continuous phase of an oil. Water sensitive active agents are usually formulated as solid dry formulations, as they are hydrolytically unstable active agents. The OD enables water sensitive active agents to be formulated as liquid formulations. In an OD, the water sensitive solid or liquid particles are homogeneously suspended in the oil phase. The oil in the formulation has the added features of foliar absorption enhancement and spray retention on the leaves by hydrophobic affinity. As oil dispersions can optionally be water free, there is no need to add biocides as preservatives, which is an advantage to using oil dispersions.

An OD formulation may collapse prior to use and require agitation and energy to re-disperse. As an example, the active ingredient may crystallize from or settle out of the oil solution. For instance, a solid ingredient may settle out sufficiently to form a cake or a liquid may settle out to form a discrete layer. In provided embodiments, the settled ingredient and/or cake can be readily resuspended. To avoid such collapse, adjuvant(s) may be added to facilitate or support the dispersion. The sulfopolymers described herein are proposed for use in supporting OD dispersions and preventing or reducing the likelihood of collapse, and/or at rendering the formulation readily re-dispersible even without significant agitation.

In one embodiment or in combination with any of the mentioned embodiments, the OD is diluted with water prior to application, for instance application at the field. In one embodiment, an inversion can occur when the OD is mixed with water. For example, initially, the water phase is dispersed in the oil phase as small droplets. Upon dissolution into water, the oil droplets are dispersed in the continuous water phase. The sulfopolymers described can facilitate this type of inversion.

Oil-in-Water emulsion as used herein refers to a mixture wherein oil is dispersed as extremely fine droplets in a continuous phase of water. Optionally, one or more active ingredient(s) may also be contained in an oil-in-water emulsion; depending on the active ingredient, it may be contained in the oil phase, the water phase, or both.

Pest as used herein is any organism (including microorganisms) in a circumstance that makes the presence of the pest undesirable. It is recognized that a pest in exemplary instances is a plant (e.g., a weed), a microorganism (such as a fungus, bacteria, nematode, and so forth), an insect (including any phase or life cycle of an insect, such as eggs, larvae, or adult insects), a mollusk (such as a slug or snail), or a larger animal (such as a rodent, bird, fish, and so forth).

Pesticide as used herein include any substance or mixture of substances intended for preventing, destroying, repelling, or mitigating any unwanted pest, wherein a pest is any organism that may have an impact on a crop. There are many subcategories of pesticides, which include: insecticides, herbicides, rodenticides, bactericides, fungicides, larvicides, miticides, molluscicides, nematicides, and so forth.

Phase as used herein refers to a physically distinctive form of matter. While they are canonically thought of in the form of solids, liquids, gases, or plasmas, there are other phases that are important for mixtures. For example, in emulsions there are two phases, a continuous phase and a dispersed phase that occupies disconnected regions of space. A dispersed phase can coalesce and yet remain as a dispersed phase, until and unless the coalescing forms a continuous connection throughout a given volume, at which point it becomes a continuous phase. A dispersed phase can be discrete droplets of liquid, solids, or gas bubbles in a continuous phase.

Phytotoxicity as used herein refers to any form of plant injury. Phytotoxicity can cause one or more of the following to the plant: leaf tip or edge burn, overall yellowing, stunting, small leaf size, leaf curling, cupping and other distortions, dark green color (typical of triazole fungicides), speckling, delays in flowering, delays in rooting, delays or reductions in seed or fruit development, or plant death. A substance, compound, composition, or formulation that is "substantially non-phytotoxic" will not produce any of the aforementioned adverse effects when applied to a plant.

In testing for phytotoxicity, a substance, compound, composition or formulation is applied to the plant of interest and the plant is visually observed for a period of time, such as an hour, a day, a week, multiple weeks, a month, or an entire growing season. Measurement of phytotoxicity can be done visually (for instance, leaf impacts or total plant health observation) or quantitatively (for instance, amount of fruit or seed produced). If the substance, compound, composition or formulation is substantially non-phytotoxic, there will be no statistically relevant difference in appearance, or production, relative to a non-treated plant.

Plant: The term "plant" as used herein refers to a whole plant including any root structures, vascular tissues, vegetative tissues, and reproductive tissues. A "plant part" includes any portion of a plant. For example, upon harvesting a tree, the tree separated from its roots becomes a plant part. Plant parts also include flower, fruits, leaves, vegetables, stems, roots, branches, seeds, and combinations thereof that are less than the whole plant.

Powder as used herein means particles in the range of 0.5-5000 µM.

Preservative as used herein is any chemical that inhibits or suppresses decomposition of a product or formulation, such as an agrochemical formulation.

Rainfastness as used herein is a measure of how well a substance, after application to a surface (such as a leaf surface), resists being washed away by rainfall or irrigation. A formulation is considered rainfast after application when and if it has adequately dried or has been absorbed by plant tissues so that it will still be effective after rainfall or irrigation. The degree of rainfastness of agrochemical formulations is highly variable.

The art recognizes methods for determining or measuring rainfastness of a formulation. For instance, tests may be based on visual determination of an amount of a marker dye residue left on the leaves (or other test application surface) after "rain" or other washing. By way of example, a fluorescent dye or colored dye may be added to the formulation prior to application to the surface. After the formulation is allowed to dry, the amount of dye may be determined visually or with the use of a fluorescence detector or colorimetric detector. Following rain or exposure to water, the leaf or surface can be dried and again evaluated for residual dye. Comparison to a control formulation provides an indication of the effective rainfastness of the modified formulation.

Rosin as used herein refers to a solid form of resin obtained from pines and some other plants, mostly conifers, produced by heating fresh liquid resin to vaporize the volatile liquid terpene components. Unrefined, it is semi-transparent and varies in color from yellow to black; it has a softening point usually under the boiling temperature of water. Rosin chiefly consists of various resin acids, especially abietic and pimaric acids. The three main categories/sources of rosin are tall oil rosins, gum rosins, and wood rosins. For commercial uses, rosins are often purified and/or derivatized, in order to provide different characteristics. Derivatization may include one or more of disproportionation (which may provide improved stability), hydrogenation (which provides stability, different chemical compatibilities, decreased odor, and/or enhanced clarity), or esterification (which increases stability, modifies the molecular weight and acid number, and can alter softening/melting point as well as $T_g$). Myriad commercially available rosins, including rosin esters and rosin resins, are useful in the formulations, compositions, and methods provided herein.

Solvent dispersion as used herein refers to a system in which distributed particles of a material are uniformly dispersed in a continuous phase of a substantially water-immiscible solvent. An oil dispersion is a variety of solvent dispersion.

Sprayability as the term is used herein refers to the ability of a liquid or gel to be driven or dispersed in air as, for example, particles, drops or droplets. The liquid or gel can be ejected, blown, or forced in or through the air in the form of droplets or an aerosol, optionally through a nozzle, typically under pressure.

Spread as used herein refers to the act of or the ability of a formulation (such as a mixture, dispersion, or emulsion) to extend, distribute, cover, or coat a certain area. In particular embodiments, spread refers more particularly to the act of or the ability of a formulation to overcome at least in part the hydrophobic nature of the surface of a plant or plant part, thus allowing a formulation to attain better contact and/or coverage with the formulation. The ability of a formulation to spread can be measured using standard tests known to those in the art, such as contact angle measurements, drop count or area % coverage.

The ability of a liquid composition to spread onto a surface is related to the surface tension of that liquid. Thus, surfactants, detergents, and other compounds that reduce surface tension can be used to increase spread.

High spread is a relative term that refers to characteristics of a liquid composition that has a greater level of spread (wetting) than a composition to which it is compared. By way of example, a spreading agent/spreader provides higher spread to a formulation in which it is included, if the formulation with the spreading agent has higher spread character (better wetting) than an equivalent formulation without that spreading agent, or with less of the spreading agent, or with another spreading agent that is less effective. By way of example, the contact angle of two compositions can be measured using standard techniques, and compared. Generally it is considered that a lower contact angle is indicative of better wetting (lower surface tension and higher coverage area). In one embodiment or in combination with any mentioned embodiments, there is now provided a formulation or composition having a high coverage area or spreading/wetting even with high contact angles.

In another embodiment or in combination with any mentioned embodiments, the comparative amount of spread of two formulations can be determined by measuring the actual coverage of each formulation when applied to a surface, such as a leaf surface or a test surface; by way of example, a high spread formulation will have at least 10%, or at least 20%, or at least 30%, or at least 40%, or at least 50%, or at least 60%, or at least 70%, or at least 80%, or at least 90%, or at least 100%, or more than 100% more coverage than a comparative formulation (for instance, a formulation containing a test spreader adjuvant compared to one lacking that spreader, or compared to one that contains a different spreader adjuvant).

Stable as used herein refers to a system's (such as an emulsion or a suspension) ability to resist changes in its physicochemical properties over time. Formulation stability can be viewed as having one of the following aspects—initial stability (the ability of the formulation to resist phase separation) and re-dispersibility (the ready ability to reverse phase separation when it does occur). Thus, a "stable" formulation resists phase separation for at least an initial period of time as defined below; or is readily re-dispersed using the test method described below.

As used herein, a formulation, such as a formulation concentrate, is "stable" if, when a homogenously dispersed formulation is tested under the following conditions, it has no phase separation (as determined by the naked eye) after: sitting still in a container having a height (to the shoulder, if one exists, of the container) to diameter ratio (H/D) anywhere between 20 and 0.7, and a diameter of at least 0.5 inches, for 14 days at 54° C. at 1 atm. With regard to re-dispersion, a formulation or formulation concentrate is "stable" if it exhibits phase separation according the above test method and can be re-dispersed using at least one and no more than 10 inversion cycles (inverted and reverted to its upright position being one cycle) by hand, each inversion cycle accomplished in 2 seconds, and without any other induced vibration, agitation, or shaking and no visual phase separation is evident to the naked eye upon standing still thereafter for a period of 5 minutes.

For example, re-dispersible stable formulations can experience 50%, 40%, 30%, 20%, 10%, 9%, 8%, 7%, 6%, 5%, 4%, 3%, 2% or 1% (in each case not more than) phase separation (for instance, measured as described in FIG. 7 and the corresponding text) over a period of two weeks when stored at 54° C. at 1 atm. Separation can be examined at shorter time periods, such as one hour, 2 hours, 3 hours, 4 hours, 6 hours, 12 hours, 18 hours, 20 hours, 24 hours, two days, three days, four days, five days, six days, seven days, eight days, nine days, ten days, eleven days, twelve days, or thirteen days. In those instances where the formulation displays phase separation within the first 14 days after its initial mixing, the formulation is still referred to as stable where it is re-dispersible according to the above stated method. In other embodiments, a formulation will be viewed as stable if it experiences less than 50%, less than 40%, less than 30%, less than 20%, less than 10%, or less than 5% separation, or no visible phase separation, over two weeks, or three weeks, or a month, or two months, or three months, or six months, or a period of a growing season, under the stated test conditions; or if any observed phase separation in that period can be reversed by re-dispersion.

Similarly, formulations are considered stable even if they phase separate, if they can be re-dispersed according to the test method described above. The re-dispersion can be conducted by any variety of methods such as simple mixing with or without high shear mixing, shaking, vibrating, etc. For purposes of determining the ease of re-dispersion, the formulation is considered to be stable if it can be re-dispersed by the method described above. In one embodiment, the formulation can be re-dispersed in the stated test method through as few as a single inversion by hand, or no more than two inversions, or no more than three inversions, or no more than four inversions, or no more than five inversions, or no more than six inversions, or no more than seven inversions, or no more than eight inversions, or no more than nine inversions, or no more than 10 inversion cycles by hand and without any other induced vibration, agitation, or shaking. In one embodiment, the formulation, after any one of ranges of inversion numbers mentioned above, has no visual phase separation evident to the naked eye upon standing still after the number of stated inversions for a period of at least 10 minutes, or at least 15 minutes, or at least 30 minutes, or at least 60 minutes, or at least 90 minutes, or at least 120 minutes, or at least 3 hours, or at least 5 hours, or at least 10 hours, or at least 12 hours, or at least 16 hours, or at least 24 hours, or at least 36 hours, or at least 2 days, or at least 4 days, or at least 7 days, or for 10 days.

In addition to stability at ambient temperature, in one embodiment or in combination with any of the mentioned embodiments a formulation may be stable (either initial stability or re-dispersible stability) at cold temperature (for instance, 5° C. for 2 weeks), or stable through temperature fluctuations (for instance, temperature cycles every 12 hours, daily, every 3-5 days, every 7 days, every two weeks, or seasonally) between a higher and a lower temperature (for instance, between a low of 2° C. and a high of 60° C. (35.6° F. to 140° F.), or between a low of 5° C. and a high of 54° C. (41° F. to 129.2° F.), or between a low of 4.4° C. and a high of 37.8° C. (40° F. to 100° F.). It is understood that such fluctuating temperature stability measurement is intended to capture stability of a formulation that is intended to be maintained in realistic situations at a site that does not have consistent temperature maintenance, such as for instance in a storage facility or at a farm. Thus, stability through variable temperatures may also be examined by storing a formulation over a selected period of time (such as at least 24 hours, at least two days, at least a week, at least two weeks, at least a month, or more than a month, for instance, for three months or longer, for six months or longer, for 9 months or longer, or for a year or longer) outdoors or in a facility that does not have any (or reliable) temperature maintenance, in order to expose the formulation to natural temperature fluctuations.

In this context, the phrase natural temperature fluctuation refers to changes in temperature that occur diurnally (within a single day), that occur due to weather patterns, that occur due to passage of seasons, and that occur due to natural climate cycles.

Sticker or sticker adjuvant as used herein refers to a compound or ingredient used in an agrochemical formulation that influences the deposition characteristic(s) of the formulation to allow it to "stick" on a surface better than a formulation without that compound or ingredient. A sticker adjuvant provides one or more of: increased surface contact between the formulation and a surface on which it is sprayed; reduced runoff; and/or increased surface penetration. At least some sticker adjuvants exhibit surfactant activity.

Surface tension as used herein refers to the condition that exists at the free surface of a liquid. Surface tension is a measure of the force required to pull a floating ring off the surface of a liquid and is measured in dynes/cm.

Surfactant as used herein refers to a compound that lowers the surface tension (or interfacial tension) between two liquids, between a gas and a liquid, or between a liquid and a solid. Surfactants may act as detergents, wetting agents, emulsifiers, foaming agents, and dispersants. Surfactants may be amphoteric, nonionic, and/or anionic. In an agrochemical formulation, surfactants may influence one or more of: emulsification, dispersion of active ingredient(s), spreading, and/or wetting.

Suspension as used herein refers to a heterogeneous mixture that contains solid particles dispersed in a liquid where the solid particles do not completely dissolve in the liquid. The particles may be visible to the naked eye and may eventually settle, although the mixture is only classified as a suspension when and while the particles have not settled out. It is to be understood that the formulation continues to remain classified as a suspension if it is redispersible as noted above even if the particles have settled.

Suspension concentrate (SC) as used herein refers to a suspension of small particles of solid active ingredient(s) (where at least one active agrochemical compound/ingredient is at a level at least two-times the level used in an as-applied or RTU formulation) in a liquid phase, such as water, that is intended for dilution with water before use. Suspension concentrate formulations (SCs) may also be referred to as flowable concentrate formulations. The liquid phase of a SC can be either water-immiscible solvent (e.g., oil) based, or water based, depending on the specific active ingredient(s) and the application of interest. The concentrate is often diluted into a larger volume of water at the point of use, such as a farm (for an agrochemical suspension concentrate).

As a suspension concentrate is stored over time, it is not uncommon for at least some of the solid particles to settle to the bottom of the container. This settling can lead to very hard cakes (caking) at the bottom of the container that require significant agitation to break apart and re-suspend. In many cases, this settling leads to an increase in particle sizes in the tank mix that can clog or plug spray nozzles and lines and render the formulation unusable. Some SC formulations require significant agitation to ensure that the solid particles are dispersed sufficiently to avoid equipment plugging and to enable complete addition to the tank.

Ready to use as used herein refers to a formulation that requires no further dilution before application.

Tank mix as used herein refers to two or more chemical pesticides, inert ingredients, components, or formulations, mixed in the spray tank at the time of spray application or immediately before.

Thickener as used herein refers to a material a primary function of which is to increase the viscosity of a fluid.

Total water hardness refers to the amount of dissolved calcium and magnesium ions in a water sample. Total water hardness can be expressed in parts per million ("ppm").

Volatilization as used herein refers to the process by which a dissolved sample is vaporized, or a solid residue is sublimed.

Water Hardness as used herein is a measure of the amount of minerals that are present in water. Hardness is typically expressed in milligrams of dissolved calcium and magnesium carbonate per liter of water; however, other bivalent and trivalent metallic elements may contribute to water hardness.

Water immiscible as used herein refers to a liquid, generally a solvent, that has limited or no significant ability to mix with water or an aqueous phase at ambient conditions. That is, in the absence of a surfactant, a water immiscible solvent mixed with water will form two layers in spite of possible slight solubility. The term is not intended to be absolute, and it is recognized that hydrophobic liquids (such as oils and other hydrophobic solvents) may in fact be able to mix with water to a limited extent.

Thus, in one embodiment or in combination with any of the mentioned embodiments, a water immiscible solvent will be less than 0.1 wt. %, less than 0.2 wt. %, less than 0.3 wt. %, less than 0.4 wt. %, less than 0.5 wt. %, less than 0.75 wt. %, less than 1 wt. %, less than 1.25 wt. %, less than 1.5 wt. %, less than 2 wt. %, less than 2.5 wt. %, less than 3 wt. %, less than 5 wt. %, less than 7 wt. %, less than 8 wt. %, or less than 9 wt. %, or 0.1-10 wt. % soluble/mixable with water at about 25° C. and about 1 atm. Examples of water immiscible solvents include: any of the active agents mentioned throughout this disclosure that are water immiscible (or in other words, is less than 10 wt. % water soluble/mixable with water at 25° C. and 1 atm), or mineral oils, vegetable oils, seed oils, methylated seed oils, banana oil, white mineral oil mineral spirits, toluene, benzene, xylene, SOLVESSO™ Aromatic 100, SOLVESSO™ Aromatic 150, SOLVESSO™ Aromatic 150 ND, SOLVESSO™ Aromatic 200 ND SOLVESSO™ Aromatic 200, SOLVESSO™ 100, SOLVESSO™ 150, SOLVESSO™ 150 ND, SOLVESSO™ 200, SOLVESSO™ 200 ND, acetophenone, isopropyl acetate, t-butyl acetate, methyl n-propyl ketone, propyl acetate, methyl isobutyl ketone, isobutyl acetate, n-propyl propionate, butyl acetate, methyl isoamyl ketone, methyl amyl acetate, n-butyl propionate, p-amyl acetate, methyl n-amyl ketone, isobutyl isobutyrate, cyclohexanone, di-isobutyl ketone, n-pentyl propionate, ethyl 3-ethoxy propionate, 2-ethylhexyl acetate, ethylene glycol monobutyl ether, isophorone, 2,2,4-trimethyl-1,3-pentanediol monoisobutyrate, 2,2,4-trimethyl-1,3-pentanediol diisobutyrate, 2-heptanol, or 2-ethyl hexanol.

Water-in-Oil emulsion as used herein refers to a mixture wherein water is dispersed as extremely fine droplets in a continuous phase of oil or other water immiscible solvent. Optionally, one or more active ingredient(s) may also be contained in a water-in-oil emulsion; depending on the active ingredient, it may be contained in the oil phase, the water phase, or both. A water-in-oil emulsion is an example of a water-in-water immiscible solvent emulsion.

(III) SULFOPOLYMERS/SULFOPOLYESTERS USEFUL IN FORMULATIONS

The sulfopolymer described herein is a water-dispersible sulfopolymer. The water-dispersible sulfopolymer can be any sulfopolymer including at least one sulfomonomer residue. In one embodiment or in combination with any of the mentioned embodiments, the sulfomonomer residue comprises a salt of a sulfoisophthalate moiety derived, for example, from sodiosulfoisophthalic acid (5-SSIPA) or esters thereof. The sulfoisophthalate moiety can also be derived from other metallic sulfoisophthalic acids and esters thereof. For example, the associated metal M is a monovalent metal, such as $Na^+$, $Li^+$, or $K^+$.

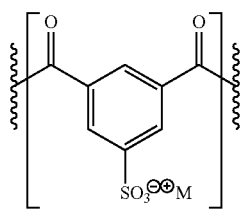

Salt of a sulfoisophthalate moiety

Moreover, the salt of the sulfoisophthalate moiety can also be derived from non-metallic sulfoisophthalic acids and esters thereof. As an example, the metal sulfonate group can be replaced by an ammonium sulfonate group, such as a tertiary or quaternary ammonium cation, for example ammonium, hydrazonium, N-methyl pyridinium, methylammonium, butylammonium, diethylammonium, triethylammonium, tetraethylammonium, and benzyltrimethylammonium.

In addition to the sulfoisophthalate moiety, the sulfopolymer can include the residues of one or more of a glycol monomer, a dicarboxylic acid monomer, and/or a diamine monomer. Examples of sulfopolymer includes sulfopolyester, sulfopolyamide, or sulfopolyesteramide.

In one embodiment or in combination with any of the mentioned embodiments, the sulfopolymer can be a linear polymer having an average molecular weight (MW) of at least 2 kDa. In one embodiment or in combination with any of the mentioned embodiments, the sulfopolymer has an average MW of 2-20 kDa, 4-18 kDa, 5-15 kDa, 5-12 kDa, or 7-10 kDa. Additionally, the sulfopolymer can have a $T_g$ of at least 30° C. Furthermore, the sulfopolymer can have a $T_g$ in the range of from 30° C. to 120° C., 35° C. to 100° C., 40° C. to 90° C., 45° C. to 80° C., and 50° C. to 70° C.

The water-dispersible sulfopolyester used in accordance with the present disclosure is prepared from monomer residues comprising dicarboxylic acid monomer residues, sulfomonomer residues, and diol monomer residues. The sulfomonomer may be a dicarboxylic acid, a diol, or hydroxycarboxylic acid. Thus, the term "monomer residue", as used herein, means a residue of a dicarboxylic acid, a diol, or a hydroxycarboxylic acid. A "repeating unit" or "repeat unit", as used herein, means an organic structure having 2 monomer residues bonded through a carbonyloxy group. The sulfopolyesters for use with the present disclosure contain substantially equal molar proportions of acid residues (100 mole %) and diol residues (100 mole %) which react in substantially equal proportions such that the total moles of repeating units are equal to 100 mole %.

The sulfopolyesters are high molecular weight amorphous polyesters commonly dispersed directly in water without the need to incorporate organic co-solvents, surfactants, or amines. Sulfopolyesters differ chiefly by their chemical makeup (i.e. they are composed of 5-sodiosulfoisophthalic acid (5-SSIPA) and various combinations of other materials, for example: terephthalic acid (TPA), isophthalic acid (IPA), 1,4-cyclohexane dicarboxylic acid (1,4-CHDA), ethylene glycol (EG), diethylene glycol (DEG), triethylene glycol (TEG), 1,4-cyclohexanedimethanol (CHDM) and/or neopentyl glycol (NPG). The MW of the sulfopolyester described herein is 2 kDa to 15 kDa. The temperature where a glassy polymer becomes rubbery on heating, and vice versa upon cooling, is known as the glass transition temperature ($T_g$). Hence, the various sulfopolyester polymers have different average $T_g$ values. Sulfopolyesters are solid to semi-solid polymers and require warm to hot water with sufficient mixing time to prepare concentrated dispersions.

One exemplary sulfopolymer is Sulfopolyester 2 (SPE2), a sulfopolyester that disperses directly in a mixture of ethanol and water at room temperature or in warm water without the assistance of surfactants or other additives. Low-viscosity aqueous dispersions can be prepared at concentrations up to 30 wt % polymer. The aqueous or hydroalcoholic dispersions have water-like viscosity at concentrations up to 20 wt % polymer. SPE2 polymers aid the dispersion of hydrophobic ingredients in water-based formulations and films formed from the dispersions are clear and glossy at room temperature. SPE2 is more compatible with higher levels of alcohol than is SPE1. SPE2 has a $T_g$ of 48° C.

Another exemplary sulfopolymer is Sulfopolyester 1 (SPE1), a sulfopolyester that disperses directly in hot water without the assistance of amines, cosolvents, surfactants or other additives. SPE1 polymer forms clear films at room temperature from aqueous dispersions. SPE1 polymer has a $T_g$ of 38° C. Because of its low $T_g$, SPE1 forms flexible films.

In general, sulfopolymer dispersions, and particularly aqueous dispersions of sulfopolyesters, will have a pH that is neutral to mildly acidic, for instance in the range of 5-7.5. Specific example sulfopolymers will have a pH of between 5.5 and 7, or between 5.8 and 6.8, or between 6.0 and 6.6, or between 5.8 and 6.5.

The mole percentages provided in the present disclosure may be based on the total moles of acid residues, the total moles of diol residues, or the total moles of repeating units. For example, a sulfopolyester containing 30 mole % of a sulfomonomer, which may be a dicarboxylic acid, a diol, or hydroxycarboxylic acid, based on the total repeating units, means that the sulfopolyester contains 30 mole % sulfomonomer out of a total of 100 mole % repeating units. Thus, there are 30 moles of sulfomonomer residues among every 100 moles of repeating units. Similarly, a sulfopolyester containing 30 mole % of a dicarboxylic acid sulfomonomer including a sulfoisophthalic moiety, based on the total acid residues, means the sulfopolyester contains 30 mole % sulfomonomer out of a total of 100 mole % acid residues. Thus, in this latter case, there are 30 moles of sulfomonomer residues among every 100 moles of acid residues.

The sulfopolyesters described herein have an inherent viscosity, abbreviated hereinafter as "Ih.V.", of at least 0.1 dL/g, for instance at least 0.2, at least 0.3 dL/g, or at least 0.4 dL/g, and at most 0.5 dL/g, measured in a 60/40 parts by weight solution of phenol/tetrachloroethane solvent at 25° C. and at a concentration of 0.5 g of sulfopolyester in 100 ml of solvent. The term "polyester", as used herein, encompasses both "homopolyesters" and "copolyesters" and means a synthetic polymer prepared by the polycondensation of difunctional carboxylic acids with difunctional hydroxyl compound. As used herein, the term "sulfopolyester" means any polyester comprising a sulfomonomer including a sulfoisophthalic moiety. Typically, the difunctional carboxylic acid is a dicarboxylic acid and the difunctional hydroxyl compound is a dihydric alcohol such as, for example glycols and diols. Alternatively, sulfopolyester contains hydroxy acid monomers, for example, p-hydroxybenzoic acid, and the difunctional hydroxyl compound may be an aromatic nucleus bearing 2 hydroxy substituents such as, for example, hydroquinone. The term "residue", as used herein, means any organic structure incorporated into the polymer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The sulfopolyester of the present disclosure includes one or more dicarboxylic acid residues. Depending on the type and concentration of the sulfomonomer, the dicarboxylic acid residue may comprise from 60 to 100 mole % of the acid residues. Other examples of concentration ranges of dicarboxylic acid residues are from 60 mole % to 95 mole %, and 70 mole % to 95 mole %. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include succinic; glutaric; adipic; azelaic; sebacic; fumaric; maleic; itaconic; 1,3-cyclohexanedicarboxylic; 1,4 cyclohexanedicarboxylic; diglycolic; 2,5-norbornanedicarboxylic; phthalic; terephthalic; 1,4-naphthalenedicarboxylic; 2,6-naphthalenedicarboxylic; diphenic; 4,4'-oxydibenzoic; 4,4'-sulfonyidibenzoic; and isophthalic. Example dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexane-dicarboxylate with the residues of isophthalic and terephthalic acid being exemplary. The dicarboxylic acid methyl ester is a specific example embodiment; it is also acceptable to include higher order alkyl esters, such as ethyl, propyl, isopropyl, butyl, and so forth. In addition, aromatic esters, particularly phenyl, also may be employed.

The sulfopolyester includes 4 to 40 mole %, based on the total repeating units, of residues of at least one sulfomonomer having two functional groups and one or more sulfonate groups attached to an aromatic or cycloaliphatic ring wherein the functional groups are hydroxyl, carboxyl, or a combination thereof. Additional examples of concentration ranges for the sulfomonomer residues are 4 to 35 mole %, 8 to 30 mole %, and 8 to 25 mole %, based on the total repeating units. The sulfomonomer may be a dicarboxylic acid or ester thereof containing a sulfonate group, a diol containing a sulfonate group, or a hydroxy acid containing a sulfonate group. The term "sulfonate" refers to the anion of a sulfonic acid having the structure "—$SO_3^-$" and the term "sulfonate salt" is the salt of a sulfonic acid having the structure "—$SO_3M$" wherein M is the cation of the sulfonate salt. The cation of the sulfonate salt may be a metal ion such as $Li^+$, $Na^+$, $K^+$, and the like. Alternatively, the cation of the sulfonate salt may be non-metallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, the method of this disclosure for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomer residues include monomer residues where the sulfonate salt group is attached to an aromatic or alicyclic ring of an aromatic dicarboxylic acid or residues thereof, such as, for example, the rings of benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present disclosure are the metal sulfonate salt of sulfophthalic acid, sulfoterephthalic acid, sulfoisophthalic acid, or combinations thereof. Other examples of sulfomonomers which may be used are 5-sodiosulfoisophthalic acid and esters thereof. If the sulfomonomer residue is from 5-sodiosulfoisophthalic acid, typical sulfomonomer concentration ranges are 4 to 35 mole %, 8 to 30 mole %, and about 8 to 25 mole %, based on the total moles of acid residues.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

The sulfopolyester includes one or more diol residues which may include aliphatic, alicyclic, and/or aralkyl glycols. Examples include ethylene glycol, diethylene glycol, triethylene glycol, polyethylene glycols, and polyalkylene glycols. Other suitable glycols include cycloaliphatic glycols having 6 to 20 carbon atoms and aliphatic glycols having 3 to 20 carbon atoms. Specific examples of such glycols are ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, diethanol, 2,2,4-trimethyl-1,6-hexanedio-1 thiodiethanol, 1,2-cyclohexanedimethanol, 1,3-cyclohexanedimethanol, 1,4-cyclohexanedimethanol, 2,2,4,4-tetra-methyl-1,3-cyclobutanediol, and p-xylylenediol. The sulfopolyester can also comprise a mixture of glycols.

Diols also includes polyfunctional alcohols (polyols). Examples of polyols include neopentyl glycol; butylene glycol; 1,4-butanediol, hexylene glycol; 1,6-hexanediol; the polyglycols such as diethylene glycol or triethylene glycol and the like; the triols such as glycerine, trimetylol ethane, trimethylol propane and the like; and other higher functional alcohols such as pentaerythritol, sorbitol, mannitol, and the like.

The diol residues may include from 25 mole % to 100 mole %, based on the total diol residues, residues of a poly(ethylene glycol) having a structure

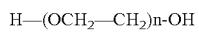

wherein n is an integer in the range of 2 to 500. Non-limiting examples of lower molecular weight polyethylene glycols, e.g., wherein n is from 2 to 6, are diethylene glycol, triethylene glycol, and tetraethylene glycol. Of these lower molecular weight glycols, diethylene, and triethylene glycol are exemplars. Higher molecular weight polyethylene glycols (abbreviated herein as "PEG"), wherein n is from 7 to 500, include the commercially available products known under the designation CARBOWAX®, a product of Dow Chemical Company (formerly Union Carbide). Typically, PEGs are used in combination with other diols such as, for example, diethylene glycol or ethylene glycol. Based on the values of n, which range from greater than 6 to 500, the molecular weight may range from greater than 300 to 22,000 g/mol. The molecular weight and the mole % are inversely proportional to each other; specifically, as the molecular weight is increased, the mole % will be decreased in order to achieve a designated degree of hydrophilicity. For example, it is illustrative of this concept to consider that a PEG having a molecular weight of 1000 may constitute up to 10 mole % of the total diol, while a PEG having a molecular weight of 10,000 would typically be incorporated at a level of less than 1 mole % of the total diol.

Certain dimer, trimer, and tetramer diols may be formed in situ due to side reactions that may be controlled by varying the process conditions. For example, varying amounts of diethylene, triethylene, and tetraethylene glycols may be formed from ethylene glycol from an acid-catalyzed dehydration reaction which occurs readily when the polycondensation reaction is carried out under acidic conditions. The presence of buffer solutions, well-known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyester of the present disclosure may include from 0 to 25 mole %, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from 0 to 20 mole % and from 0 to 10 mole %. The presence of a branching monomer may result in a number of possible benefits to the sulfopolyester of the present disclosure such as the ability to tailor rheological, solubility, and tensile properties. For example, at a constant molecular weight, a branched sulfopolyester, compared to a linear analog, will also have a greater concentration of end groups that may facilitate post-polymerization croslinking reactions. At high concentrations of branching agent, however, the sulfopolyester may be prone to gelation.

In one embodiment or in combination with any of the mentioned embodiments, the sulfopolyesters described herein comprise the following structural formula (Formula I):

Formula I

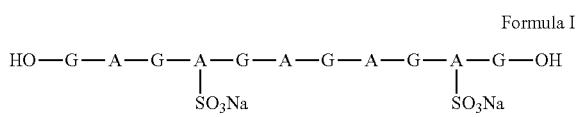

wherein A is a dicarboxylic acid repeat unit and G is a glycol repeat unit. Examples of dicarboxylic acid repeat units A include but are not limited to terephthalic acid, isophthalic acid and/or 1,4-cyclohexane dicarboxylic acid (1,4-CHDA). Examples of glycol repeat units G include but are not limited to ethylene glycol (EG), Diethylene glycol (DEG), triethylene glycol (TEG), neopentyl glycol (NPG), and/or 1,4-cyclohexane dimethanol (CHDM). The following are illustrative monomer residues:

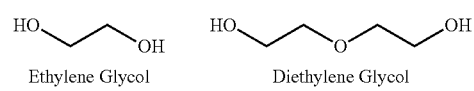

Ethylene Glycol　　　　　Diethylene Glycol

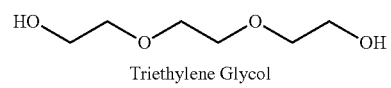

Triethylene Glycol

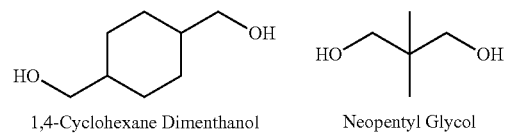

1,4-Cyclohexane Dimenthanol　　　　Neopentyl Glycol

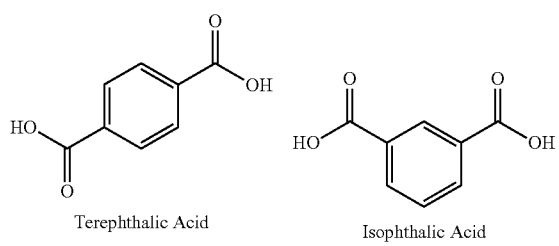

Terephthalic Acid　　　　　Isophthalic Acid

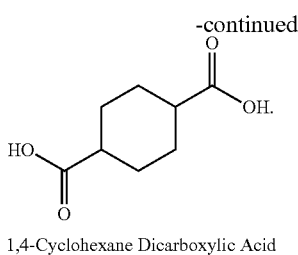

1,4-Cyclohexane Dicarboxylic Acid

As an example, the sulfopolyester can include the following structural formula:

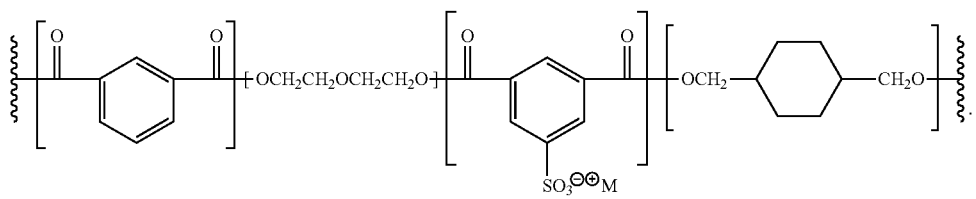

In one embodiment or in combination with any of the mentioned embodiments he sulfopolyesters useful in the present disclosure have a glass transition temperature, abbreviated herein as "$T_g$", of at least 25° C. as measured on the dry polymer using standard techniques, such as differential scanning calorimetry ("DSC"), well known to persons skilled in the art. The $T_g$ measurements of the sulfopolyesters of the present disclosure are conducted using a "dry polymer", that is, a polymer sample in which adventitious or absorbed water is driven off by heating to polymer to a temperature of 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by a large, broad endotherm), cooling the sample to room temperature, and then conducting a second thermal scan to obtain the $T_g$ measurement. Further examples of glass transition temperatures exhibited by the sulfopolyester are at least 30° C., at least 35° C., at least 40° C., at least 50° C., at least 60° C., at least 65° C., at least 80° C., and at least 90° C., and in addition or in the alternative, up to 100° C., or up to 110° C. or up to 120° C. Although other $T_g$'s are possible, typical glass transition temperatures of the dry sulfopolyesters of the present disclosure are 30° C., 48° C., 55° C., 65° C., 70° C., 75° C., 85° C., and 90° C.

In one embodiment or in combination with any of the mentioned embodiments, the sulfopolyester comprises:
(i) residues of one or more dicarboxylic acids;
(ii) 2 to 20 mole %, based on the total moles of diacid or diol residues, of residues of at least one sulfomonomer having two functional groups and one or more sulfonate groups attached to an aromatic or cycloaliphatic ring wherein the functional groups are hydroxyl, carboxyl, or a combination thereof;
(iii) one or more diol residues wherein at least 25 mole %, based on the total diol residues, is a poly(ethylene glycol) having a structure H—(OCH$_2$—CH$_2$)n-OH wherein n is an integer in the range of 2 to 500; and
(iv) 0 to 25 mole %, based on the total repeating units, of residues of a branching monomer having three or more functional groups wherein the functional groups are hydroxyl, carboxyl, or a combination thereof.

In one embodiment or in combination with any of the mentioned embodiments, the sulfopolyester has a $T_g$ of at least 25° C. and comprises:
(i) residues of one or more dicarboxylic acids;
(ii) 4 to 40 mole %, based on the total repeating units, of residues of at least one sulfomonomer having two functional groups and one or more metal sulfonate groups attached to an aromatic or cycloaliphatic ring wherein the functional groups are hydroxyl, carboxyl, or a combination thereof;
(iii) one or more diol residues wherein at least 20 mole %, based on the total diol residues, is a poly(ethylene glycol) having a structure H—(OCH$_2$—CH$_2$)n-OH wherein n is an integer in the range of 2 to 500;
(iv) 0 to 25 mole %, based on the total repeating units, of residues of a branching monomer having three or more functional groups wherein the functional groups are hydroxyl, carboxyl, or a combination thereof.

In one embodiment or in combination with any of the mentioned embodiments, the sulfopolymer or sulfopolyester used in an agricultural formulation is not lyophilized.

As the agricultural industry is shifting more to blends of active ingredients (for instance, due to the high cost and low probability of getting a new active ingredient registered), the complexity of the formulations has increased significantly. It is not unusual for two active ingredients to require different adjuvant packages, which in combination are incompatible, resulting in crystallization, gelation, or some other form of formulation failure. It would be advantageous to have an adjuvant with functionality and effectiveness across a broad range of formulation types. The sulfopolymers (such as sulfopolyesters) described herein have excellent properties as surfactants effective for emulsification or suspension of myriad different types of agrochemical formulations. The sulfopolymers of the present disclosure have been shown to be effective in suspension concentrate and emulsion concentrate formulations, providing flexibility to the industry. Additionally, the sulfopolymers of the present disclosure have beneficial physical properties because of their polymeric nature. As a result, once dried on the surface of a leaf or pest, they could improve the rainfastness of the pesticide, rendering the active more effective. Or, due to the hydrophobic, hydrophilic nature of the polymeric structure, they provide excellent adhesion of aqueous solutions to hydrophobic surfaces, like the waxy surface of a leaf providing advantages as a sticker adjuvant. Therefore, it is unexpected but beneficial that the sulfopolymers of the present disclosure would be able to replace more than one adjuvant in a formulation, rendering formulations stable without additional adjuvants, more broadly compatible, and/or more cost effective.

(IV) RECOVERED SULFOPOLYESTERS

The compositions, formulations, and methods described herein can operate either with virgin sulfopolyesters or with recovered sulfopolyesters. By way of example, an exemplary method of recovering sulfopolyester from a composite material, wherein the method includes: washing the composite material with a solvent composition to remove a portion of surface impurities to form a washed composite material; wherein the washing is conducted at a temperature where less than 2% of the water-dispersible sulfopolyester is removed from the composite material; and wherein the composite material comprises a water-dispersible sulfopolyester and one or more water non-dispersible polymers; opening the washed composite material with water at a temperature of greater than 60° C. to produce an aqueous dispersion and water non-dispersible polymers; wherein said aqueous dispersion comprises sulfopolyester; and recovering sulfopolyester from the aqueous dispersion.

In one embodiment or in combination with any of the mentioned embodiments, the process of recovering the sulfopolyester includes washing the material composed of sulfopolyester at a temperature of less than 60° C. with a wash solvent composition, opening the washed composite material at a temperature of greater than 60° C., and recovering sulfopolyester from the aqueous dispersion in the form of an aqueous dispersion, concentrated aqueous dispersion, a solid, or a polymer melt.

The starting materials used in the process described herein includes composite materials (composite) composed of sulfopolyester and from which the sulfopolyester is being recovered. The term "composite material" refers to material made from two or more constituent materials with different physical and chemical properties. The individual components remain separate and distinct in the final material. In one embodiment or in combination with any of the mentioned embodiments, the components of a composite material described herein include water-dispersible sulfopolyester and one or more water non-dispersible polymers.

In one embodiment or in combination with any of the mentioned embodiments, the starting material is composite material comprising fibers. The term "fiber" includes continuous fibers, staple fibers, short cut fiber, long fiber, and multicomponent fibers.

The process of recovering the sulfopolyester described herein includes washing the composite material composed of sulfopolyester at a temperature of less than 60° C. with a solvent composition (wash solvent) for a period of time to remove impurities on the surface of the composite material prior to opening of the fiber.

Washing the composite material with wash solvent composition produces washed composite material and wash mother liquor. After the wash, the washed composite material is ready to be opened.

In one embodiment or in combination with any of the mentioned embodiments, the first and second mother liquor includes the aqueous dispersion of sulfopolyester.

Next, water is removed from the aqueous dispersion to recover the sulfopolyester. Water can be removed from the aqueous dispersion by evaporation or by precipitation to produce recovered sulfopolyester. The term "recovered sulfopolyester" refers to sulfopolyester obtained by the process described herein including a washing step and can be in the form of a solid including some moisture or a concentrated sulfopolyester dispersion. The recovered sulfopolyester can also be in the form of a polymer melt.

Water can also be evaporated from the aqueous dispersion to obtain a sulfopolyester solid. The term "sulfopolyester solid" refers to sulfopolyester in solid form that includes some moisture. The moisture content of the sulfopolyester solid is less than 5 wt % relative to the total of wt. of the solid. In one embodiment or in combination with any of the mentioned embodiments, the moisture content is less than 4 wt %, or not more than 3 wt %, or not more than 2 wt %, or not more than 1 wt %, or not more than 0.5 wt %, relative to the total wt. of the solid.

The term "concentrated sulfopolyester dispersion" refers to an aqueous dispersion that has been further processed to remove water to increase the concentration of the sulfopolyester. The sulfopolyester in the concentrated dispersion is between 1 wt % to 40 wt %, between 1 wt % to 35 wt %, between 5 wt % to 30 wt %, between 10 wt % to 30 wt %, between 15 wt % to 30 wt %, between 20 wt % to 30 wt %, or between 25 wt % to 30 wt %, relative to the total weight of the concentrated sulfopolyester dispersion.

In one embodiment or in combination with any of the mentioned embodiments, heat can be applied to the concentrated sulfopolyester dispersion to obtain a polymer melt. The polymer melt contains very little water and upon cooling forms a solid sulfopolyester.

In one embodiment or in combination with any of the mentioned embodiments, the recovered sulfopolyester is in the form of a dispersion comprising recovered sulfopolyester and a solvent composition, and the dispersion comprises 0.01 wt % to 5 wt % impurities, relative to the total weight of the dispersion. The dispersion can be a concentrated recovered sulfopolyester dispersion. The dispersion can also be diluted with water at a volumetric ratio of 1:1, 1:2, 1:3, 1:4, 1:5, 1:10, 1:20, 1:30, 1:50, or 1:100.

In one embodiment or in combination with any of the mentioned embodiments, the recovered sulfopolyester is a washed (pre-washed) recovered sulfopolyester dispersion comprising recovered sulfopolyester and a solvent composition; wherein the dispersion has an impurity level ranging from 0.01 wt % to 5 wt %, relative to the total weight of the dispersion. The term "washed recovered sulfopolyester" or "pre-washed recovered sulfopolyester" refers to sulfopolyester that has been recovered from material and the recovery process includes a washing (pre-washing) step prior to opening and/or mixing with treated water.

In one embodiment or in combination with any of the mentioned embodiments, the amount of impurities in the dispersions described herein ranges from 0.1 wt % to 4.5 wt %, 0.1 wt % to 4.0 wt %, 0.1 wt % to 3.5 wt %, 0.1 wt % to 3.0 wt %, 0.1 wt % to 2.5 wt %, 0.1 wt % to 2.0 wt %, 0.1 wt % to 1.5 wt %, 0.1 wt % to 1.0 wt %, 0.1 wt % to 0.5 wt %, 0.1 wt % to 0.4 wt %, 0.1 wt % to 0.3 wt %, or 0.1 wt % to 0.2 wt %, relative to the total weight of the dispersion.

In one embodiment or in combination with any of the mentioned embodiments, the recovered sulfopolyester is a washed (pre-washed) recovered sulfopolyester dispersion comprising recovered sulfopolyester and solvent composition, and the dispersion has a reduced impurity concentration of at least 80%, 82%, 85%, 87%, 90%, 92%, 95%, or 97%. or more compared to non-prewashed recovered sulfopolyester dispersion.

In one embodiment or in combination with any of the mentioned embodiments, the recovered sulfopolyester is a washed (pre-washed) recovered sulfopolyester dispersion wherein the dispersion comprises substantially a two-phase system. The dispersion comprises mostly a water phase and a sulfopolyester phase. In one embodiment or in combination with any of the mentioned embodiments, the dispersion can comprise impurities as described above. Depending on the impurity, for example if the impurity is oil, there may be another phase, containing a small amount of the impurity.

The recovered sulfopolyester described herein includes washed (or pre-washed) sulfopolyester in solid form comprising 0.01 wt % to 5 wt % impurities or reduced impurity concentration of at least 80% or more as compared to non-pre-washed recovered sulfopolyester dispersion.

The washed (pre-washed) recovered sulfopolyester has a glass transition temperature ($T_g$) of 25° C. to 120° C., 30° C. to 120° C., 35° C. to 120° C., 40° C. to 120° C., 50° C. to 120° C., 60° C. to 120° C., 65° C. to 120° C., 70° C. to 120° C., 75° C. to 120° C., or 80° C. to 120° C.

The recovered sulfopolyester is both hydrophilic and hydrophobic. The recovered sulfopolyester includes: (A) residues of one or more dicarboxylic acids; (B) 4 to 40 mole %, 4 to 40 mole %, 5 to 30 mole %, 6 to 20 mole %, 7 to 15 mole %, or 8 to 10 mole %, based on the total repeating units, of residues of at least one sulfomonomer comprising two functional groups and one or more sulfonate groups attached to an aromatic or cycloaliphatic ring wherein the functional groups are hydroxyl, carboxyl, or a combination thereof; (C) one or more diol residues ranging from 10 to 100% mole %, 10 to 90 mole %, 10 to 80 mole %, 15 to 75 mole %, 20 to 60 mole %, 20 to 55 mole %, 20 to 50 mole %, or 20 to 40 mole %, based on the total diol residues, is a poly(ethylene glycol) having the structure $H(OCH_2CH_2)_nOH$, wherein n is an integer in the range of 2 to 500, 2 to 100, 2 to 75, 2 to 50, 2 to 25, 2 to 20, 2 to 15, 2 to 10, 2 to 9, 2 to 8, 2 to 7, 2 to 6, 2 to 5, or 2 to 4; and 0 to 25 mole %, 0 to 20 mole %, 0 to 15 mole %, 0 to 10 mole %, 0 to 5 mole %, 0 to 4 mole %, 0 to 3 mole %, 0 to 2 mole %, or 0 to 1 mole %, based on the total repeating units, of residues of a branching monomer having 3 or more functional groups wherein the functional groups are hydroxyl, carboxyl, or a combination thereof. The dicarboxylic acids and diols or hydroxyl bearing compounds can be any of those mentioned in this disclosure and can have the same type of repeating units as the sulfopolymers described above.

(V) ADDITIONAL COMPONENTS IN FORMULATIONS

In addition to the sulfopolymer component, formulations provided herein include one or more additional ingredients. By way of example, these additional ingredients in one embodiment or in combination with any of the mentioned embodiments will include one or more of: active ingredient(s) (such as pesticides, fertilizers, plant growth regulators and/or retardants, growth stimulators, flowering/fruiting inhibitors, harvest aids, defoliants, dehiscence inhibitors), rosins, adjuvants (such as emulsifiers, spreaders, stickers, drift control agents, rainfastness agents, surfactants, anti-caking agents, antifreeze agents, components to regulate respiration (water loss or gain)), water immiscible phase, and other additional optional ingredients (such as viscosity reducing agents, solubilizers, dispersal agents, anti-foamers, stabilizers, preservatives, antioxidants, pH regulators, sequestrants/chelators, solvents, additional polymers, odorants, and colorants or other markers, such as foam markers).

One of ordinary skill will recognize that individual active ingredients and other optional components are more (or less) readily included into different types of formulation(s). It is within ordinary skill to select which ingredient, or which form of an ingredient, to use in, for instance, a suspension formulation, an emulsion (either oil-in-water or water-in-oil), or a solvent dispersion (such as an oil dispersion). Selection of one or more ingredients in any one formulation may be influenced by the target application, the specific active ingredient being employed, other component(s) in the formulation, the environment in which the formulation will be used, and so forth. Likewise, it is within the knowledge and ability of one of ordinary skill to determine, including through empirical study, appropriate amounts of each additional component in a formulation.

(i) Active Ingredient(s)

The sulfopolymer containing formulations provided herein in one embodiment or in combination with any of the mentioned embodiments include one or more agrochemical active ingredient(s). Generally speaking, this can be any chemical or compound that has a selected biological activity. By way of example, active agents include chemicals, compounds, and mixtures that have one or more of acaricidal activity, bactericidal activity, fungicidal activity, herbicidal activity, insecticidal activity, larvicidal activity, nematocidal activity, miticidal activity, molluscicidal activity, piscicidal activity, rodenticidal activity, or slimicidal activity. Also contemplated are pest repellants. Additional active agents may include chemicals, compounds, or mixtures that modify, support, or enhance plant growth, such as a fertilizer, a hormone and/or other growth regulator. Additional active ingredients are listed herein. The following paragraphs provide non-exhaustive lists of contemplated agrochemical active ingredients.

Pesticides

Any of the sulfopolymer-containing formulations described herein may also optionally include one or more pesticides as active ingredients. Generally, pesticides are substances, or a mixture of substances intended for destroying, repelling, or mitigating any unwanted pest(s), including particularly any organism that may have a negative impact on a crop. The term pesticide describes a broad category that includes acaricides (to eradicate ticks and mites), bactericides, fungicides, herbicides, insecticides, larvicides, miticides, molluscicides, nematicides, piscicides, rodenticides, and slimicides (anti-slime agents). The following paragraphs provide non-limiting, representative examples of various pesticides; additional examples, including biopesticide examples, will be recognized by those of ordinary skill in the art.

Algicides: Any of the sulfopolymer containing formulations described herein may also optionally include one or more algicides as an active ingredient, which are used to mitigate the effects of algae damage on agricultural production. Useful algicides include bethoxazin, copper dioctanoate, copper sulfate, cybutryne, dichlone, dichlorophen, endothal, fentin, hydrated lime, nabam, quinoclamine, quinonamid, simazine, triphenyltin acetate, and triphenyltin hydroxide.

Bactericides: Any of the sulfopolymer containing formulations described herein may also optionally include one or more bactericides as an active ingredient, which are used to mitigate the effects of bacterial damage or predation on agriculture. Useful bactericides include copper hydroxide, copper octanoate, copper oxychloride sulfate, copper sulfate, copper sulfate pentahydrate, kasugamycin, sodium hypochlorite, streptomycin sulfate.

Fungicides: Any of the sulfopolymer containing formulations described herein may also optionally include one or more fungicide as an active ingredient, which are used to mitigate the effects of fungi damage or predation on agricultural production. Useful fungicides include azoxystrobin, trifloxystrobin, kresoxim methyl, famoxadone, metominostrobin and picoxystrobin, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, metam, thiram, ziram, captafol, captan, folpet, fluazinam, flutolanil, carboxin, natural terpene extracts, such as carvacrol and thymol, metalaxyl, bupirimate, ethirimol, dimoxystrobin, fluoxastrobin, orysastrobin, metominostrobin, prothioconazole, 8-(2,6-diethyl-4-methyl-phenyl)tetrahydropyrazolo [1,2-d][1,4,5]oxadiazepine-7,9-dione, 2,2,-dimethyl-propionic acid-8-(2,6-diethyl-4-methyl-phenyl)-9-oxo-1,2,4,5-tetrahydro-9H-pyrazolo-[1,2d][1,4,5]oxadiazepine-7-yl ester and metalaxyl.

Herbicides: Any of the sulfopolymer containing formulations described herein may also optionally include one or more herbicides as an active ingredient, which are used to mitigate the effects of unwanted vegetation on agricultural production. Useful herbicides include fluzifop, mesotrione, fomesafen, tralkoxydim, napropamide, amitraz, propanil, cyprodanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluoroglycofen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, N-phosphonomethylglycine and its salts (glyphosate), glufosinate, chlormequat chloride, paraquat, diquat, trifloxysulfuron, fomesafen, mesotrione, fenuron, 2,2-dichloropropionic acid, amitrole, aminopyralid, asulam, aviglycine hydrochloride.

Insecticides: Any of the sulfopolymer containing formulations described herein may also optionally include one or more insecticides as an active ingredient, which are used to mitigate the effects of insect damage or predation on agricultural production. Useful insecticides include abamectin, acephate, acetamiprid, acrinathrin, alanycarb, aldicarb, allethrin, alpha-cypermethrin, amitraz, azadirachtin, azamethiphos, azinphos-ethyl, azinphos-methyl, bendiocarb, benfuracarb, bensultap, beta-cyfluthrin, beta-cypermethrin, bifenthrin, bioallethrin, bioresmethrin, bistrifluron, borax, buprofezin, butoxycarboxim, cadusafos, carbaryl, carbofuran, chlorpropham, clothianidin, cyfluthrin, cyhalothrin, cyprmethrin, deltamethrin, diethofencarb, diflubenzuron, dinotefuran, emamectin, endosulfan, fenoxycarb, fenthion, fenvalerate, fipronil, halfenprox, heptachlor, hydramethylnon, imidacloprid, imiprothrin, isoprocarb, lambda cyhalothrin, methamidophos, methiocarb, methomyl, nitenpyram, omethoate, permethrin, pirimicarb, pirimiphos methyl, propoxur, tebufenozide, terpenes, thiamethoxam, thiodicarb, triflumoron, and xylylcarb.

Miticides: Any of the sulfopolymer containing formulations described herein may also optionally include one or more miticides as an active ingredient, which are used to mitigate the effects of mite damage or predation on agricultural production. Useful miticides include antibiotic miticides, carbamate miticides, formamidine miticides, mite growth regulators, organochlorine, permethrin and organophosphate miticides.

Molluscicides: Any of the sulfopolymer containing formulations described herein may also optionally include one or more molluscicides as an active ingredient, which are used to mitigate the effects of mollusk (e.g., slug or snail) damage or predation on agriculture. Usable molluscicides include metaldehyde, methiocarb and aluminum sulfate.

Nematicides: Any of the sulfopolymer containing formulations described herein may also optionally include one or more nematicide as an active ingredient, which are used to mitigate the effects of nematode damage or predation on agriculture. Usable nematicides include: 1,3-dichloropropene, neem extracts, carbamates, garlic-derived polysulfides, marigold (Tagetes) extracts, and so forth.

Pheromones: Any of the sulfopolymer containing formulations described herein may also optionally include one or more pheromones as an active ingredient, which are used to mitigate the effects of insect damage or predation on agricultural production. Useful pheromones include (Z)-9-tricosene, 14-methyl-1-octadecene and the like, acetate compounds such as (E)-5-decenyl acetate, (E)-4-tridecenyl acetate, (Z)-7-dodecenyl acetate, (Z)-8-dodecenyl acetate, (Z)-9-dodecenyl acetate, (E)-9-dodecenyl acetate, 11-dodecenyl acetate, (E,Z)-7,9-dodecadienyl acetate, (Z)-7-tetradecenyl acetate, (Z)-9-tetradecenyl acetate, (Z)-11-tetradecenyl acetate, (Z)-11-hexadecenyl acetate, (E,Z)-3,13-octadecadienyl acetate, (E,Z)-2,13-octadecadienyl acetate, (Z,Z)-3,13-octadecadienyl acetate, (Z,E)-9,11-tetradecadienyl acetate, (Z,E)-9,12-tetradecadienyl acetate, (Z,Z/E)-7,11-hexadecadienyl acetate and the like, aldehyde compounds such as (Z)-7-tetradecenal, (Z)-9-tetradecen-al, (Z)-11-tetradecenal,(Z)-7-hexadecenal, (Z)-9-hexadecenal,(Z)-11-hexadecenal,n-hexadecanal,(Z,Z)-11,13-hexadecadienal, (Z)-13-octadecenal and the like and ketone compounds such as (Z)-13-icosen-10-one and the like as well as mixtures thereof and mixtures mainly composed thereof with other compounds.

Fertilizers

Another category of active ingredient that is included in one embodiment or in combination with any of the mentioned embodiments of the provided agricultural formulations and compositions is fertilizers. Thus, any of the sulfopolymer containing formulations described herein may also optionally include one or more fertilizers as active ingredient(s). Fertilizers are natural or artificial substances that include one or more chemical elements that improve growth and productiveness of plants. Fertilizers enhance the natural fertility of a growth medium (such as soil) or replace the chemical elements taken from the growth medium by previous crops. Modern chemical fertilizers include one or more of the three elements that are most important (main macronutrients) in plant nutrition: nitrogen (N; particularly useful for leaf growth), phosphorus (P; particularly useful for development of roots, flowers, seeds, and fruit), and potassium (K; beneficial for strong stem growth, movement of water in plants, and promotion of flowering and fruiting). Of secondary importance are the elements sulfur (S), magnesium (Mg), and calcium (Ca) (referred to as secondary macronutrients). Optionally, fertilizers may include one or more micronutrients: copper (Cu), iron (Fe), manganese (Mn), molybdenum (Mo), zinc (Zn), boron (B). Of occasional significance are silicon (Si), cobalt (Co), and vanadium (V).

Nitrogen fertilizers may be obtained from synthetic ammonia ($NH_3$); this chemical compound is used either as a gas or in a water solution, or it is converted into salts such as ammonium sulfate, ammonium nitrate, and ammonium phosphate. Ammonium can also be made from waste streams, such as packinghouse wastes, treated garbage, sewage, and manure. Phosphorus fertilizers include calcium phosphate derived from phosphate rock or bones. The more soluble superphosphate and triple superphosphate preparations are obtained by the treatment of calcium phosphate with sulfuric and phosphoric acid, respectively. Potassium fertilizers, namely potassium chloride and potassium sulfate, are mined from potash deposits. Mixed fertilizers contain more than one of the three major nutrients—nitrogen, phosphorus, and potassium. Mixed fertilizers can be formulated in myriad ways, which are well known to those of ordinary skill in the art.

Particularly contemplated herein are fertilizer compositions and formulations intended to be applied as liquids. Examples of liquid fertilizers include one or more of aqueous solutions of ammonia, aqueous solutions of ammonium nitrate, or urea; these concentrated nitrogenous products may be diluted with water to form a concentrated liquid fertilizer (e.g., UAN). Advantages of liquid fertilizer are its more rapid effect and easier coverage. The addition of fertilizer to irrigation water is called "fertigation". Foliar fertilizers are applied directly to leaves; foliar fertilization is usually used to apply water-soluble nitrogen fertilizers, for instance for high value crops such as fruits. Foliar fertilizers are also gaining popularity with home and hobby gardeners.

Plant Growth Regulators

In representative examples, it is desirable to modify the growth rate or development of a desired plant, such as increasing stalk thickness or growth rate of fruits and vegetables through the application of a plant growth regulator. As such, any of the sulfopolymer containing formulations described herein may also optionally include one or more plant growth regulators as active ingredient(s). Compositions that are useful for this purpose can contain one or more growth stimulants or plant growth regulators, such as cytokinins up to 4 wt. %, gibberellins up to 4 wt. %, auxins up to 4 wt %, ethylene, abscisic acid up to 4 wt. % or combinations thereof. These concentrations when diluted to produce concentrations in the range of 0.01-0.04 wt % promote growth. When combined together at a ratio of 0.85:1.0 up to 1:1, plant growth stimulants have similar effects, but the growth stimulants can be used alone or in combination. If the concentrations of the plant growth stimulants are increased 10 to 100 times from what is listed, they can also act as herbicides.

Plant Growth Retardants

In representative examples, it is desirable to retard the growth rate of many plants. As such, any of the sulfopolymer containing formulations described herein may also optionally include one or more plant growth regulators as active ingredient(s). Chemicals that are useful to this end include: compounds with quaternary ammonium, phosphonium or sulphonium moieties, flurprimidol, paclobutrazol, uniconazole ancymidol, acylcylcohexanediones (such as trinexapac-ethyl and prohexadione-Ca), daminozide, minoethoxyvinylglycine, brassinolide, forchlorfenuron, hymexazol, thiametoxam), and other plant regulators (such as benzofluor, buminafos, carvone, ciobutide, clofencet, cloxyfonac, cyanamide, cyclanilide, cycloheximide, cyprosulfamide, epocholeone, ethychlozate, fenridazon, heptopargil, holosulf, inabenfide, karetazan, lead arsenate, methasulfocarb, prohexadione, pydanon, sintofen, triapenthenol. Abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, 2,3,5-triiodobenzoic acid), morphactins (chlorfluren, chlorflurenol, dichlorflurenol, flurenol), and aviglycine hydrochloride.

Growth Stimulators

Any of the sulfopolymer containing formulations described herein may also optionally include one or more growth stimulator as active ingredient(s), including for instance: Aminooxyacetic acid, rhizobitoxine, and methoxyvinyl glycine, silver thiosulfate, and 2,5-norbornadiene. Bras sinolide, forchlorfenuron, hymexazol, 2-amino-6-oxypurine derivatives, indolinone derivates, 3,4-disubstituted maleimide derivatives, and fused azepinone derivatives.

Flowering/Fruiting Inhibitors

Any of the sulfopolymer containing formulations described herein may also optionally include one or more flowering and/or fruiting inhibitors as active ingredient(s) including for instance: Copper sulfate, zinc sulphate, diallyl disulfide, dinitro-ortho-cresol, calcium cyanamide, hydrogen cyanamide, potassium nitrate, sodium azide, calcium ammonium nitrate, urea, thidiazurone, and thiourea are possible flowering and/or fruiting inhibitors.

Additional Active Ingredients

Additional examples of active compounds for agricultural use (at least some of which fit into a category listed above) include: 1,4-dimethylnaphthalene, 1-methylcyclopropene, 1-naphthylacetic acid (NAA), 2-hydroxy benzoic acid, 3-bromo-1-chloro-5,5-dimethylhydantoin, 8-hydroxyquinoline sulphate, *Agrobacterium radiobacter*, aluminum phosphide, ammonium thiosulphate, azoxystrobin, *Bacillus subtilis, Bacillus subtilis* qst 713, *Bacillus thuringiensis* var aizawai (abbott 1857), *Bacillus thuringiensis* var aizawai/kurstaki, *Bacillus thuringiensis* var kurstaki (h-3a,3b hdl), *Bacillus thuringiensis* var kurstaki (h-3a,3b, hd 263), *Bacillus thuringiensis* var kurstaki (h-3a,3b, sa-1 1), *Beauvaria bassiana* (k4b1), benalaxyl, benomyl, bentazone, benzalkonium chloride, bifenthrin, bordeaux mixture, boscalid, brodifacoum, bromacil, bromadiolone, bromopropylate, bromoxynil, bupirimate, buprofezin, calcium polysulfide, canola oil, captan, carbaryl, carbendazim, carboxin, carfentrazone-ethyl, chitosan, chloralose, chlorethephon, chloridazon, chlorimuron-ethyl, chlormequat-chloride, chloropicrin, chlorothalonil, chlorpropham, chlorpyrifos, chlorsulfuron, chlorthal-dimethyl, cholecalciferol, clethodim, clodinafop-propargyl, clofentezine, clomazone, clopyralid, clopyralid present as clopyralid monoethanolamine, clothianidin, copper, copper (i) oxide, copper ammonium acetate, copper hydroxide, copper oxychloride, copper sulphate, powdered, coumatetralyl, cresol (all isomers), cyanazine, cydia pomonellla granulosis virus, mexican strain, cyfluthrin, cymoxanil, cypermethrin, cyproconazole, cyprodinil, cyromazine, daminozide, dazomet, deltamethrin, desmedipham, diazinon, dicamba, dichlobenil, dichlorprop-p, dichlorvos, dicloran, dicofol, difenoconazole, diflubenzuron, diflufenican, dimethenamid, dimethoate, dimethomorph, diphacinone, diquat, diquat present as diquat dibromide, dithianon, diuron, dodine, emamectin benzoate, endosulfan, endothal, epoxiconazole, esfenvalerate, ethofumesate, ethyl formate, etridiazole, fatty acids, fatty acids (potassium salts), fenamidone, fenamiphos, fenarimol, fenhexamid, fenitrothion, fenoxaprop-p-ethyl, fenpropidin, fenpropimorph, fenpyroximate, fipronil, flazasulfuron, flocoumafen, fluazifop-p-butyl, fluazinam, fludioxonil, flumethrin, flumetsulam, fluoxastrobin, fluroxypyr, flusilazole, flusulfamide, flutriafol, folpet, forchlorfenuron, fosetyl-aluminum, fuberidazole, furathiocarb, gibberellic acid, gibberellin a4/a7, glufosinate-ammonium, glyphosate, glyphosate present as glyphosate potassium and glyphosate triethanolamine, glyphosate present as glyphosate-potassium, halosulfuron-methyl, haloxyfop, haloxyfop [(r)-isomer], hexazinone, hydrogen cyanamide, hydrogen cyanide, imazalil, imazapyr, imazethapyr, imidacloprid, indolebutyric acid, indoxacarb, iodocarb, iodosulfuron-methyl-sodium, ioxynil, iprodione, iprovalicarb, iron phosphate, iron sodium edta, isoproturon, kresoxim-methyl, lambda-cyhalothrin, lecanicillium lecanii (strain k4v1), lecanicillium lecanii blastospores (strain k4v2), 1-flamprop-isopropyl, linuron, lubricating oils, petroleum, c15-30, hydrotreated neutral oil-based, contg. solvent deasphalted residual oil, lufenuron, magnesium phosphide, maldison, maleic hydrazide, mancozeb, mandipropamid, mcpa, mcpb, mecoprop, mecoprop-p, mepiquat-chloride, mesotrione, metalaxyl, metalaxyl-m, metaldehyde, metam sodium, metamitron, methabenzthiazuron, methamidophos, methiocarb, methomyl, methoxyfenozide, methyl bromide, methyl canolate, metiram, metribuzin, metsulfuron-methyl, milbemectin, mineral oil, myclobutanil, n6-benzyladenine, neem seed kernel extract, nicosulfuron, novaluron, oils-mineral-insecticidal, oleic acid, oryzalin, oxadiazon, oxamyl, oxyfluorfen, paclobutrazol, palm oil derived fatty acids, *Pantoea agglomerans*, strain p10c, paraffin oil, paraquat, paraquat present as paraquat dichloride, penconazole, pencycuron, pendimethalin, permethrin, phenmedipham, phorate, phosphorous acid, phosphorus, picloram, picloram present as picloram monoethanolamine, picloram present as picloram triethanolamine, picoxystrobin, pindone, pine oil, pinoxaden, piperonyl butoxide, pirimicarb, pirimiphos-methyl, potassium bicarbonate, potassium cyanide, primisulfuron-methyl, prochloraz, procymidone, prohexadione-calcium, prometryn, propachlor, propamocarb, propargite, propazine, propham, propiconazole, propineb, propyzamide, prothioconazole, prothiofos, pymetrozine, pyraclostrobin, pyrethrins, pyridate, pyrimethanil, quinoxyfen, quintozene, quizalofop-p-ethyl, rabbit calicivirus (rcd), rotenone, serratia entomophila (strain 626), sethoxydim, simazine, s-metolachlor, sodium cyanide, sodium fluoroacetate, sodium tetrathiocarbonate, spinetoram, spinosad, spiromesifen, spirotetramat, spiroxamine, steinernema feltiae, sulfentrazone, sulphur, sulphur present as poysulphide sulphur, tau-fluvalinate, TCA, tebuconazole, tebufenozide, terbacil, terbufos, terbuthylazine, terbutryn, thiabendazole, thiacloprid, thiamethoxam, thidiazuron, thifensulfuron-methyl, thiodicarb, thiophanate-methyl, thiram, thymol, tolclofos-methyl, tolylfluanid, tralkoxydim, triadimefon, triadimenol, tri-allate, tribenuron-methyl, trichlorfon, trichoderma atroviride (1c52), trichoderma harmatum, *Trichoderma harzianum* rifai (5 strains), triclopyr, triclopyr butoxyethyl ester: triclopyr bee, trifloxystrobin, trifluralin, triforine, trinexapac-ethyl, ulocladium oudemansii, and Ziram. Also contemplated are compounds or mixtures that influence respiration/water loss regulation, drought resistance, and fruit anti-cracking; see for instance U.S. Pat. No. 8,752,328.

(ii) Rosin(s)

Rosins are a solid form of resin obtained from pines and some other plants, mostly conifers, produced by heating fresh liquid resin to vaporize the volatile liquid terpene components. Unrefined, it is semi-transparent and varies in color from yellow to black; it has a softening point usually under the boiling temperature of water. Rosin chiefly consists of various resin acids, especially abietic, neoabietic, palustric, and pimaric acids such as levopimaric acid. The acids can be free acids, dimers or trimers. The rosins can have a tricyclic backbone of abietane, pimarane, isopimarane, or bicyclic labdane The three main categories/sources of rosin resins are tall oil rosins, gum rosins, and wood rosins. For commercial uses, rosins are often purified and/or derivatized, in order to provide different characteristics. Derivatization may include one or more of disproportionation (which may provide improved stability), hydrogenation (which provides stability, different chemical compatibilities, decreased odor, and/or enhanced clarity), or esterification (which increases stability, modifies the molecular weight and acid number, and can alter softening/melting point as well as $T_g$).

Myriad commercially available rosins are useful in the formulations, compositions, and methods provided herein. Examples of rosins available commercially include: rosin esters (which generally are relatively more hydrophobic, and are generally more soluble in hydrocarbons), including methyl esters of rosin, glycerol esters of rosin, triethylene glycol esters of rosin, pentaerythritol esters of rosin, optionally any of said rosins being hydrogenated before or after derivatization (e.g.) esterification). Examples of specific rosins are those sold under the names of ABALYN™ D-E, FORALYN™ 5020-F, 90, and 110, METALYN™ 200, EASTMAN™ Ester Gum 8D, PERMALYN 5095, 5110, 6110, and 8120 STABELITE™ esters 10-E, 5-E, and 3-E, FORAL™ 85-E AND 105-E, PENTALYN™ H-3; as well as rosin resins (which generally have relatively more carboxylic acids and are more hydrophilic), such as DYMEREX™, STAYBELITE-E™, FORAL™ AX-E, FORALYN™ E, POLY-PALE™, ABITOL™-E, and DRESINATE™ 91 and TX. Eastman Chemical (Kingsport, TN) produces and sells a number of rosins; see information available online at eastman.com/Markets/Tackifier_Center/Tackifier_Families/Rosin_Resins/Pages/Rosin_Resins.aspx. Rosins from Florachem (Jacksonville, FL) are also contemplated, including: non-hydrogenated resins: FloraRez™ DR95, FloraRez™ DR105, FloraRez™ DR115, FloraRez™ DR140, FloraRez™ G85, FloraRez™ PE100; and hydrogenated resins: FloraRez™ LRL, FloraRez™ PR, FloraRez™ HR, FloraRez™ 120AA, FloraRez™ 485, FloraRez™ 785, FloraRez™ 100H, and FloraRez™ 440. Additional commercially available rosins include HERCOLYN® D, PEXALYN®, VINSOL®, and others produced by Pinova, Inc. (Brunswick, GA); Promax (Randers, Demark) rosin resins (e.g., the Protex™ line); FOREVEREST® specialty rosin resins (Xiamen, China); Novotrade rosins (Keemia, Estonia); DRT rosins (France); Kraton rosins (Belpre, OH); Arakawa Chemical Industries, Ltd. rosins (Osaka, Japan); and so forth.

In one embodiment or in combination with any of the mentioned embodiments provided herein, the rosin component is provided in (e.g., contained in or comprises) a water-immiscible or substantially water-immiscible phase, for instance in the water-immiscible component of a kit or system that provides or produces an agrochemical formulation, or comprises or is contained in a water immiscible phase of an emulsion or suspension.

(iii) Additional Adjuvant(s)

The sulfopolymer component of herein provided formulations is generally acting as an adjuvant. In representative embodiments, it may be beneficial to include one or more additional agriculturally acceptable adjuvant(s), to influence one or more characteristics of the formulation. One of ordinary skill will recognize adjuvants that can be used with the provided sulfopolymer containing formulations. The following paragraphs provide example adjuvant categories as well as specific example adjuvants; these lists are not intended to be exhaustive.

Emulsifiers

Any of the sulfopolymer containing formulations described herein may also optionally include one or more emulsifiers. One of ordinary skill will recognize that there are many agriculturally acceptable emulsifiers available, which may be useful in one embodiment or in combination with any of the mentioned embodiments of the current disclosure. By way of example, emulsifiers may include: alkanoic and alkenoic acids, monoesters and diesters of a-hydro-w-hydroxypoly (oxyethylene), glyceryl monostearate, and/or sodium metasilicate.

Spreaders

Any of the sulfopolymer containing formulations described herein may also optionally include one or more spreaders. One of ordinary skill will recognize that there are several agriculturally acceptable spreader/wetter compounds available, which may be useful in one embodiment or in combination with any of the mentioned embodiments of the current disclosure. By way of example, spreaders may include: Alkyl Aryl Polyethoxy Ethers and other Ethoxylated derivatives, Fatty Acid, Isopropanol.

Stickers

Any of the sulfopolymer containing formulations described herein may also optionally include one or more sticking agents (stickers). One of ordinary skill will recognize that there are several agriculturally acceptable stickers available, which may be useful in one embodiment or in combination with any of the mentioned embodiments of the current disclosure. Examples of sticking agents include latex based products, pinolene/terpene based products, and long chain polysaccharides like gellan gum, guar gum and xanthan gum. Alternatively, the sticking agent may be a polymer or co-polymer from a type of polymer such as polyacrylate and polyethylene, or a polyether amide, or imide.

Drift Control Agents

Any of the sulfopolymer containing formulations described herein may also optionally include one or more drift control agents. One of ordinary skill will recognize that there are many agriculturally acceptable drift control agents available, which may be useful in one embodiment or in combination with any of the mentioned embodiments of the current disclosure. Examples of drift control agents include: lecithin and related derivatives, linear nonionic polymers with a molecular weight of at least 20 kDa, guar gum and its derivatives, and fatty alcohol alkoxylates.

Suitable lecithin derivatives are lecithin and its chemically modified derivatives. Such drift control agents are for example commercially available as LIBERATE® or COMPADRE® from Loveland Products.

Typical polymers currently utilized as drift control agents include visco-elastic polyacrylamides, polyethylene oxides, and poly (vinyl pyrrolidones), with polyacrylamides being an agriculture industry spray tank additive, drift reduction standard. Suitable linear nonionic polymers with a molecular weight of at least 20 kDa, may be selected from polyacrylamide, polyacrylate, or a polyethylene glycol. Also considered are nonionic polymers, such as polyacrylamide and polyacrylate. The molecular weight of such nonionic polymers is in representative embodiments at least 50 kDa, for instance at least 100 kDa, and in particular examples at least 1000 kDa.

Suitable guar gums include for example those described in EP0660999, or are commercially available as AGRHO® DEP 775 or AGRHO® DR 200 from Rhodia. Hydroxy propyl guar and carboxymethyl hydroxy propyl guar are also examples.

Example fatty alcohol alkoxylates include fatty alcohol ethoxylates. The fatty alcohol may comprise a C8-22, or a C14-20, and in representative instances a C16-18 fatty alcohol. The fatty alcohol ethoxylate may comprise from 1 to 15, for instance from 1 to 8, and in certain examples from 2 to 6 equivalents of ethylene oxide. A suitable fatty alcohol ethoxylate is a C14-20 fatty alcohol, which includes from 2 to 6 equivalents of ethylene oxide. The drift control agent may have a hydrophile-lipophile balance (HLB) value of 4.0 to 11.0, for instance of 6.0 to 10.0 and in certain examples of 8.0 to 10.0. In another particular form, the drift control agent has an HLB of 5.0 to 8.0, or for instance from 6.0 to 7.0. The HLB may be determined according to Griffin's Method (Griffin, *J Soc Cosmet Chem.* 1(5):311-326, 1949). In another exemplar form, the drift control agent is a fatty alcohol alkoxylate.

Also contemplated for use as drift control agents are Hydroxyethyl cellulose (HEC), ethyl Hydroxyethyl cellulose (EHEC), hydroxylpropyl cellulose (HPC), hydroxybutyl methylcellulose (HBMC), hydroxypropyl methylcellulose (HPMC), methyl ethyl hydroxyethyl cellulose (MEHEC), and hydrophobically modified ethyl hydroxyethyl cellulose (HMEHEC).

Rainfastness Agents

Any of the sulfopolymer containing formulations described herein may also optionally include one or more rainfastness agents. One of ordinary skill will recognize that there are several agriculturally acceptable rainfastness agents available, which may be useful in one embodiment or in combination with any of the mentioned embodiments of the current disclosure. Rainfastness agents may comprise: Hydroxyethyl cellulose (EHEC), hydroxylpropyl cellulose (HPC), hydroxybutyl methylcellulose (HBMC), hydroxypropyl methylcellulo se (HPMC), methyl ethyl hydroxyethyl cellulose (MEHEC), and hydrophobically modified ethyl hydroxyethyl cellulose (HMEHEC). Polyvinyl alcohol and organosilicones (e.g., chlorotrimethylsilane, phenyltrichlorosilane, dichlorodimethylsilane, hexamethyldisilazane, diphenylsilanediol, methyltrichlorosilane, octamethylcyclotetrasiloxane, dichlorodiphenylsilane, dichloromethylsilane, vinyl silicone oil, trimethyl(bromodifluoromethyl)silane, tris buffered saline,isopropoxymethylsilane, silicone ov-101, hydroxy silicone oil, silicone oil, bind-silane, silicon tetrahydride, hydroxytrimethylsilane, trimethoxychlorosilanedisc 05/06/04, cholorophenylsilane 97,chloromethyl silane).

Surfactants

Any of the sulfopolymer containing formulations described herein may also optionally include one or more surfactants. One of ordinary skill will recognize that there are several agriculturally acceptable surfactants available, which may be useful in one embodiment or in combination with any of the mentioned embodiments of the current disclosure. Surfactants may include one or more of: a-(nonylphenyl)-oo-hydroxypoly(oxy-1,2-ethanediyl); polyethyleneglycol ether; mono(nonyl phenyl)ether; macrogol nonylphenyl ether; polyoxyethylene(n)-nonylphenyl ether; nonylphenyl polyethylene glycol ether; nonylphenoxypolyethoxyethanol; and poly(oxy-1,2 ethanediyl)-a-(nonphyenol)-)-hydroxy, N-alkyl-N,N-dimethylammonium glycinates, for example cocoalkyldimethyl-ammonium glycinate, N-acylaminopropyl-N,N-dimethylammonium glycinates, for example cocoacylaminopropyldimethyl-ammonium glycinate, and 2-alkyl-3-carboxylmethyl-3-hydroxyethylimidazolines with in each case 8 to 18 C atoms in the alkyl or acyl group, and cocoacylaminoethylhydroxyethylcarboxymethyl glycinate, N-alkylglycines, N-alkyl propionic acids, N-alkylaminobutyric acids, N-alkylimino dipropionic acids, N-hydroxyethyl-N-alkylamidopropylglycines, N-alkyltaurines, N-alkylsarcosines, 2-alkylamino propionic acids and alkylaminoacetic acids with in each case approximately 8 to 18 C atoms in the alkyl group. Exemplary ampholytic surfactants include N-cocoalkyl amino propionate, coco acyl aminoethyl amino propionate, and C—C-acylsarcosine.

Non-ionic surfactants include alkoxylates, such as alkoxylated alcohols, alkoxylated fatty acids, for instance ethoxylates and their derivatives including ethoxylated C8 to C24 saturated and unsaturated, linear and branched fatty acids or fatty alcohols, alkoxylated block copolymers, alkoxylated arylalkylphenols, especially ethoxylates and their derivates including alkylphenolethoxylates, alkoxylated amines, alkoxylated oils, fatty esters, especially polyethyleneglycol mono- and diesters of C8 to C24 saturated and unsaturated, linear and branched fatty acids, sorbitan derivatives including esters and ethoxylates, alkylpolyglucosides, and the like.

Ionic surfactants include alkylarylsulfonates, alkylarylsulfonic acids, carboxylated alcohol ethoxylates and alkylphenol ethoxylates, carboxylic acids/fatty acids, diphenylsulfonate derivatives, olefin sulfonates, phosphate esters, phosphorous organic derivatives, quaternary surfactants, sulfates and sulfonates of oils and fatty acids, sulfates and sulfonates of ethoxylated alkylphenols, sulfates of exthoxylated alcohols, sulfates of fatty acids, sulfonates of dodecyl and tridecylbenzenes, sulfonates of naphthalene and alkylnaphthalene, sulfonates of petroleum, sulfosuccinamates, alkanolamides, alkoxylated amines, N-acylsarocinates and the like.

Anti-Caking Agents

Any of the sulfopolymer containing formulations described herein may also optionally include one or more anti-caking agents. One of ordinary skill will recognize that there are several agriculturally acceptable anti-caking agents available, which may be useful in one embodiment or in combination with any of the mentioned embodiments of the current disclosure. Anti-caking agents may include sodium carbonate, tricalcium phosphate, potassium carbonate, ammonium carbonate, magnesium carbonate, hydrochloric acid, potassium chloride, calcium chloride, ammonium chloride, magnesium chloride, stannous chloride, sulfuric acid, sodium sulphates, potassium sulphate, calcium sulphate, ammonium sulphate, magnesium sulphate, Epsom salts, copper sulphate, aluminum sulphate, aluminum sodium sulphate, aluminum potassium sulphate, aluminum ammonium sulphate, sodium hydroxide, potassium hydroxide, calcium hydroxide, ammonium hydroxide, magnesium hydroxide, calcium oxide, magnesium oxide, sodium ferrocyanide, potassium ferrocyanide, calcium ferrocyanide, dicalcium diphosphate, sodium aluminum phosphate, sodium silicate, silicon dioxide, calcium silicate, magnesium silicate, magnesium trisilicate, talc, sodium aluminum silicate, potassium aluminum silicate, aluminum calcium silicate, bentonite, kaolin, stearic acid, magnesium stearate, calcium stearate, gluconic acid, glucono delta-lactone (gluconolactone), sodium gluconate, potassium gluconate, calcium gluconate, ferrous gluconate, ferrous lactate, polydimethylsiloxane.

Antifreeze Agents

Any of the sulfopolymer containing formulations described herein may also optionally include one or more antifreeze agents. One of ordinary skill will recognize that there are several agriculturally acceptable antifreeze agents available, which may be useful in one embodiment or in combination with any of the mentioned embodiments of the current disclosure. Antifreeze agents may include: glycols (i.e.

propylene glycol), sorbitol, urea, glycerin, and solvents.

(VI) ADDITIONAL OPTIONAL INGREDIENT(S)

Optionally, the formulations and compositions described herein may include one or more additional agriculturally acceptable ingredients. The following provides representative examples of categories of optional ingredients; the lists provided herein are not intended to be exhaustive, but instead merely provide examples.

Water Immiscible Phase

In a solvent dispersion (or, more narrowly, an oil dispersion, or OD) what is required is a water immiscible solvent, such as saturated or unsaturated oil(s). An example of saturated oil includes saturated mineral oil. In one embodiment or in combination with any of the mentioned embodiments, highly unsaturated oil is used because it is liquid at rt. There is a clear trend to use seed oils, as ODs target "safer, greener and milder" claims. Examples of vegetable and seed oils include: refined sunflower oil, rape/canola seed oil, soy bean oil, corn oil, palm oil (liquid versions), coconut (liquid versions), banana oil, and other vegetable oils. Additional examples of water immiscible solvents are described herein. Methylated seed oil (MSO) versions of all of these are also contemplated. In one embodiment or in combination with any of the mentioned embodiments, peanut and sesame oils are also feasible. In one embodiment or in combination with any of the mentioned embodiments, peanut and sesame oils are avoided where the end product may come in contact with a food or may itself be consumed.

Also contemplated are non-vegetable and non-seed oils and fats, including: Petroleum oil, Paraffinic oils, and Unsaturated fatty acids (from any origin).

Optionally, fish oils, citrus oils, neem oil, tea tree oil, and the like may also be used; however, these are considered to be active ingredients as they have a biological activity (e.g., as pesticides). These are not considered inert components.

Viscosity Modifying Agents

Any of the sulfopolymer containing formulations described herein may also optionally include one or more viscosity modifying agents. Viscosity modifying agents may include: glycerol, ethylene glycol, propylene glycol and low molecular weight polyethylene or polypropylene glycols.

Solubilizers

Any of the sulfopolymer containing formulations described herein may also optionally include one or more solubilizers. Solubilizers may include: sodium p-toluenesulfonate and sodium xylene sulfonate.

Dispersal Agents

Any of the sulfopolymer containing formulations described herein may also optionally include one or more dispersal agents. Dispersal agents include, but are not limited to: sulfonated aromatic polymers or oligomers, low ethoxylate content PEG esters and di-esters, ethylene oxide/propylene oxide block copolymer, and organosilicones.

Anti-Foamer

Any of the sulfopolymer containing formulations described herein may also optionally include one or more anti-foaming agents. Anti-foamers are useful in order to prevent or reduce foam that can arise during formulation or upon dilution. One of ordinary skill will recognize that there are several agriculturally acceptable anti-foamer agents available, which may be useful in one embodiment or in combination with any of the mentioned embodiments of the current disclosure. Anti-foamer agents may include: polyethylene glycol 8000, polymethylsiloxane, simethicone octanol, and silicone oils and emulsions.

Stabilizer

Any of the sulfopolymer containing formulations described herein may also optionally include one or more stabilizers (stabilizing agents). One of ordinary skill will recognize that there are several agriculturally acceptable stabilizers available, which may be useful in one embodiment or in combination with any of the mentioned embodiments of the current disclosure. Stabilizers include: xanthan gum, agar, alginic acid, alginate, calcium lactobionate, carrageenan, gellan gum, guar gum, diisopropanolamine, hydroxyethylidene diphosphonic acid, and silver nitrate.

Preservatives

Any of the sulfopolymer containing formulations described herein may also optionally include one or more preservatives. One of ordinary skill will recognize that there are several agriculturally acceptable preservatives available, which may be useful in one embodiment or in combination with any of the mentioned embodiments of the current disclosure. Preservatives may include weak acid preservatives such as sorbic acid, lactic acid, benzoic acid, propionic acid, citric acid, acetic acid, or an alkali metal or alkali earth metal salt thereof; inorganic acids such as hydrochloric acid; imidazoles such as imazalil. More generally, a "preservative component" if included in the composition is any molecule that can be used to increase the field or shelf life of the formulation, or a plant or plant part coated with the formulation, including for example fruits, flowers, and vegetables. Exemplary ingredients that can be used as preservative components include parabens including methyl parabens and propyl parabens, sodium benzoate (and other benzoate salts), vanillin, sodium sorbate (and other salts of sorbic acid), vitamin E, tocopherols, α-tocopherol, vitamin E acetate, ethanol, butanol, ethylenediaminetetraacetic acid (EDTA) and all its salts, silicates such as calcium silicate, aluminum magnesium silicate, aluminum calcium silicate, magnesium silicate, aluminum sodium silicate, aluminum potassium silicate, aluminum sodium potassium silicate, other water soluble silicates, and combinations of two or more thereof.

The preservative component can be included in the formulation at any concentration that is sufficient to increase shelf life. Generally, shelf life refers to the amount of time that a particular formulation, or plant or plant part, can be maintained in saleable condition. Similarly, the field life refers to the amount of time that a plant, or plant part can be maintained in a field and still allow for the plant part to be harvested in saleable condition.

One of ordinary skill in the art will be able to determine the appropriate concentration of preservative component(s), for instance desired by producing test formulations having varying amounts of preservative components, optionally applying them to the plant or plant part, and measuring the self-life or field life of the formulation, or of the plant or plant part. Exemplary concentrations of preservative components in the compositions include from 0.001 wt % to 10.5 wt %, from 0.01 wt % to 10 wt %, from 0.02 wt % to 9 wt %, from 0.05 wt % to 8 wt %, from 0.07 wt % to 7 wt %, from 0.10 wt % to 6 wt %, and from 0.15 wt % to 5 wt %. The preservative component if included in the composition may in addition increase the shelf-life of the formulation during storage, shipping, exhibiting for sale and handling that may happen prior to use of the product by the end user for the uses outlined herein for the compositions detailed in the current document.

Antioxidants

In additional examples, antioxidants can be included in the compositions and formulations provided herein. Antioxidants can be used to protect post-harvest fruit and vegetables from browning caused by oxidation. Additionally, antioxidants can be used to protect certain active ingredients from degradation due to contact with oxygen. Exemplary antioxidants include EDTA, glutathione, a-tocopherol, tocopherols, vitamin E, vitamin E acetate, vitamin E palmitate, zinc glycinate, ascorbic acid and its salts of calcium, sodium, and potassium, ascorbyl palmitate, calcium citrate, BHA, BHT, guaiac extract, gallic acid and methyl, ethyl, propyl, dodecyl esters of gallic acid, phosphatidylcholine, propionic acid, sucrose, cyclodextrins, rosemary, and cysteine hydrochloride. Additional antioxidants include amino acids (e.g. glycine, histidine, tyrosine, tryptophan) and their derivatives, imidazole (e.g. urocanic acid) and derivatives, vitamin C and derivatives (such as ascorbylpalmitate and ascorbyltetraisopalmitate, Mg-ascorbylphosphate, Naascorbylphosphate, ascorbyl-acetate), tocopherol and derivates (such as vitamin E-acetate), mixtures of vitamin E, vitamin A and derivatives (vitamin-A, palmitate and -acetate) as well as coniferyl benzoate, rutinic acid and derivatives, a-glycosylrutin, ferulic acid, furfurylideneglucitol, carnosine, 15 butylhydroxytoluene, butylhydroxyanisole, and trihydroxybutyrophenone. In one embodiment or in combination with any of the mentioned embodiments, antioxidants can be included at a concentration of from 0.01 to 1.0 wt %. A composition or formulation may include a combination of two or more different antioxidants.

pH Regulators

Any of the sulfopolymer containing formulations described herein may also optionally include one or more compounds that influence or regulate pH, for instance, buffers, acidifiers, basifiers, and so forth. One of ordinary skill will recognize that there are several agriculturally acceptable pH regulating compounds available, which may be useful in one embodiment or in combination with any of the mentioned embodiments of the current disclosure. Examples of pH regulators include: ethanolamine, phosphoric acid, triethanolamine, acetic acid, diethylamine, monoethylamine, and monoisopropylamine.

Sequestrants/Chelators

The term "sequestrant" refers to a compound that is capable of removing or inactivating another substance through chelation. A chelant (or chelating agent) is thus a more general term than sequestrant. Examples of sequestrants include those used to complex metal ions (e.g. EDTA or gluconate). On the other hand, chelants might be used more widely, for example, by assaying metal ion concentrations colorimetrically (e.g. neocuproine) or forming compounds that are very important/useful in their own right (e.g. chlorophyll, copper phthalocyanine). A sequestrant might thus be expected to complex several varieties of ion if present, whereas certain application of a chelant might involve intentional chelation with just one type of ion.

Any of the sulfopolymer containing formulations described herein may also optionally include one or more sequestrants or chelators, for instance in order to regulate the amount of metals suspended in a formulation. One of ordinary skill will recognize that there are several agriculturally acceptable chelants and sequestrants available, which may be useful in one embodiment or in combination with any of the mentioned embodiments of the current disclosure. Examples of chelants include Na-polyphosphates, Na-polyacrylates, Na-lignosulfonates, citric acid, Na-Citrate, Na gluconate/glucoheptonate, EDTA, disodium salts, and diammonium salts.

It is recognized, for instance, that well water often has a high concentration of $Ca^{++}$ ions. This can result in the formation of gels, precipitates, or solids during preparation or dilution of an agrochemical formulation. In instances, for instance in locations or regions where water is particularly hard, it may be useful to either use softened water (such as can be provided by an in-line water softener), or to add chelating agent(s) that sequester the $Ca^{++}$ ions. Optionally, such chelating agent(s) may be tank mix agents, for instance agents that are formulated to account for region-specific water hardness.

It is recognized in the art that water hardness is a measure of the amount of salt that is present in water and is typically expressed in milligrams of dissolved calcium and magnesium carbonate per liter of water. Water hardness varies greatly between agricultural sites and regions and is recognized by a person having ordinary skill in the art to affect the biophysical (e.g., specific gravity, evaporation rate) and chemical properties (e.g., pH, ionic strength) of a solution, including solutions used in agriculture. For example, in solutions that include sulfopolymers, water hardness can alter precipitation rates and pH and effect the solubility of pesticides as well as alter the sprayability of a solution. It is also recognized by a person having ordinary skill in the art that the changes in biophysical and chemical properties of a solution that arise due to water hardness impact the efficacy of common pesticides. For example, reducing water hardness is recognized by a persona having ordinary skill in the art to reduce the phytotoxicity of glyphosate. Water hardness is often addressed through myriad ways, which include, but are not limited to using water softeners in a water line (e.g., replacing calcium with sodium) or adding chelating agents (e.g., EDTA, citric acid) in a holding tank.

Solvents

Any of the sulfopolymer containing formulations described herein may also optionally include one or more (organic) solvents. Solvents are useful in order to increase solubility of one or more active ingredients, to inhibit freezing or crystallization, to reduce viscosity and enhance pourability (modify rheology), and so forth. Solvents may include: ethylene dichloride, isopropyl alcohol, propylene glycol, diacetone alcohol, toluene, kerosene, methylnaphthalene, xylenes, trichloroethylene, N-methyl-2-pyrrolidone, polychloromethanes, chlorinated volatile organic compounds, and isopropanol. mineral oil, vegetable oils, seed oils, methylated seed oils, banana oil, white mineral oil mineral spirits, toluene, benzene, xylene, SOLVESSO™ Aromatic 100, SOLVESSO™ Aromatic 150, SOLVESSO™ Aromatic 150 ND, SOLVESSO™ Aromatic 200 ND SOLVESSO™ Aromatic 200, SOLVESSO™ 100, SOLVESSO™ 150, SOLVESSO™ 150 ND, SOLVESSO™ 200, SOLVESSO™ 200 ND, acetophenone, isopropyl acetate, t-butyl acetate, methyl n-propyl ketone, propyl acetate, methyl isobutyl ketone, isobutyl acetate, n-propyl propionate, butyl acetate, methyl isoamyl ketone, methyl amyl acetate, n-butyl propionate, p-amyl acetate, methyl n-amyl ketone, isobutyl isobutyrate, cyclohexanone, diisobutyl ketone, n-pentyl propionate, ethyl 3-ethoxy propionate, 2-ethylhexyl acetate, ethylene glycol monobutyl ether, isophorone, 2,2,4-trimethyl-1,3-pentanediol monoisobutyrate, 2,2,4-trimethyl-1,3-pentanediol diisobutyrate, 2-heptanol, 2-ethyl hexanol Additional Polymer(s)

Any of the sulfopolymer containing formulations described herein may also optionally include one or more additional polymers (beyond the sulfopolymer(s)). For instance, additional polymers may include: semi-synthetic polymer substances such as diethylaminoethyl (DEAE) cellulose, nitrocellulose, carboxymethyl cellulose, quaternary amine substituted cellulose, and phosphonic and sulfonic acid derivatized celluloses. Such polymers may be prepared from common and inexpensive, large scale materials including: cellulose, dextran, ethylene glycol, polyethyleneimine, vinyls, acetates, amides and so on.

Odorant

Any of the sulfopolymer containing formulations described herein may also optionally include one or more odorants, for instance in order to mask the aroma of other components in the formulation or to provide a scent identifier or marker. One of ordinary skill will recognize that there are myriad agriculturally acceptable odorants available, which may be useful in one embodiment or in combination with any of the mentioned embodiments of the current disclosure. A non-exhaustive list of odorants can be found, for instance, in U.S. Patent Publication No. 2009/0163449.

Colorants

Any of the sulfopolymer containing formulations described herein may also optionally include one or more colorants, for instance in order to provide product identification and anti-counterfeiting, and to identify specific products for health and safety reasons. Colorants can also be used to reveal where an otherwise largely transparent formulation has been applied, for instance to ensure complete coverage with minimal duplicative coverage. One of ordinary skill will recognize that there are several agriculturally acceptable colorants available, which may be useful in one embodiment or in combination with any of the mentioned embodiments of the current disclosure. Representative example colorants include FD&C Blue No. 1, FD&C Red No. 40, for instance, as well as proprietary colorants available from Pylam Dyes (Tempe, AZ), Vipul Organics Ltd. (Mumbai, India), and other commercial producers.

(VII) EXEMPLARY COMPONENT RANGES IN REPRESENTATIVE FORMULATIONS

The compositions and formulations described herein can be used in a wide variety of applications, including, but not limited to, suspensions, emulsions (oil in water and water in oil), and solvent dispersions. For example, many types of active ingredients used in agriculture can be suspended in a solution which can improve the dispersibility of the active ingredient on crops. Additionally, emulsification is an important aspect of combining different chemicals and/or liquid mixtures. Furthermore, distributing particles of a material uniformly in a continuous phase of a substantially water-immiscible solvent is also an important aspect for ensuring adequate mixing. Given the chemical and biophysical nature of different organic and inorganic chemicals, the precise compositions of suspensions, emulsions (both water in oil and oil in water), and solvent dispersions may vary depending on the precise compounds used.

Suspensions

Within suspension formulations (including suspension concentrates, SC), sulfopolymers, such as sulfopolyesters comprising a sulfoisophthalate moiety derived, for example, from sodiosulfoisophthalic acid (5-SSIPA) or esters thereof, provide excellent dispersions of active ingredients in water, providing an unexpectedly high loading of solid active compound(s) to be suspended easily in water. In addition to the immediate benefit of high loading and easy dispersion, the formulations are stable. Minimal sedimentation can be observed relative to a control formulation. After several weeks standing at room temperature, one may observe sedimentation in the bottom of both a control (lacking SPE1 or SPE2 polymer) and in an SPE formulations. Upon simple inversion, the sulfopolymer-containing suspensions can re-disperse.

An additional important feature for an SC formulation is the ability to disperse with minimal agitation upon dilution (mimicking tank mixing by the end-user, such as by the farmer). Here again, sulfopolymer (e.g., sulfopolyester, such as polymers comprising a sulfoisophthalate moiety derived, for example, from sodiosulfoisophthalic acid (5-SSIPA) or esters thereof) based formulations can disperse with no mixing upon dilution into a graduated cylinder containing tap water. If the dispersion settles after standing, the sulfopolymer-containing systems are capable of being re-dispersed with minimal mixing, such as low-shear mixing and/or inversion, and with no undispersible residue that is visually observable.

Suspending active ingredients into a suspension allows for improved distribution of the active ingredient over crops during the delivery of the active ingredient via many delivery mechanisms (e.g., spraying). The described sulfopolymers improve suspension characteristics, as described herein. Representative suspension formulations will contain components in the concentrations provided in the following table, based on the percent weight of the composition. The exact amount of any component used may be influenced by which component is used, what other components are used, the intended use of the formulation, and other factors well known to those of ordinary skill in the art. In general, a concentrate will be diluted by a factor of 1:1 to 1:1000 prior to use.

Exemplary Component Ranges for Suspension Concentrates

| Component | Exemplary Range 1 (wt %) | Exemplary Range 2 (wt %) | Exemplary Range 3 (wt %) | Exemplary Range 4 (wt %) |
|---|---|---|---|---|
| Solvent* | 0-70 | 10-60 | 2.0-10.0 | 0-30 |
| Sulfopolymer (30% Dispersion) | 0.5-15 | 10-15 | 0.5-5 | 1-10 |
| Antifoaming* agent | 0-1 | 0.3-0.5 | 0.33-0.75 | 0.3-0.55 |
| Active Ingredient(s) | 5-70 | 10-30 | 40-60 | 35-55 |
| Thickener* | 0-1.5 | 0.20-0.24 | 0.1-0.3 | 0-1 |
| Rosin* | 0-5 | 3-5 | 1-3 | 0.5-3 |
| Water | To 100% | To 100% | To 100% | To 100% |

*Optional components.

More generally, common components of an SC are: Active ingredient(s) (solid or liquid; which provide biological functionality): 200-600 g/L; wetting agent/co-dispersant (which may be used to facilitate the milling process): 5-20 g/L; dispersant (which assists in dispersing active ingredient (s) in the concentrate and/or on dilution in water): 20-60 g/L; optionally one or more adjuvant (which increases the efficacy of the active ingredient): amount variable dependent on the selected adjuvant(s) and their function(s); rheology modifier (which provides and/or modifies the structure to the formulation): 1-10 g/L; optionally, anti-freeze (which reduces the likelihood that the formulation will freezing): 50-80 g/L; biocide (which eliminates, reduces, or prevent reproduction of unwanted bacteria in the formulation): 1-5 g/L; anti-foam agent (to reduce tendency of the formulation to entrain air during manufacture and transport): 1-20 g/L; and diluent, usually water (which serves as the continuous phase): to make a final volume per 1 L.

SC formulations often have one or more of the following positive features: water based, hence it provides good safety and user convenience; suitable for many active ingredients with low water solubility; absence of dust; absence of flammable liquids; small particle size of the active ingredient; and adjuvant(s) optionally can be built-in for bio enhancement. However, SCs also generally are seen as having the following limitations: not compatible with water soluble active ingredients; crystal growth can be a problem if the active ingredient is partially soluble in water; some SC formulations can have long term stability issues (in-can caking); some SC formulations can have issues with stability upon dilution (in-tank sinking); some SC formulations may require stirring during application. Various sulfopolymer-containing formulations provided herein address some or all of these limitations.

Emulsifications/Emulsions

Generally, an emulsion may contain the following components: Active ingredient(s) (solid or liquid which provide biological functionality): 50-800 g/L; water-immiscible solvent/oil (which dissolves or suspends active ingredient(s), to improve biological activity): 30-600 g/L; emulsifier/emulsifier system (which stabilizes a concentrated emulsion and encourages emulsification upon dilution in water): 1-200 g/L; rheology modifier (which provides and/or modifies the structure to the formulation): 1-5 g/L; optionally, anti-freeze (which reduces the likelihood that the formulation will freezing): 5-100 g/L; biocide (which eliminates, reduces, or prevent reproduction of unwanted bacteria in the formulation): 1-3 g/L; anti-foam agent (to reduce tendency of the formulation to entrain air during manufacture and transport): 1-20 g/L; and the continuous phase, usually water: to make a final volume per 1 L.

Prior to the current disclosure, to obtain high solvent/oil content EWs, the emulsifier systems were often blends of different products and needed to be present in the formulation at high concentration, which impacts the price as well as the overall function of the formulation. Various sulfopolymer-containing formulation provided herein address this issue, for instance by providing a multi-feature adjuvant component that can stabilize and provide various functions to an emulsion formulation.

In general, EW formulations often have one or more of the following beneficial traits: simple to manufacture (one pot high shear stirring); relatively high biological activity; generally good chemical stability; some formulations provide spontaneous emulsification upon dilution; considered a safer and more environmentally friendly alternative to emulsifiable concentrates (ECs). However, EWs are generally recognized as having the following limitations: traditionally use expensive solvents containing harmful VOCs; solvents may affect plastics and rubbers in spray applicators; active ingredients need to be fully soluble in the solvent over a range of temperatures; and use of water miscible solvents can cause active ingredient crystallization problems upon dilution. However, new milder solvents, such as mineral oil, citric oils, MSO, etc., have allowed EWs to be manufactured for less overall cost, with less toxicity and reduced chemical damage to equipment.

Water-in-Water-immiscible Solvent Emulsions Emulsifying water in a water-immiscible solvent (such as an oil; the continuous phase) allows for the mixture of water into a solvent into which the water would not normally mix. The use of sulfopolymers in water in oil emulsions, as described herein, improves emulsifying characteristics as well as stability of the resultant emulsion.

Representative water in solvent emulsions formulations contain components in the concentrations provided in the following table, based on the percent weight of the composition. The exact amount of any component used may be influenced by which component is used, what other components are used, the intended use of the formulation, and other factors well known to those of ordinary skill in the art. In general, a concentrate will be diluted by a factor of 1:1 to 1:1000 prior to use.

Exemplary Component Ranges for Water-in-Oil Emulsion Concentrates

| Component | Exemplary Range 1 (wt %) | Exemplary Range 2 (wt %) | Exemplary Range 3 (wt %) | Exemplary Range 4 (wt %) | Exemplary Range 5 (wt %) | Exemplary Range 6 (wt %) |
|---|---|---|---|---|---|---|
| Water*** | To 100% | To 100% | To 100% | To 100% | To 100% | To 100% |
| Sulfopolymer (30% Dispersion) | 0.5-15 | 10-15 | 0.5-5 | 1-10 | 0.5-5 | 0.5-less than 2 |
| Antifoaming* agent | 0-1 | 0.35-0.5 | 0.33-0.75 | 0.3-0.55 | 0-1 | 0-1 |
| Rosin* | 0-5 | 3-5 | 1-3 | 0.5-3 | 0-5 | 0-5 |
| Active ingredient(s)** | 5-70 | 10-30 | 20-60 | 15-40 | 25-70 | 40-70 |
| Water-immiscible solvent(s)** | 10-70 | 25-60 | 45-60 | 15-30 | 10-70 | 10-70 |

*Optional components.
**Active ingredient may be the same compound as the water immiscible solvent and in such case, the minimum amount will be as stated in the water immiscible row and the maximum amount will be the sum of the maximum amount stated in the active ingredient row plus the minimum amount stated in the water immiscible row.
***"To 100%" refers to a remainder percentage of water and the total of all ingredients makes up 100%.

Water Immiscible Solvent-in-Water Emulsions

A water-immiscible solvent (e.g., oil) in water emulsion (or Concentrated Aqueous Emulsion or simply Emulsion, "EW") is the dispersion of a water insoluble liquid (the discontinuous phase) into water (the continuous phase). Examples of such emulsions contain a liquid or a solid active ingredient dissolved in the water-immiscible solvent. Sometimes, the water-immiscible phase itself is the active ingredient (e.g., NEEM and other biologically active oils). Emulsifying oil in water allows for the mixture of oil (or whatever water-immiscible solvent is employed) into water where the oil would not normally mix.

EW formulations are gaining in popularity as companies are formulating away from solvents such as toluene and aromatics. The concept is to use an oil, such as a fatty acid ester, to dissolve the non-water soluble (that is, substantially water immiscible) active ingredients and then emulsify into water. Surfactants are important for these systems to work and remain stable in a formulation, including in the as-applied formulation.

The sulfopolymer systems described herein were tested at very high levels of methylated soy oil (MSO)-65 wt % oil in water. Using 1% SPE1 or SPE2 polymer, the oil was easily dispersed to provide a stable milky white dispersion. The formulation was stable under accelerated stability testing, showing no cracking after two weeks at 54° C. The formulation can easily be dispersed when mixed with water, for instance at the location at which the diluted (as-applied) formulation is to be applied, such as at a farm. Using the 65% oil in water formulation, dilution into water provided a very well dispersed system. Not only does the sulfopolymer enable the system to be stable at remarkable high concentrations, but upon dilution, in some embodiments, the phases can invert to provide a stable oil in water dilute (e.g., as-applied) mixture.

The use of sulfopolymers in oil in water emulsions, as described herein, improves emulsifying characteristics as well as stability of the resultant emulsion. Representative oil in water formulations will contain components in the concentrations provided in the following table, based on the percent weight of the composition. The exact amount of any component used may be influenced by which component is used, what other components are used, the intended use of the formulation, and other factors well known to those of ordinary skill in the art. In general, a concentrate will be diluted by a factor of 1:1 to 1:1000 prior to use.

Exemplary Component Ranges for Oil-in-Water Emulsion Concentrates

| Component | Exemplary Range 1 (wt %) | Exemplary Range 2 (wt %) | Exemplary Range 3 (wt %) | Exemplary Range 4 (wt %) | Exemplary Range 5 (wt %) | Exemplary Range 6 (wt %) |
|---|---|---|---|---|---|---|
| Sulfopolymer (30 wt % dispersion) | 0.5-15 | 10-15 | 0.4-5 | 1-10 | 0.4-5 | 0.4-less than 2 |
| Antifoaming Agent* | 0-1 | 0.3-0.5 | 0.33-0.75 | 0.3-0.55 | 0-1 | 0-1 |
| Active Ingredient(s)** | 5-70 | 10-30 | 40.0-50.0 | 35.0-55.0 | 30.0-70.0 | 40.0-70 |

| Component | Exemplary Range 1 (wt %) | Exemplary Range 2 (wt %) | Exemplary Range 3 (wt %) | Exemplary Range 4 (wt %) | Exemplary Range 5 (wt %) | Exemplary Range 6 (wt %) |
|---|---|---|---|---|---|---|
| Rosin* | 0-5 | 3-5 | 1-3 | 0.5-3 | 0-5 | 0-5 |
| Water-immiscible solvent(s)** | 10-70 | 10-30 | 25-40 | 10-60 | 10-70 | 10-70 |
| Water*** | To 100% | To 100% | To 100% | To 100% | To 100% | To 100% |

*Optional components.
**Active ingredient may be the same compound as the water immiscible solvent and in such case, the minimum amount will be as stated in the water immiscible row and the maximum amount will be the sum of the maximum amount stated in the active ingredient row plus the minimum amount stated in the water immiscible row.
***"To 100%" refers to a remainder percentage of water and the total of all ingredients makes up 100%.

Solvent Dispersions

Water-immiscible solvents are often required to be dispersed throughout a solution in a continuous phase. The use of sulfopolymers in solvent dispersion, as described herein, improves solvent dispersion characteristics as well as stability of the resultant emulsion. Representative solvent dispersion formulations will contain components in the concentrations provided in the following table, based on the percent weight of the composition. The exact amount of any component used may be influenced by which component is used, what other components are used, the intended use of the formulation, and other factors well known to those of ordinary skill in the art. In general, a concentrate will be diluted by a factor of 1:1 to 1:1000 prior to use.

Exemplary Component Ranges for Solvent Dispersion Concentrates

| Component | Exemplary Range 1 (wt %) | Exemplary Range 2 (wt %) | Exemplary Range 3 (wt %) | Exemplary Range 4 (wt %) | Exemplary Range 5 (wt %) | Exemplary Range 6 (wt %) |
|---|---|---|---|---|---|---|
| Sulfopolymer (30 wt % dispersion) | 0.5-15 | 10-15 | 0.5-5 | 1-10 | 0.4-5 | 0.4-less than 2 |
| Solvent | 10-94.5 | 50-70 | 30-65 | 20-80 | 50-94.5 | 50-94.5 |
| Antifoaming Agent* | 0-1 | 0.3-0.5 | 0.33-0.75 | 0.3-0.55 | 0-1 | 0-1 |
| Active Ingredient(s) | 5-70 | 10-30 | 40.0-50.0 | 35-55 | 30.0-70.0 | 40.0-70 |
| Rosin* | 0-5 | 3-5 | 1-3 | 0.5-3 | 0-5 | 0-5 |
| Water* | To 100% | To 100% | To 100% | To 100% | To 100% | To 100% |

*Optional components.
**Active ingredient may be the same compound as the water immiscible solvent and in such case, the minimum amount will be as stated in the water immiscible row and the maximum amount will be the sum of the maximum amount stated in the active ingredient row plus the minimum amount stated in the water immiscible row.
***"To 100%" refers to a remainder percentage of water and the total of all ingredients makes up 100%.

(VIII) METHODS OF MAKING CONCENTRATE FORMULATIONS

The sulfopolymer-containing formulations, compositions, and systems described herein are rendered new, unique, and useful in their inclusion of a sulfopolymer (such as a sulfopolyester) in an agrochemical formulation. However, the formulations, including concentrate formulations, in general can be made in conventional ways. That is, the inclusion of a sulfopolymer in a suspension formulation, a solvent-in-water emulsion formulation, a water-in-solvent emulsion formulation, or a solvent/oil dispersion does not significantly modify the manner in which that formulation can be made.

Representative methods for making formulations, including concentrate formulations, are provided herein. In one embodiment or in combination with any of the mentioned embodiments, the ingredients of a desired formulation may simply be mixed together—often all at the same time, using moderate to high-shear mixing—particularly when the sulfopolyester is introduced to the mixture as a liquid dispersion (such as using a stock dispersion of 10 wt %-40 wt % sulfopolymer). In one embodiment or in combination with any of the mentioned embodiments where the sulfopolymer is introduced first as a solid (a powder or pellets or flakes), the sulfopolymer is dispersed into a water at an elevated temperature (for instance, higher than 40° C., such as at least 45° C., at least 50° C., at least 55° C., at least 60° C., at least 65° C., at least 70° C., at least 75° C., at least 80° C., or higher than 80° C.) with moderate to high-shear mixing. The elevated temperature may be provided by adding heated water to the mixture; by heating the mixture; or a combination of both approaches. Dispersal of the solid sulfopolymer can be done before or after addition of active ingredient(s) or other components to the liquid, to heat-labile active ingredients or other components are beneficially added only after the sulfopolymer has been dispersed and the composition cooled, for instance to ambient temperature.

Though most other components may be simply mixed into a formulation, it is noted that rosins may need to be added using high-shear mixing to ensure homogenous incorporation. Optionally, in representative embodiments a rosin (if included in a final formulation) is provided in a water-immiscible component of the formulation. For instance, the rosin is provided in the water-immiscible solvent aspect of exemplary system or kit embodiments. Optionally, in one embodiment or in combination with any of the mentioned embodiments the rosin is provided in a container separate from the aqueous (sulfopolymer-containing) phase and separate from the water-immiscible phase.

(IX) CHARACTERIZATION OF FORMULATIONS

General Considerations in Agricultural Formulations: It is common to observe phase separation in time for nearly all crop formulations. However, useful aspects of such formulations include that, upon in-tank dilution in water, the formulations form a stable diluted formulation for a certain period, for instance long enough to allow spray application. This time requirement is influenced by the active ingredient (s) in the formulation, the type of formulation (e.g., suspension, emulsion, dispersion), and on the spray application conditions. For oil containing formulations, a representative requirement is that, under agitation, no free oil phase is noticed over a time period (e.g. 6 hours). Creaming or sedimentation may occur in-can and in-tank; however, the initial characteristics are resumed after shaking.

The formulations described herein can be examined and characterized using any art-recognized systems for detecting and/or measuring characteristics that may influence the function or behavior of the formulation. These characteristics may include, for instance, solubility, viscosity, pH, density, stability (including short term, long term, and at various temperatures), bloom, dispersibility, re-dispersibility, sprayability, drift, coverage, efficacy (including in the field), and so forth. Representative methods and systems for making such measurements are provided herein. In addition, for instance, standard methods can be found in the Collaborative International Pesticides Analytical Council (CIPAC) Handbooks, which can be accessed online (cipac.org/index-.php/methods-publications/handbooks).

(X) USES OF CONCENTRATE FORMULATIONS

There are provided herein formulations that are concentrates—that is, formulations that contain an active ingredient at a level higher than the as-applied level of that ingredient—which concentrates are intended to be diluted before application or use. Concentrates are recognized as beneficial, for instance because they can be more efficiently shipped and stored (since they take up less volume than a diluted formulation). However, it is important that concentrate formulations are diluted before use in order to avoid waste, to avoid toxicity that may result from using active ingredient(s) or other components at a higher level than recommended, to avoid phytotoxicity effects arising from mis-balanced formulation components, and to avoid environmental contamination and/or user health impacts. The art recognizes methods for diluting concentrate formulations; the following discussion is provided for guidance only and is not intended to be limiting.

Methods of Diluting Concentrate Formulations

Concentrated sulfopolymer-containing formulations may be diluted by adding a desired quantity of the concentrate formulation (generically, a stock solution) to an amount of diluent/solvent (such as, for example, water). The resulting solution contains the amounts of components originally taken from the concentrate formulation (stock solution) but dispersed throughout a greater volume. Therefore, the final concentration of solvent(s) is lower; the final solution (for instance, an as-applied formulation) is less concentrated and more dilute.

There are many ways of expressing concentrates and dilution. The following, while not intended to be an exhaustive list, describes exemplary ways of expressing concentrates and dilutions.

Using $C_1V_1=C_2V_2$: To make a fixed amount of a dilute solution from a stock solution, the following formula may be used:

$$C_1V_1=C_2V_2$$

where:
$V_1$=Volume of stock solution needed to make the new solution
$C_1$=Concentration of stock solution
$V_2$=Final volume of new solution
$C_2$=Final concentration of new solution Using Dilution Factors: To make a dilute solution without calculating concentrations, the derivation of the above formula may be used (can also be used with mass):

(Final Volume/Concentrate Volume)=Dilution Factor.

The dilution factor (DF) can be used alone or as the denominator of the fraction, for example, a DF of 10 means a 1:10 dilution, or 1 part concentrate +9 parts diluent, for a total of 10 parts. This is different from a "dilution ratio," which typically refers to a ratio of the parts of solute to the parts of solvent, for example, a 1:9 using the previous example. Dilution factors are related to dilution ratios in that the DF equals the parts of solvent +1 part.

Step Dilutions: If the dilution factor is larger than the final volume needed, or the amount of concentrate stock is too small to be readily measured and dispensed, one or more intermediary dilutions may be required. The formula Final $DF=DF_1*DF_2*DF_3$ etc., may be used, until the product reaches the appropriate final dilution.

Concentrates may be produced in a wide range of viscosities, from non-flowable, viscous concentrates to less viscous, flowable concentrates. Moreover, dilutions of such concentrates may be prepared by any of the above or other known methods, generally by measuring and dispensing the desired amount of concentrate into a mixing vessel or container that contains or to which is then added the desired diluent (such as water). More viscous concentrates may be measured, for example, by scooping portions of the concentrate into a measuring vessel until the desired amount of concentrate has been deposited into the measuring vessel and emptying, via a scooping or spatula-like utensil, the measured contrate from the measuring container into the mixing vessel or container. Alternatively, a desired amount of concentrate may be directly deposited into a mixing vessel through squeezing or cutting a desired amount of the concentrate into the mixing vessel or container. Less viscous, flowable, concentrates may be measured by simply pouring or otherwise depositing a measured, desired amount of the concentrate into the mixing vessel or container. Water or other diluent/solvent may then be added until the desired dilution concentration (for instance, the as-applied concentration) is achieved. Optionally, the concentrate/solvent mixture may be, for example, agitated and/or heated to aid in the dissolution of the concentrate wherein more agitation or heat may be required for more viscous concentrates. In representative embodiments, the only agitation that is required is provided by the jostling of a tank or container holding the diluted formulation as it is transported to the application site(s).

Also contemplated are embodiments in which the concentrate formulation is provided in a pre-measured amount, for instance an amount appropriate for dilution to the desired (e.g., as-applied) concentration in a set final volume. For instance, a concentrate formulation intended to be diluted 1:1000 in water may be provided as a 1-gallon, pre-measured container that is mixed into a 1000 gallon container with water.

Further, in all of the dilution embodiments it is understood that the amount of diluent used may be reduced by the volume of other mix components (such as adjuvants, for instance tank mix adjuvants) that are to be added to the final as-applied formulation. Providing for inclusion of such tank mix adjuvants in a final, as-applied (diluted) formulation is within the scope of ordinary skill.

Representative Methods of Field Application

Once the appropriate concentration of sulfopolymer containing formulation (an RTU or "as-applied" composition) has been prepared, the formulation may be deposited on soil in which plants or crops are being planted, grown, harvested or any combination of the preceding or directly on the plants during any stage of growth. Methods of distributing or applying the sulfopolymer containing formulations may include broadcast spraying or spreading or directed application. Broadcast spreading typically is used when a product needs to be distributed over a larger area such as across a field which enables the product to spread across the field. Broadcast spreading may take various forms such as via hand-held sprayer, tractor, aircraft, or other means. In contrast, directed application is normally used when there is a desire to apply the product to a specific area of the field or crops. Directed applications may be applied via tractor or other depositing devices.

By way of example, the sulfopolymer containing formulation may be deposited in a tank or other container. The tank may then be sealed and optionally pressurized at which point the tank may be connected to any desired distribution device (e.g. sprayer, tractor, or aircraft) and administered to the soil or crops as desired. Alternatively, the product could be administered sub-soil via injection prior to or at the time a field is seeded. An additional method may involve mixing the product with irrigation water wherein the product is distributed at the time of irrigation.

In one embodiment or in combination with any of the mentioned embodiments, the sulfopolymer containing formulation is applied to edible plant parts, such as leaves, stems, roots, corms, bulbs, rhizomes, fruits, and/or vegetables. Such application can occur at any time during the plant growth cycle, depending on the active ingredient(s) being applied and the field application conditions. In particular embodiments, the sulfopolymer containing formulation is applied prior to or at the bud stage, prior to or at the flowering stage or once the fruit as started to or has developed or anytime during any of these time periods. The sulfopolymer containing formulation may be applied, for example, by spraying.

The Additional Disclosure and Examples below are included to demonstrate particular embodiments of the disclosure. Those of ordinary skill in the art should recognize in light of the present disclosure that many changes can be made to the specific embodiments disclosed herein and still obtain a like or similar result without departing from the spirit and scope of the disclosure.

(XI) ADDITIONAL DISCLOSURE

Provided herein are agricultural formulations and compositions, that include a sulfopolymer (such as a sulfopolyester) along with methods of their use. In one embodiment, and in combination with any of the mentioned embodiments, the formulations or compositions further comprise a rosin.

A first embodiment, or in combination with any of the mentioned embodiments, is an agrochemical formulation, including: at least one agrochemical active ingredient, and a sulfopolymer that has not been lyophilized. By way of example, the at least one agrochemical active ingredient is included at a level at least twice as high as its as-applied level. In one embodiment, and in combination with any of the mentioned embodiments, the formulation further comprise a rosin.

Also provided are agrochemical concentrate formulations, which include: at least one agrochemical active ingredient, and a sulfopolymer that has not been lyophilized. The formulation can further comprise a rosin.

The sulfopolymer in the compositions described herein includes an average molecular weight of 2 kDa to 20 kDa, 4 kDa to 18 kDa, 5 kDa to 15 kDa, 5 kDa to 12 kDa, 5 kDa to 11 kDa, 5 kDa to 10 kDa, 5 kDa to 9 kDa, 5 kDa to 8 kDa, or 5 kDa to 7 kDa.

The sulfopolymer in the compositions described herein includes a glass transition temperature ($T_g$) of 30° C. to 120° C., 30° C. to 100° C., 40° C. to 90° C., 40° C. to 80° C., or 50° C. to 70° C.

In one embodiment or in combination with any of the mentioned embodiments, the sulfopolymer has a charge density of at least 0.3 meq/g, or at least 0.5 meq/g, or at least 0.7 meq/g, or at least 0.9 meq/g. In addition or in the alternative, the charge density can be up to 1.5 meq/g, or up to 1.0 meq/g, or up to 0.9 meq/g, or up to 0.8 meq/g, or up to 0.7 meq/g. In one embodiment or in combination with any of the mentioned embodiments, the sulfopolymer has a charge density of from 0.3 to 1.5 meq/g, 0.3 to 0.5 meq/g, 0.5 to 0.7 meq/g, 0.7 to 1.0 meq/g, 0.9 to 1.5 meq/g, 0.5 to 1.0 meq/g. 0.6 to 1.0 meq/g, or 0.8 meq/g to 1.0 meq/g. In any of these embodiments, the sulfopolymer can be a sulfopolyester or a sulfopolyesteramide. The charge density can be calculated according to the procedure disclosed in U.S. Publication No. 2014/0357789, incorporated herein by reference.

In one embodiment or in combination with any of the mentioned embodiments, there is provided a concentrate formulation, composition, combination of compositions, emulsion, or mixture that contains not more than 5 wt % sulfopolymer, or not more than 3 wt % sulfopolymer, or no more than 2.75 wt % sulfopolymer; or no more than 2.5 wt % sulfopolymer, or no more than 2.25 wt % sulfopolymer, or no more than 2 wt % sulfopolymer; or no more than 1.75 wt % sulfopolymer, or no more than 1.5 wt % sulfopolymer, or no more than 1.25 wt % sulfopolymer; or no more than 1 wt % sulfopolymer, or no more than 0.75 wt % sulfopolymer, in each case based on the weight of the concentrate formulation. In addition or in the alternative, the concentrate formulation, composition, combination of compositions, emulsion, or mixture contains at least 0.05 wt % sulfopolymer; or at least 0.075 wt % sulfopolymer; or at least 0.1 wt % sulfopolymer; or at least 0.2 wt % sulfopolymer; or at least 0.3 wt % sulfopolymer; or at least 0.4 wt % sulfopolymer; or at least 0.5 wt % sulfopolymer; or at least 0.75 wt % sulfopolymer; at least 0.9 wt % sulfopolymer; or at least 1 wt % sulfopolymer; or at least 1.25 wt % sulfopolymer; or at least 1.5 wt % sulfopolymer, in each case based on the weight of the concentrate formulation, composition, combination of compositions, emulsion, or mixture. In one embodiment or in combination with any of the mentioned embodiments, the amount of sulfopolymer as described at levels of less than 3 wt % are particularly beneficial in emulsions.

In one embodiment or in combination with any of the mentioned embodiments, there is provided a formulation that contains less than 10 wt %, or no more than 9 wt % sulfopolymer, or no more than 8 wt % sulfopolymer, or no more than 7 wt % sulfopolymer, or no more than 6 wt % sulfopolymer, or no more than 5 wt % sulfopolymer, or no more than 4 wt % sulfopolymer, or no more than 3 wt % sulfopolymer, or no more than 2.5 wt % sulfopolymer, or no more than 2 wt % sulfopolymer or no more than 1.5 wt % sulfopolymer, in each case based on the weight of the sulfopolymer and all water-insoluble or partially water-soluble agrochemical active ingredients in the formulation, composition, combination of compositions, emulsion, or mixture. In addition or in the alternative, the formulation, composition, combination of compositions, emulsion, or mixture contains at least 1 wt % sulfopolymer, or at least 1.5 wt % sulfopolymer, or at least 2 wt % sulfopolymer, or at least 3 wt % sulfopolymer, or at least 4 wt % sulfopolymer, or at least 5 wt % sulfopolymer, or at least 6 wt % sulfopolymer, in each case based on the weight of the sulfopolymer and all water-insoluble or partially water-soluble agrochemical active ingredients in the formulation, composition, combination of compositions, emulsion, or mixture.

In one embodiment or in combination with any of the mentioned embodiments, there is provided a formulation, concentrate, composition, combination of compositions, emulsion, or mixture with high loadings of water-insoluble or partially water-soluble agrochemical active ingredients relative to the weight of the formulation, concentrate, composition, combination of compositions, emulsion, or mixture. In one embodiment or in combination with any of the mentioned use embodiments, the formulation, concentrate, composition, combination of compositions, emulsion, or mixture includes: between 0.0001 wt % and 5 wt % active ingredient; a minimum of 0.005 wt % active ingredient; a minimum of 0.01 wt % active ingredient; a minimum of 0.5 wt % active ingredient; a minimum of 1 wt % active ingredient; a minimum of 1.5 wt % active ingredient; a minimum of 2 wt % active ingredient a minimum of 2.5 wt % active ingredient; a minimum of 3 wt % active ingredient a minimum of 3.5 wt % active ingredient; a minimum of 4 wt % active ingredient; a minimum of 4.5 wt % active ingredient; a minimum of 5 wt % active ingredient; a minimum of 8 wt % active ingredient; a minimum of 10 wt % active ingredient; a minimum of 15 wt % active ingredient; a minimum of 20 wt % active ingredient; a minimum of 25 wt % active ingredient; a minimum of 30 wt % active ingredient; a minimum of 35 wt % active ingredient; a minimum of 40 wt % active ingredient; a minimum of 45 wt % active ingredient; or a minimum of 50 wt % active ingredient; such as between 5 wt % and 75 wt % active ingredient; between 15 wt % and 70 wt % active ingredient; between 30 wt % and 70 wt % active ingredient; between 30 wt % and 60 wt % active ingredient; or from 25 wt % and 70 wt % active ingredient; or from 30 wt % and 70 wt % active ingredient; or from 35 wt % and 70 wt % active ingredient; or from 40 wt % and 70 wt % active ingredient; or from 45 wt % and 70 wt % active ingredient; or no more than 50 wt % active ingredient, based on the weight of the formulation, concentrate, composition, combination of compositions, emulsion, or mixture.

The sulfopolymer can be employed to reduce the total amount or types of surfactants relative to the total amount of formulation, concentrate, composition, combination of compositions, emulsion, or mixture; or relative to the total amount of active ingredient in the formulation, concentrate, composition, combination of compositions, emulsion, or mixture. In one embodiment or in combination with any of the mentioned embodiments, there is provided a formulation, concentrate, composition, combination of compositions, emulsion, or mixture that contains an agrochemically active ingredient and a sulfopolymer and containing not more than a total of 3 wt % surfactants, or no more than 2.9 wt % surfactants, or no more than 2.75 wt % surfactants; or no more than 2.5 wt % surfactants, or no more than 2.25 wt % surfactants, or no more than 2 wt % surfactants; or no more than 1.75 wt % surfactants, or no more than 1.5 wt % surfactants, or no more than 1.25 wt % surfactants, or no more than 1 wt % surfactants, or no more than 0.75 wt % surfactants, in each case based on the weight of the formulation, concentrate, composition, combination of compositions, emulsion, or mixture and where the surfactants determination is inclusive of sulfopolymer. In addition or in the alternative, the formulation, concentrate, composition, combination of compositions, emulsion, or mixture contains at least 0.05 wt % surfactants; or at least 0.075 wt % surfactants; or at least 0.1 wt % surfactants; or at least 0.2 wt % surfactants; or at least 0.3 wt % surfactants; or at least 0.4 wt % surfactants; or at least 0.5 wt % surfactants; or at least 0.75 wt % surfactants; at least 0.9 wt % surfactants; or at least 1 wt % surfactants; or at least 1.25 wt % surfactants; or at least 1.5 wt % surfactants, in each case based on the weight of the formulation, concentrate, composition, combination of compositions, emulsion, or mixture. These amounts can be applicable to any of the agrochemical active loadings mentioned herein, or any of the sulfopolymer concentrations relative to other surfactants mentioned.

As is often the case, a variety of surfactants have to be employed in a single formulation to obtain a variety of effects; or a variety of different types of surfactants have to be employed that are specific to a type of agrochemical active ingredient. The sulfopolymer can be employed as the dominant surfactant that can provide multiple effects in the same formulation or that can be the same surfactant across two or more formulations each having different types of agrochemical active ingredients. In one embodiment or in combination with any of the mentioned embodiments, there is provided a formulation, concentrate, composition, combination of compositions, emulsion, or mixture that contains an (i) agrochemical active ingredient and (ii) one or more sulfopolymers present in an amount of more than 50 wt %, or at least 60 wt %, or at least 65 wt %, or at least 70 wt %, or at least 75 wt %, or at least 80 wt %, or at least 85 wt %, or at least 90 wt %, or at least 92 wt %, or at least 95 wt %, or at least 98 wt %, or at least 99 wt %, or 100 wt %, based on the weight of all surfactants (inclusive of sulopolymer) present in the formulation, concentrate, composition, combination of compositions, emulsion, or mixture; or at a weight ratio of sulfopolymer to all other surfactants (not inclusive of sulfopolymer) of more than 1:1, or at least 1.5:1, or at least 2:1, or at least 2.5:1, or at least 3:1, or at least 3.5:1, or at least 4:1, or at least 5:1, or at least 7:1, or at least 10:1, or at least 15:1, or at least 20:1, or at least 30:1, or at least 50:1, or at least 100:1, or at least 125:1, or at least 150:1, or at least 200:1, or at least 500:1. The formulation can optionally contain not more than the above stated amount of total surfactants (inclusive of sulfopolymer) in the formulation, concentrate, composition, combination of compositions, emulsion, or mixture; e.g. not more than a total of 3 wt % surfactants (inclusive of sulfopolymer), etc., based on the weight of the formulation, concentrate, composition, combination of compositions, emulsion, or mixture. The formulation, concentrate, composition, combination of compositions, emulsion, or mixture can be at any of the mentioned loadings, particularly at the high loadings.

In one embodiment or in combination with any of the mentioned embodiments, there is provided a formulation, concentrate, composition, combination of compositions, emulsion, or mixture that contains an agrochemical active ingredient and one or more sulfopolymers and the formulation, concentrate, composition, combination of compositions, emulsion, or mixture does not contain any other surfactants, or contains not more than 5 wt %, or not more than 4.5 wt %, or not more than 4 wt %, or not more than 3.5 wt %, or not more than 3 wt %, or not more than 2.5 wt %, or not more than 2 wt %, or not more than 1.5 wt %, or not more than 1 wt %, or not more than 0.75 wt %, or not more than 0.5 wt % of other surfactants, based on the weight of the formulation, concentrate, composition, combination of compositions, emulsion, or mixture, especially a concentrate at high loadings.

In one embodiment or in combination with any of the mentioned embodiments, there is provided a process for making multiple (two or more) formulations in which at least two of the formulations contain different agrochemical active ingredients, and these at least two formulations each contain a sulfopolymer or the same sulfopolymer, optionally in any of the amounts stated throughout this disclosure and optionally having any of the stated effects described throughout this disclosure. In one embodiment or in combination with any of the stated embodiments, the sulfopolymer in the at least two formulations containing different agrochemical active ingredients produces at least one common effect, such as stability, wettability, re-dispersibility, etc. The agrochemical active ingredients can be any of those mentioned herein.

The sulfopolymer can have the advantage of providing two or more effects (other than phytotoxicity) with one surfactant, optionally where at least one of the effects is a stable dispersion. In one embodiment or in combination with any of the mentioned embodiments, the sulfopolymer(s) provides the simultaneous effect of a stable dispersion and good spreadability or wetting, or a stable dispersion and low particle drift, or a stable dispersion and low vapor drift, or a stable dispersion and rainfastness, or a stable dispersion and stickiness. In one embodiment or in combination with any of the mentioned embodiments, the sulfopolymer(s) exhibit a non-phytotoxic effect. In each of these cases, the degree of the effect can be any of those mentioned throughout this disclosure. The sulfopolymer amount and surfactant amounts and loadings in the formulation can be any of those mentioned in this disclosure.

In other embodiments of the invention, the ratio of oil phase to sulfopolymer in the formulations by weight can be 500:1 to 1:1, or 400:1 to 1:1, or 300:1 to 1:1, or 250:1 to 1:1, or 200:1 to 1:1, or 150:1 to 1:1, or 100:1 to 1:1, or 90:1 to 1:1, or 80:1 to 1:1, or 70:1 to 1:1, or 60:1 to 1:1, or 50:1 to 1:1, or 40:1 to 1:1, or 30:1 to 1:1, or 100:1 to 30:1, or 100:1 to 40:1, or 100:1 to 50:1, or 100:1 to 60:1, or 100:1 to 70:1, or 100:1 to 80:1, or 90:1 to 30:1, or 90:1 to 40:1, or 90:1 to 50:1, or 90:1 to 60:1, or 90:1 to 70:1, or 90:1 to 80:1, or 90:1 to 30:1, or 80:1 to 60:1, or 80:1 to 70:1, or 85:1 to 80:1, or 70:1 to 30:1, or 70:1 to 40:1, or 70:1 to 50:1, or 70:1 to 60:1, or 75:1 to 70:1, or 60:1 to 40:1, or 60:1 to 50:1, or 60:1 to 50:1. In other embodiments of the invention, the emulsion formulations ratio of oil phase to sulfopolymer by weight can be at least 30:1, or at least 35:1, or at least 40:1, or at least 50:1, or at least 60:1, or at least 70:1, or at least 80:1, or at least 90:1, or at least 100:1, or at least 500:1. In one embodiment or in any of the mentioned embodiments, the formulation in which these ratios apply is an emulsion, a ready to use emulsion, an emulsion concentrate, or an oil-in-water emulsion concentrate.

In other embodiments of the invention, the ratio of agrochemical actives to sulfopolymer in the formulations can be 500:1 to 1:1, or 400:1 to 1:1, or 300:1 to 1:1, or 250:1 to 1:1, or 200:1 to 1:1, or 150:1 to 1:1, or 100:1 to 1:1, or 90:1 to 1:1, or 80:1 to 1:1, or 70:1 to 1:1, or 60:1 to 1:1, or 50:1 to 1:1, or 40:1 to 1:1, or 30:1 to 1:1, or 100:1 to 30:1, or 100:1 to 40:1, or 100:1 to 50:1, or 100:1 to 60:1, or 100:1 to 70:1, or 100:1 to 80:1, or 90:1 to 30:1, or 90:1 to 40:1, or 90:1 to 50:1, or 90:1 to 60:1, or 90:1 to 70:1, or 90:1 to 80:1, or 90:1 to 30:1, or 100:1 to 40:1, or 100:1 to 50:1, or 80:1 to 60:1, or 80:1 to 70:1, or 85:1 to 80:1, or 70:1 to 30:1, or 70:1 to 40:1, or 70:1 to 50:1, or 70:1 to 60:1, or 75:1 to 70:1. In one embodiment or in any of the mentioned embodiments, the formulation in which these ratios apply is a concentrate.

In another embodiment of the invention, the stability at the high loadings of agrochemical actives to sulfopolymer can also be quite good. For example, the stability of the formulation, determined as an oil and water phase separation and measured as a percentage of the height of the clarified aqueous layer relative to total formulation height, after standing undisturbed at room temperature for at least 4 days can be less than 90%, or less than 80%, or less than 70%, or less than 60%, or less than 50%, or less than 40%, or less than 30%, or less than 25%, or less than 10%, or less than 9%, or less than 8%, or less than 7%, or less than 6%, or less than 5%, or less than 4%, or less than 3%, or less than 2%, or less than 1% or no clarified aqueous layer. In another embodiment of the invention, the stability of the formulation determined as above after standing at room temperature for at least 6 days can be less than 90%, or less than 80%, or less than 70%, or less than 60%, or less than 50%, or less than 40%, or less than 30%, or less than 25%, or less than 10%, or less than 9%, or less than 8%, or less than 7%, or less than 6%, or less than 5%, or less than 4%, or less than 3%, or less than 2%, or less than 1% or no clarified aqueous layer. In another embodiment of the invention, the stability determined as above after standing at room temperature for at least 8 days can be less than 90%, or less than 80%, or less than 70%, or less than 60%, or less than 50%, or less than 40%, or less than 30%, or less than 25%, or less than 10%, or less than 9%, or less than 8%, or less than 7%, or less than 6%, or less than 5%, or less than 4%, or less than 3%, or less than 2%, or less than 1% or no clarified aqueous layer. In another embodiment of the invention, the stability determined as above after standing at room temperature for at least 10 days can be less than 90%, or less than 80%, or less than 70%, or less than 60%, or less than 50%, or less than 40%, or less than 30%, or less than 25%, or less than 10%, or less than 9%, or less than 8%, or less than 7%, or less than 6%, or less than 5%, or less than 4%, or less than 3%, or less than 2%, or less than 1% or no clarified aqueous layer. In another embodiment of the invention, the stability determined as above after standing at room temperature for at least 14 days can be less than 90%, or less than 80%, or less than 70%, or less than 60%, or less than 50%, or less than 40%, or less than 30%, or less than 25%, or less than 10%, or less than 9%, or less than 8%, or less than 7%, or less than 6%, or less than 5%, or less than 4%, or less than 3%, or less than 2%, or less than 1% or no clarified aqueous layer. The measurement of the split can be further determined as described in the working examples. Rosins may be contained in or combined with any other ingredient in any of the formulations (e.g. concentrates, or as used formulations, compositions, suspensions, emulsions, dispersions, or adjuvant packages) described herein. Rosins may be introduced into the formulations of this invention either into the concentrate formulation ('in can'), or in RTU's, or at the time of dilution of the concentrate ('in tank'). Rosins can increase the viscosity of the formulations and act to physically or mechanically assist in suspending the particles, and also to resist changes to particle size (as noted throughout, whether solid or liquid) over time making it more difficult for the particles to contact each other and coalesce or agglomerate, thereby assisting in further stabilizing suspensions and emulsions.

In one embodiment or in combination with any of the mentioned embodiments, the formulation, composition, combination of compositions, emulsion, dispersion, or mixture further comprises a rosin such as a rosin resin and/or a rosin ester. The rosin may include a methyl esters of rosin, a glycerol ester of rosin, a triethylene glycol ester of rosin, pentaerythritol ester of rosin, optionally any of the rosins being hydrogenated before or after derivatization (e.g., esterification).

Optionally, the formulation, composition, combination of compositions, emulsion, or mixture includes at least 0.001% rosin, or at least 0.1 wt %, or at least 0.5 wt %, or at least 1.0 wt %, or at least 1.5 wt % rosin, and in addition or in the alternative, up to 15 wt %, or up to 12 wt %, or up to 10 wt %, or up to 8 wt %, or up to 7 wt %, or up to 5 wt %, or up to 4.5 wt %. or up to 4 wt %, or up to 3 wt %, or up to 2.5 wt % or up to 2 wt % of any type of rosin. Exemplary ranges include from 0.1 wt % to 3 wt %, 0.1 w% to 7 wt %, 0.5 wt % to 6.5 wt %, 0.5 wt % to 2.5 wt %, 1.0 wt % to 5.5 wt %, 1.5 wt % to 5.0 wt %, 2.0 wt % to 4.5 wt %, 2.5 wt % to 4.0 wt %, 3.0 wt % to 4.0 wt %, or 1.0 to 2.0 wt % of any type of rosin, relative to the total weight of the formulation, composition, combination of compositions, emulsion, dispersion, or mixture.

In one embodiment or in combination with any of the mentioned embodiments, the formulation, composition, combination of compositions, emulsion, dispersion, or mixture is diluted with water at a volumetric ratio of 1:1, 1:5, 1:10, 1:25, 1:50, 1:75, 1:100, 1:250, 1:500, 1:750, or 1:1000.

In one embodiment or in combination with any of the mentioned embodiments, the water used to produce and/or dilute the composition, combination of compositions, concentrate, formulation, suspension, dispersion or emulsion has a total water hardness in the range of from 0 to 1500 ppm, 0 to 60 ppm, 61 to 120 ppm, 121 to 180 ppm, or 181 to 1500 ppm.

In one embodiment or in combination with any of the mentioned embodiments, there is provided a composition, combination of compositions, concentrate, formulation, suspension, dispersion or emulsion comprising water, wherein the composition, combination of compositions, concentrate, formulation, suspension, dispersion or emulsion has a total water hardness in the range of from 0 to 1500 ppm, 0 to 60 ppm, 61 to 120 ppm, 121 to 180 ppm, or 181 to 1500 ppm. The amount of water in the composition, combination of compositions, concentrate, formulation, suspension, dispersion or emulsion can be any of the amounts mentioned in this disclosure.

In one embodiment or in combination with any of the mentioned embodiments, the composition, combination of compositions, concentrate, formulation, suspension, dispersion or emulsion exhibits a percent spontaneity of dispersion of at least 80%, at least 90%, or at least 95% as measured according to CIPAC method MT 160 using water with a total water hardness in the range of from 0 to 1500 ppm, or in any of the above mentioned ranges.

In one embodiment or in combination with any of the mentioned embodiments, the composition, combination of compositions, concentrate, formulation, suspension, dispersion or emulsion provides a diluted emulsion wherein there is at most 40%, at most 30%, at most 20% or at most 10% free oil, or at most 5%, or at most 2% froth or cream formed at the top or bottom of the emulsion, or the at most 40%, at most 30%, at most 20% or at most 10% free oil, or at most 5%, or at most 2% froth or cream are re-emulsified with at most ten (10) inversions of the test cylinder according to CIPAC method MT 36.1.1 using CIPAC standard water with a total water hardness in the range of from 0 to 1500 ppm, or in any of the above mentioned ranges.

Yet another embodiment, or in combination with any of the mentioned embodiments, is an agrochemical concentrate formulation including: 5 wt % to 90 wt % agrochemical active ingredient or a mixture of two or more agrochemical active ingredients, optionally 0.1 wt % to 10 wt % rosin, and up to 15 wt % of a sulfopolymer that has not been lyophilized. In one embodiment, and in combination with any of the mentioned embodiments, the formulation can further comprise 0.1 wt % to 10 wt % of a rosin.

Another provided embodiment, or in combination with any of the mentioned embodiments, is an agrochemical concentrate formulation including: at least one agrochemical active ingredient; and no more than 15 wt % sulfopolymer that has not been lyophilized; which formulation is characterized by one or more of: dispersibility and/or reliable re-dispersibility of the active ingredient(s); high active ingredient loading capacity; and/or increased stability of the formulation. By way of example, the concentrate formulation may be characterized in comparison to a control agrochemical concentrate formulation not containing the sulfopolymer. In examples of the agrochemical concentrate formulation embodiments, the control agrochemical concentrate formulation is one of: a formulation containing the same components but omitting the sulfopolymer, or a formulation containing the same components but with the sulfopolymer replaced with an industry standard emulsifier. In one embodiment, and in combination with any of the mentioned embodiments, the formulations or compositions further comprise a rosin.

In any of the provided formulations, the sulfopolymer may include a salt of a sulfoisophthalic moiety, such as 5-sodiosulfonate isophthalic acid (5-SSIPA). By way of example, the sulfopolymer includes a sulfopolyester, a sulfopolyamide, or a sulfopolyesteramide.

In certain exemplary formulations, the sulfopolymer includes a sulfopolyester. The sulfopolyester may have an average molecular weight (MW) of at least 2 kDa. By way of specific example, the sulfopolyester in some instances includes one or both of SPE1 or SPE2.

In any of the provided formulations, the agrochemical active agent may include one or more of an herbicide, an insecticide, a fungicide, a nematicide, a molluscicide, a miticide, a larvicide, a fertilizer, and/or a hormone or other growth regulator. Any of the provided formulations may include no more than 14 wt % sulfopolyester; no more than 13 wt % sulfopolyester; no more than 12 wt % sulfopolyester; no more than 11 wt % sulfopolyester; no more than 10 wt % sulfopolyester; no more than 8 wt % sulfopolyester; no more than 5 wt % sulfopolyester; no more than 3 wt % sulfopolyester; no more than 2 wt % sulfopolyester; no more than 1 wt % sulfopolyester; at least 0.05 wt % sulfopolyester; at least 0.075 wt % sulfopolyester; at least 0.1 wt % sulfopolyester; at least 0.2 wt % sulfopolyester; at least 0.3 wt % sulfopolyester; at least 0.4 wt % sulfopolyester; at least 0.5 wt % sulfopolyester; at least 0.75 wt % sulfopolyester; at least 1 wt % sulfopolyester; at least 2 wt % sulfopolyester; at least 3 wt % sulfopolyester; at least 3.5 wt % sulfopolyester; at least 4 wt % sulfopolyester, or at least 4.5 wt % sulfopolyester.

Also provided are formulations of any one of the prior embodiments, or in combination with any of the mentioned embodiments, including: at least 0.005 wt % active ingredient; at least 0.01 wt % active ingredient; between 0.1 wt % and 5 wt % active ingredient; a minimum of 0.05 wt % active ingredient; between 0.05 wt % and 75 wt % active ingredient; between 15 wt % and 70 wt % active ingredient; between 30 wt % and 70 wt % active ingredient; between 30 wt % and 60 wt % active ingredient; or no more than 50 wt % active ingredient.

Additional examples are formulations of any of the prior embodiments, or in combination with any of the mentioned embodiments, further including at least one additional agriculturally acceptable ingredient. In representative examples of such formulations, the at least one additional agriculturally acceptable ingredient includes one or more of: an anti-foaming agent, a dispersal agent, a solubilizer, a viscosity reducing agent, an anti-freeze agent, a sticker, a spreader, a drift control adjuvant, a stabilizing agent, a preservative, an odorant, a colorant, a sequestrant, a chelator, an antioxidant, a buffer or other pH regulator, a solvent, an oil, or a polymer other than the sulfopolymer.

In any of the provided formulation embodiments, or in combination with any of the mentioned embodiments, the stability of the formulation may include one or more of: stability at above 30° C. for at least two weeks; stability at above 40° C. for at least two weeks; stability at above 50° C. for at least two weeks; stability at 54° C. for at least two weeks; stability at ambient temperature for at least two months; stability at ambient temperature for at least four months; stability at ambient temperature for at least six months; stability at ambient temperature for at least eight months; stability at ambient temperature for at least a year; stability at 10° C. or less for at least two weeks; stability at 8° C. or less for at least two weeks; stability at 5° C. or less for at least two weeks; or stability at 5° C. for at least two weeks.

In one embodiment or in combination with any of the mentioned embodiments, the formulation, composition, combination of compositions, adjuvant, emulsion, or mixture further comprises a rosin such as a rosin resin and/or a rosin ester. The rosin may include a methyl ester of rosin, a glycerol ester of rosin, a triethylene glycol ester of rosin, pentaerythritol ester of rosin, optionally any of the rosins being hydrogenated before or after derivatization (e.g., esterification).

Optionally, the formulation, composition, combination of compositions, emulsion, adjuvant, or mixture includes at least 0.001% rosin, or at least 0.1 wt %, or at least 0.5 wt %, or at least 1.0 wt %, or at least 1.5 wt % rosin, and in addition or in the alternative, up to 15 wt %, or up to 12 wt %, or up to 10 wt %, or up to 8 wt %, or up to 7 wt %, or up to 5 wt %, or up to 4.5 wt %. or up to 4 wt %, or up to 3 wt %, or up to 2.5 wt % or up to 2 wt % of any type of rosin. Exemplary ranges include from 0.1 wt % to 3 wt %, 0.1 w% to 7 wt %, 0.5 wt % to 6.5 wt %, 0.5 wt % to 2.5 wt %, 1.0 wt % to 5.5 wt %, 1.5 wt % to 5.0 wt %, 2.0 wt % to 4.5 wt %, 2.5 wt % to 4.0 wt %, 3.0 wt % to 4.0 wt %, or 1.0 to 2.0 wt % of any type of rosin, relative to the total weight of the formulation, composition, combination of compositions, emulsion, adjuvant, or mixture.

It is understood that any formulation provided here can include as a sulfopolymer a recovered sulfopolyester.

Also provided are as-applied agrochemical compositions that include any of the formulation provided herein, diluted in water. By way of example, such as-applied compositions will include: at least 0.001 wt % concentrate formulation; at least 0.01 wt % concentrate formulation; at least 0.05 wt % concentrate formulation; no more than 1 wt % concentrate formulation; no more than 5 wt % concentrate formulation; no more than 8 wt % concentrate formulation; no more than 10 wt % concentrate formulation; no more than 20 wt % concentrate formulation; no more than 25 wt % concentrate formulation; no more than 50 wt % concentrate formulation; or no more than 75 wt % concentrate formulation.

Any of the as-applied agrochemical formulations and agrochemical compositions may be provided applied to a surface of a plant leaf, stem, stalk, branch, flower, fruit, or root, or to growing medium.

Additional embodiments, or in combination with any of the mentioned embodiments, include uses of a sulfopolyester that has not been lyophilized to stabilize an agriculturally active agent in a formulation; uses of a sulfopolyester that has not been lyophilized to homogenously disperse an agriculturally active agent in a formulation; and uses of a sulfopolyester that has not been lyophilized as a surfactant adjuvant in an agrochemical formulation including an agriculturally active ingredient. In any such uses, the sulfopolymer may optionally include a salt of a sulfoisophthalic moiety, such as for instance 5-sodiosulfonate isophthalic acid (5-SSIPA). In other examples of such uses, the sulfopolymer includes a sulfopolyester, a sulfopolyamide, or a sulfopolyesteramide. It is also contemplated that in such uses the sulfopolymer may include a sulfopolyester. In examples of such an embodiment, the sulfopolyester has an average molecular weight (MW) of at least 2 kDa. By way of specific example, the sulfopolyester may include one or both of SPE1 or SPE2. In one embodiment, and in combination with any of the mentioned embodiments, the formulation can further comprise a rosin.

In examples of the use embodiments, or in combination with any of the mentioned embodiments, the agrochemical active agent includes one or more of an herbicide, an insecticide, a fungicide, a nematicide, a molluscicide, a miticide, a larvicide, a fertilizer, and/or a hormone or other growth regulator.

In examples of the use embodiments, or in combination with any of the mentioned embodiments, the use is with a comparison or formulation that contains no more than 14 wt % sulfopolyester; no more than 13 wt % sulfopolyester; no more than 12 wt % sulfopolyester; no more than 11 wt % sulfopolyester; no more than 10 wt % sulfopolyester; no more than 8 wt % sulfopolyester; no more than 5 wt % sulfopolyester; no more than 3 wt % sulfopolyester; no more than 2 wt % sulfopolyester; no more than 1 wt % sulfopolyester; at least 0.05 wt % sulfopolyester; at least 0.075 wt % sulfopolyester; at least 0.1 wt % sulfopolyester; at least 0.2 wt % sulfopolyester; at least 0.3 wt % sulfopolyester; at least 0.4 wt % sulfopolyester; at least 0.5 wt % sulfopolyester; at least 0.75 wt % sulfopolyester; at least 1 wt % sulfopolyester; at least 2 wt % sulfopolyester; at least 3 wt % sulfopolyester; at least 3.5 wt % sulfopolyester; at least 4 wt % sulfopolyester, or at least 4.5 wt % sulfopolyester.

In other example uses, the composition or formulation contains at least 0.005 wt % active ingredient; at least 0.01 wt % active ingredient; between 0.1 wt % and 5 wt % active ingredient; a minimum of 0.5 wt % active ingredient; between 5 wt % and 75 wt % active ingredient; between 15 wt % and 70 wt % active ingredient; between 30 wt % and 70 wt % active ingredient; between 30 wt % and 60 wt % active ingredient; or no more than 50 wt % active ingredient. Optionally, in examples of the provided uses, the composition or formylation further includes at least one additional agriculturally acceptable ingredient. For instance, the at least one additional agriculturally acceptable ingredient may include one or more of: an anti-foaming agent, a dispersal agent, a solubilizer, a viscosity reducing agent, an antifreeze agent, a sticker, a spreader, a drift control adjuvant, a stabilizing agent, a preservative, an odorant, a colorant, a sequestrant, a chelator, an antioxidant, a buffer or other pH regulator, a solvent, an oil, or a polymer other than the sulfopolymer.

It is contemplated that in any of the provided use embodiments, or in combination with any of the mentioned embodiments, there are examples wherein the sulfopolymer includes recovered sulfopolyester.

Also provided is use of the formulations described herein in the preparation of an as-applied agrochemical composition for application to a plant, a plant part, or a growing medium. By way of example, such use may include diluting a volume of the formulation in at least an equal volume of water. For instance, the formulation is diluted into water at volumetric ratio of 1:1, 2:3, 1:2, 2:4, 1:3, 2:7, 1:4, 2:9, 1:5, 1:6, 1:7, 1:8, 1:9, 1:10, 1:50, 1:100, 1:150, 1:200, 1:250, 1:500, 1:750, 1:1000, or a rate more dilute than 1:1000.

Also provided are as-applied agrochemical formulations including: at least one agrochemical active ingredient, and a sulfopolyester that has not been lyophilized. By way of example, such as-applied aqueous formulation may be readily redispersible after settling. In one embodiment, and in combination with any of the mentioned embodiments, the formulation or composition further comprise a rosin.

Another embodiment, or in combination with any of the mentioned embodiments, is an as-applied agrochemical formulation including: at least one agrochemical active ingredient, a sulfopolymer that has not been lyophilized. In one embodiment, and in combination with any of the mentioned embodiments, the formulations or compositions further comprise a rosin.

Yet another embodiment, or in combination with any of the mentioned embodiments, is an as-applied agrochemical formulation including: 0.05 wt % to 20 wt % agrochemical active ingredient or a mixture of two or more agrochemical active ingredients, and up to 5 wt % of a sulfopolymer that has not been lyophilized. In one embodiment, and in combination with any of the mentioned embodiments, the formulation or compositions further comprise a rosin.

Also provided are as-applied agrochemical formulations including: at least one insoluble or partially soluble agrochemical active ingredient; no more than 15 wt % sulfopolymer that has not been lyophilized; which formulation is characterized by one or more of: dispersibility and/or reliable re-dispersibility of the active ingredient(s); high active ingredient loading capacity; and/or increased stability of the formulation. By way of example, such formulations may be characterized in comparison to a control agrochemical as-applied formulation not containing the sulfopolymer. For instance, the control agrochemical as-applied formulation may be one of: a formulation containing the same components but omitting the sulfopolymer, or a formulation containing the same components but with the sulfopolymer replaced with an industry standard emulsifier. In one embodiment, and in combination with any of the mentioned embodiments, the formulation or compositions further comprise a rosin.

In examples of the as-applied formulations and the concentrate formulation described herein, the sulfopolymer includes a salt of a sulfoisophthalic moiety, such as for instance 5-sodiosulfonate isophthalic acid (5-SSIPA). By way of example, the sulfopolymer may include a sulfopolyester, a sulfopolyamide, or a sulfopolyesteramide.

In specific as-applied formulation examples and concentrate formulation examples, the sulfopolymer includes a sulfopolyester. Exemplary sulfopolyesters have an average molecular weight (MW) of at least 2 kDa. By way of specific example, the sulfopolyester may include one or both of SPE1 or SPE2.

In examples of the above as-applied formulations, the agrochemical active agent includes one or more of an herbicide, an insecticide, a fungicide, a nematicide, a molluscicide, a miticide, a larvicide, a fertilizer, and/or a hormone or other growth regulator.

Examples of the above as-applied formulations include: no more than 9 wt % sulfopolyester; no more than 8 wt % sulfopolyester; no more than 7 wt % sulfopolyester; no more than 6 wt % sulfopolyester; no more than 5 wt % sulfopolyester; no more than 3 wt % sulfopolyester; no more than 2 wt % sulfopolyester; no more than 1 wt % sulfopolyester; no more than 0.5 wt % sulfopolyester; no more than 0.3 wt % sulfopolyester; no more than 0.25 wt % sulfopolyester; or no more than 0.1 wt % sulfopolyester.

Examples of the above as-applied formulations include: a minimum of 0.5 wt % active ingredient; between 5 wt % and 75 wt % active ingredient; between 15 wt % and 70 wt % active ingredient; between 30 wt % and 70 wt % active ingredient; between 30 wt % and 60 wt % active ingredient; or no more than 50 wt % active ingredient.

Any of the as-applied formulations may further include at least one additional agriculturally acceptable ingredient. For instance, the at least one additional agriculturally acceptable ingredient include one or more of: an anti-foaming agent, a dispersal agent, a solubilizer, a viscosity reducing agent, an anti-freeze agent, a sticker, a spreader, a drift control adjuvant, a stabilizing agent, a preservative, an odorant, a colorant, a sequestrant, a chelator, an antioxidant, a buffer or other pH regulator, a solvent, an oil, or a polymer other than the sulfopolymer.

Also provided are uses of the herein described as-applied agrochemical compositions and formulations to treat a plant or a growth medium for an agricultural purpose. By way of example, the agricultural purpose may include one or more of: increasing nutrient availability, increasing nutrient uptake, increasing plant growth, decreasing plant growth, increasing seed or fruit set or maturation, inhibiting insect growth or reproduction, inhibiting nematocyte growth or reproduction, inhibiting fungal growth or reproduction, inhibiting mollusk growth or reproduction, killing or repelling insects, killing or repelling nematodes, or killing or repelling mollusks. In any of such uses, the active ingredient may include one or more of a fertilizer, a hormone or other plant growth regulator, an insecticide, a larvicide, a miticide, an herbicide, a fungicide, a nematicide, a rodenticide, or a molluscicide.

Yet another embodiment, or in combination with any of the mentioned embodiments, is a method including: combining a sulfopolymer that has not been lyophilized, and at least one agrochemical active ingredient with water to produce a mixture. In examples of this method, the sulfopolymer is added to the mixture as a homogeneous aqueous dispersion. For instance, the homogenous sulfopolymer dispersion may include: 5-40 wt % sulfopolyester in water; 10-40 wt % sulfopolyester in water; 20-40 wt % sulfopolyester in water; 25-40 wt % sulfopolyester in water; 20-35 wt % sulfopolyester in water; 15-30 wt % sulfopolyester in water; 10-30 wt % sulfopolyester in water; 15 wt % sulfopolyester in water; 20 wt % sulfopolyester in water; 25 wt % sulfopolyester in water; 30 wt % sulfopolyester in water; 35 wt % sulfopolyester in water; or 40 wt % sulfopolyester in water. In further examples of these methods, the sulfopolymer includes a salt of a sulfoisophthalic moiety, such as 5-sodiosulfonate isophthalic acid (5-SSIPA). In additional examples, the sulfopolymer includes a sulfopolyester, a sulfopolyamide, or a sulfopolyesteramide.

In one embodiment, and in combination with any of the mentioned embodiments, a rosin is further combined to produce the mixture.

In yet further examples of the methods of making a mixture, the sulfopolymer is added to the mixture as a solid. In such examples, the method may further include heating the mixture to at least 50° C. while stirring for a time sufficient to generate a substantially homogenous composition. Alternatively, the mixture is heated to at least 60° C., at least 65° C., at least 70° C., at least 80° C., or no more than 85° C. In examples of these methods, the stirring includes high shear force mixing. By way of example, the high shear force mixing includes mixing using a propeller stirrer spinning at 10,000 rpm or equivalent.

In examples of the methods of making a mixture, the insoluble or partially soluble agrochemical active ingredient is added before, during, or after the heating and stirring step. For instance, heating and stirring the mixture may occur before the at least one insoluble or partially soluble agrochemical active ingredient is added to the mixture. In additional examples, heating the mixture includes the water being provided to the mixture at higher than ambient temperature; for instance, the water may be provided to the mixture at: at least 50° C.; at least 60° C.; at least 70° C.; at least 80° C.; or more than 80° C.

In any of the making a mixture methods, there are examples that further include adding at least one additional agriculturally acceptable ingredient. For instance, the at least one additional agriculturally acceptable ingredient may include one or more of: an anti-foaming agent, a dispersal agent, a solubilizer, a viscosity reducing agent, an anti-freeze agent, a sticker, a spreader, a drift control adjuvant, a stabilizing agent, a preservative, an odorant, a colorant, a sequestrant, a chelator, an antioxidant, a buffer or other pH regulator, a solvent, an oil, or a polymer other than the sulfopolymer.

Examples of the method of making a mixture are provided in which the resulting mixture is formulated as a suspension, a solvent dispersion, or an emulsion. By way of example, such formulations that are emulsions may be a solvent-in-water emulsion, a water-in-solvent emulsion, an oil-in-water emulsion, or a water-in-oil emulsion.

Solid particles of agriculturally active ingredients have a tendency to agglomerate when suspended in water, and when the agglomerates are sufficiently large, the dispersion loses its stability resulting in, for instance, a compacted deposition of active ingredient on the bottom of the container. Often, this sediment is difficult to redisperse. However, this agglomeration and/or settling phenomena is resisted by the presence of a sulfopolymer. The optimal size of any given active ingredient particle in a suspension is dependent on the active ingredient, the indication, the mode of action, the target pest, the intended application rate, etc.

Therefore, the optimal size of the particles in a suspension concentrate or formulation is determined on an individual product basis. However, it is critical that the particle size does not change significantly upon storage.

Similarly, in an emulsion concentrate or ready to use agricultural formulation, the agriculturally active ingredient is dissolved in a non-water soluble solvent or is a non-water-soluble liquid itself. The non-water-soluble liquids can be dispersed in an aqueous phase as evenly distributed droplets. These droplets tend to agglomerate into larger droplets, which can result in complete phase separation, frothing or creaming. However, these agglomeration and/or phase separation phenomena are resisted by the presence of a sulfopolymer. The optimal size of droplet within any given formulation is dependent on the active ingredient, the indication, the mode of action, the target pest, the intended application rate, etc.

Therefore, the optimal size of the particles in an emulsion or formulation is determined on an individual product basis. However, it is critical that the particle size does not change significantly upon storage.

In one embodiment or in combination with any of the mentioned embodiments, there is provided a stable formulation (e.g. concentrate or RTU) containing at least one water-insoluble or partially water-soluble agrochemical active ingredient and sulfopolymer, wherein at least 50%, or at least 60%, at least 70%, or at least 80%, or at least 90%, or more than 90% of the particles (regardless of composition) in the formulation have a particle size of less than 2 microns, or not more than 1.95 microns, or not more than 1.9 microns, or not more than 1.7 microns, or not more than 1.5 microns, or not more than 1.3 microns, or not more than 1.1 microns, or not more than 1 micron, or not more than 0.9 microns, or not more than 0.7 microns, or not more than 0.5 microns, or <0.5 microns, or not more than 450 nm, or not more than 400 nm, or not more than 350 nm, or not more than 300 nm, or not more than 250 nm, or not more than 200 nm, or not more than 150 nm, or not more than 100 nm, or not more than 90 nm, or not more than 80 nm, or not more than 70 nm, or not more than 60 nm, or not more than 50 nm, or not more than 40 nm, or not more than 30 nm, or not more than 25 nm, or not more than 20 nm, or not more than 15 nm. The formulation can contain high loadings of the agrochemical active, and low amounts of the sulfopolymers all as described throughout the disclosure, while remaining stable.

In one embodiment or in combination with any of the mentioned embodiments, the particles (regardless of the composition or what the particle contains) in sulfopolymer containing formulations have exceptionally small particle size. The average d90 (a.k.a., Dv(90); the point in the size distribution, up to and including which, 90% of the total volume of material in the sample is contained) particle size of a representative polymer can be less than 2 microns, or not more than 1.95 microns, or not more than 1.9 microns, or not more than 1.7 microns, or not more than 1.5 microns, or not more than 1.3 microns, or not more than 1.1 microns, or not more than 1 micron, or not more than 0.9 microns, or not more than 0.7 microns, or not more than 0.5 microns, or <0.5 microns, or not more than 450 nm, or not more than 400 nm, or not more than 350 nm, or not more than 300 nm, or not more than 250 nm, or not more than 200 nm, or not more than 150 nm, or not more than 100 nm, or not more than 90 nm, or not more than 80 nm, or not more than 70 nm, or not more than 60 nm, or not more than 50 nm, or not more than 40 nm, or not more than 30 nm, or not more than 25 nm, or not more than 20 nm, or not more than 15 nm. In one embodiment or in any of the mentioned embodiments, the particle sizes mentioned above can be d50 particle sizes.

In one embodiment or in combination with any of the mentioned embodiments is an as-applied aqueous suspension formulation including: at least one water-insoluble or partially water-soluble agrochemical active ingredient, and a sulfopolymer, wherein 50%, 60%, 70%, 80%, 90%, or more than 90% of the particles have a particle size less than 2 microns, or not more than 1.95 microns, or not more than 1.9 microns, or not more than 1.7 microns, or not more than 1.5 microns, or not more than 1.3 microns, or not more than 1.1 microns, or not more than 1 micron, or not more than 0.9 microns, or not more than 0.7 microns, or not more than 0.5 microns, or <0.5 microns, or not more than 450 nm, or not more than 400 nm, or not more than 350 nm, or not more than 300 nm, or not more than 250 nm, or not more than 200 nm, or not more than 150 nm, or not more than 100 nm, or not more than 90 nm, or not more than 80 nm, or not more than 70 nm, or not more than 60 nm, or not more than 50 nm, or not more than 40 nm, or not more than 30 nm, or not more than 25 nm, or not more than 20 nm, or not more than 15 nm.

In one embodiment or in combination with any of the mentioned embodiments, there is provided a formulation (e.g. a concentrate or an as-applied formulation, or an emulsion, or a suspension, whether aqueous or water in oil) in which the particle or droplet size growth over time is minimal. This measure is another indication of stability in that the particles or droplets suspended in a dispersion resist agglomeration and separation from the formulation. In one embodiment or in combination with any of the mentioned embodiments, there is provided a formulation (e.g. a concentrate or an as-applied formulation, or an emulsion, or a suspension, whether aqueous or water in oil) containing particles having a particle size increase of no more than 100%, or no more than 80%, or no more than 75%, or no more than 70%, or no more than 60%, or no more than 55%, or no more than 50%, or no more than 45%, or no more than 40%, or no more than 35%, or no more than 30%, or no more than 25%, or no more than 20%, or no more than 15%, or no more than 10%, or no more than 5%, or no more than 4%, or no more than 3%, or no more than 2%, or no more than 1% over the original size of particles from the start of ageing test (i.e. the ageing test in accordance with the Accelerated Storage Procedure Test Method MT 46 published by the Collaborative International Pesticides Analytical Council (CIPAC). As noted in this disclosure, particles as used throughout the disclosure can be solid or liquid (e.g. such as droplets of water insoluble oils or solvents), unless expressly stated as one or the other or the context suggests one or the other. The particle size measurement increase can be any of d10 start vs. d10 final, d50 start vs. d50 final or d90 start vs. d90 final measurements. The sulfopolymer may reside in the aqueous phase. The test method for determining particle size increase or growth is as follows: make a well mixed formulation and immediately deposit the formulation into a container having a height (to the shoulder, if one exists, of the container) to diameter ratio (H/D) anywhere between 20 and 0.7, and a diameter of at least 0.5 inches; and leave the container still for 14 days at 54° C. at 1 atm. The particle size is measured according to the following procedure as a base case ("Base Case"):

The particle sizes are measured before and after aging for 14 days at 54° C. using a Mastersizer 2000 laser diffraction particle size analyzer (Malvern Panalytical), equipped with a Hydro 2000G measuring cell. One gram of a concentrate is added to 10 milliliters of demineralized water optionally containing a 1% by weight solution of Tamol DN depending on which procedure A-C is employed. The mixture is agitated with a pipette until homogeneous. This sample is then added to a mixing tank of the Hydro 2000G sampler. The amount of concentrate is automatically determined by the Mastersizer 2000 by measuring the obscuration while slowly adding the sample. Once the obscuration is between pre-set limits, a sufficient amount of sample has been added and the measurement can take place (all automatically performed by the software). This procedure is performed at the start of the experiment and at the conclusion of the 14 day ageing experiment, and in the case of Procedure C, at the conclusion of the additional room temperature hold time period. The particle size changes described in any of the embodiments are satisfied if obtained according to any of the procedures A-C described below:

A. Base Case with no Tamol DN in the 10 ml of water used to dilute the 1 g of test sample for particle size measurement at the start of the test and no Tamol DN added in the 10 ml of water used to dilute the 1 g of test sample for particle size measurement at the conclusion of the ageing period. B. Base Case with 1 wt % Tamol DN in the 10 ml of water used to dilute the 1 g of test sample for particle size measurement at both the start and conclusion of the ageing period C. Base Case with 1 wt % Tamol DN in the 10 ml of water used to dilute the 1 g of test sample for particle size measurement at the start of the aging experiment, the sample is allowed to stand without agitation for a minimum of an additional 15 days at room temperature after the conclusion of the aging test, and no Tamol DN is added to the 10 ml of water used to dilute the 1 g of test sample for particle size measurement when the particle size is measured at the conclusion of the experimental period.

The percent increase in particle size is determined as (final particle size–initial particle size))/initial particle size× 100. In one embodiment or in combination with any of the mentioned embodiments, any of the mentioned particle sizes, minimums, maximums, and ranges can be with respect to the d10, d50, and d90 particle size. In one embodiment or in combination with any of the mentioned embodiments, there is provided a formulation (e.g. concentrate or an as-applied dispersion, or an emulsion, a suspension, or a formulation, whether aqueous or water in oil) containing particles or water insoluble droplets and further comprising at least one sulfopolymer, having a d10, a d50 or a d90 particle size increase under the same conditions in any of the above mentioned percentage amounts. In one embodiment or in any of the mentioned embodiments, the particle size change can be negative at the conclusion of the test, indicating a particle size decrease. In any of these embodiments, the formulation may also contain at least one water-insoluble or partially water-soluble agrochemical active ingredient, and the sulfopolymer types can be any of these mentioned in this disclosure, and the amount of sulfopolymer can be any of those mentioned throughout this disclosure, and the loading of sulfopolymer and active ingredients can be any of those mentioned in the disclosure.

In one embodiment or in combination with any of the mentioned embodiments, there is provided a formulation (e.g. a concentrate or an as-applied formulation, or an emulsion, a suspension, whether aqueous or water in oil) containing sulfopolymers, wherein the formulation is viscosity stable. By viscosity stable is meant that the viscosity of the formulation does not change (increase or decrease) by more than 150% under the following test conditions: make a well mixed formulation and immediately deposit the formulation into a container having a height (to the shoulder, if one exists, of the container) to diameter ratio (H/D)

anywhere between 20 and 0.7, and a diameter of at least 0.5 inches, and leave the container still for 14 days at 54° C. at 1 atm. The viscosity at the start of the experiment and at 14 days is measured. The percent increase in viscosity is determined as the absolute value of (final viscosity–starting viscosity)/starting viscosity×100. The determination of viscosity is by the following method A Brookfield DVII+Pro Viscometer is used to measure viscosity at 20° C. of the as produced formulation prior to and after aging for 14 days at 54° C. A ULA-DIN-86 spindle is used at a shear rate of 150 rpm, with the viscosity measured after 1 minute. If the formulation phase separates, the final viscosity is measured on the formulation after inverting the formulation according to the methods described in the disclosure to determine redispersibility. If the formulation does not re-disperse or a phase separation remains after inversions according to the described methods, the formulation is deemed not to be viscosity stable. The viscosity stability can also have a viscosity change of not more than 100%, or no more than 80%, or no more than 75%, or no more than 70%, or no more than 60%, or no more than 55%, or no more than 50%, or no more than 45%, or no more than 40%, or no more than 35%, or no more than 30%, or no more than 25%, or no more than 20%, or no more than 15%, or no more than 10%, or not more than 8%, or not more than 5%, or not more than 4%, or not more than 3%, or not more than 2%. In any of these embodiment, the formulation may also contain at least one water-insoluble or partially water-soluble agrochemical active ingredient, and the amount of sulfopolymer can be any of those mentioned throughout this disclosure, and the loading of sulfopolymer and active ingredients can be any of those mentioned in the disclosure, and active ingredients can be any of those mentioned in the disclosure.

The formulations disclosed herein may further comprise a safener. Safeners are chemical compounds that selectively reduce the phytotoxic effects of crop protection agents such as herbicides on crop plants. Safeners can also improve selectivity between crop plants vs weed species targeted by herbicides. Safeners can be applied to crop seeds or they can be applied on plants as a mixture with one or more herbicides.

In one embodiment or in combination with any of the mentioned embodiments provided herein, the composition, concentrate, combination, formulation, suspension, emulsion, dispersion, or mixture disclosed herein further comprises a safener. In addition or in the alternative, the safener does not include quinoline type safeners. The safener can be added to a formulation to make a concentrate or an RTU formulation ("in can") or can be part of an adjuvant package added to a formulation in the field with water (in tank mix).

In one embodiment or in combination with any of the mentioned embodiments provided herein, the composition, combination, concentrate, formulation, emulsion, dispersion, or mixture disclosed herein does not comprise a safener.

The compositions (e.g., concentrates, emulsions, formulations) exhibit at least 30 percent coverage per unit area and a contact angle of at least 76°, wherein the percent coverage per unit area and contact angle are measured according to the procedure described in the specification for measuring the contact angle at a dilution of from 1:10 to 1:100. While not wishing to be bound by theory, it is generally recognized by those skilled in the art that a lower contact angle measurement correlates to a higher percent coverage per unit area provided that the measurements are made with the same formulations, concentrations and on the same or very similar substrates. More simply, one would not expect to obtain good coverage with relatively high contact angles.

In one embodiment or in combination with any of the mentioned embodiments, the composition exhibits a contact angle that is at least 76°, at least 80°, at least 85°, at least 90°, at least 92°, at least 94°, at least 96°, at least 97°, at least 98°, at least 99°, at least 100°, at least 102°, at least 104°, at least 106°, at least 108°, or at least 110°, wherein the contact angle is measured according to the procedure disclosed in the specification at a dilution of from 1:10 to 1:100. In addition or in the alternative, the composition exhibits a contact angle that is no more than 82°, no more than 84°, no more than 86°, no more than 88°, no more than 90°, no more than 92°, no more than 94°, no more than 96°, no more than 98°, or no more than 100°, or no more than 102°, or no more than 104°, or no more than 106°, or no more than 108°, or no more than 110°, wherein the contact angle is measured according to the procedure disclosed herein at a dilution of from 1:10 to 1:100.

In one embodiment or in combination with any of the mentioned embodiments, the composition exhibits a percent coverage per unit area of at least 30%, at least 40%, at least 50%, at least 60%, at least 70%, at least 80%, at least 90% or at least 95%, wherein the percent coverage per unit area is measured according to the procedure disclosed in the specification at a dilution of from 1:10 to 1:100. In addition or in the alternative, the compositions exhibit a contact angle that is at least 76°, at least 80°, at least 85°, at least 90°, at least 92°, at least 94°, at least 96°, at least 97°, at least 98°, at least 99°, at least 100°, at least 102°, at least 104°, at least 106°, at least 108°, or at least 110°, wherein the contact angle is measured according to the procedure disclosed in the specification at a dilution of from 1:10 to 1:100.

In one embodiment or in combination with any of the mentioned embodiments, the composition exhibits a percent coverage per unit area of at least 30%, at least 40%, at least 50%, at least 60%, at least 70%, at least 80%, at least 90% or at least 95%, wherein the percent coverage per unit area is measured according to the procedure disclosed in the specification at a dilution of from 1:10 to 1:100 and have a contact angle that is at least 76°, at least 80°, at least 85°, at least 90°, at least 92°, at least 94°, at least 96°, at least 97°, at least 98°, at least 99°, at least 100°, at least 102°, at least 104°, at least 106°, at least 108°, or at least 110°, wherein the contact angle is measured according to the procedure disclosed in the specification at a dilution of from 1:10 to 1:100. For example, the composition exhibits a percent coverage per unit area of at least 30% and a contact angle of at least 76°, or at least 40% and a contact angle of at least 76° or at least 80°, or at least 50% coverage per unit area and a contact angle of at least 76° or at least 80° or at least 85°, or at least 60% coverage per unit area and a contact angle of at least 85° or at least 90°, or at least 70% coverage per unit area and a contact angle of at least 90° or at least 95°.

(XII) EXAMPLES

Examples 1-24: Preparation and Characterization of Representative SC Formulations General Experimental Procedures for SC Formulations:
Water used in the following examples was tap water from the Ghent, BE municipal water system and was used without further purification or filtration. RHODOPOL® 23 and SOPROPHOR® FLK are products of Solvay and were obtained through distribution. BC Antifoam FDK is a product of Basildon Chemical Company and was obtained through distribution. TERGITOL™ is a product of Dow and was obtained through distribution. Sulfopolyester 1 (SPE1) and Sulfopolyester 2 (SPE2), FORALYN™, Ziram Phyto 97%, and Thiram Phyto 99% are products of Eastman Chemical and were obtained from Eastman Chemical.

For small volume formulations, stirring was accomplished by the use of an IKA® MINISTAR 40 control fitted with an IKA® four blade stirrer of 5 cm or 10 cm diameter. For high shear mixtures, stirring was accomplished by the use of an IKA® T25 digital ULTRA-TURRAX® disperser mixer stirring at 10,000 RPM.

Preparation of a 30% Dispersion of Sulfopolymer 1 (SPE1):

A stock dispersion of SPE1 in water was prepared by suspending pellets of SPE1 (1500 g) in water (3500 ml). The resulting suspension was heated with stirring to 80° C. and held at 80° C. for 30 min then cooled to rt to provide a light-yellow stock dispersion, which was used without further purification.

Preparation of a 30% Dispersion of Sulfopolymer 2 (SPE2):

A stock dispersion of SPE2 in water was prepared by suspending pellets of SPE2 (1500 g) in water (3500 ml). The resulting suspension was heated with stirring to 80° C. and held at 80° C. for 30 min then cooled to rt to provide a light-yellow stock dispersion, which was used without further purification.

Examples 1-6

Water, diethylene glycol (DEG), emulsifier, BC Antifoam FDK and FORALYN™ (if used) were added to a beaker at rt with mechanical stirring. Active ingredient was added slowly while stirring to obtain a homogeneous suspension. Following addition of the active, the mixture was stirred under high shear (for instance, using a rotor homogenizer) while RHODOPOL® 23 was added over a period of 10 min to provide the suspension concentrates described in Table 1.

TABLE 1

Suspension Concentrate Compositions (w/w %)

| | Component | Ex 1 | Ex 2[1] | Ex 3[1] | Ex 4 | Ex 5[1] | Ex 6[1] |
|---|---|---|---|---|---|---|---|
| | Water | 49.15 | 19.11 | 19.11 | 44.15 | 14.11 | 14.11 |
| | DEG | 2.50 | 2.50 | 2.50 | 2.50 | 2.50 | 2.50 |
| Emulsifier | SOPROPHOR® FLK | 3.26 | | | 3.26 | | |
| | SPE2 (30 wt % Dispersion) | | 33.30 | | | 33.30 | |
| | SPE1 (30% Dispersion) | | | 33.30 | | | 33.30 |
| | BC Antifoam FDK | 0.43 | 0.43 | 0.43 | 0.43 | 0.43 | 0.43 |
| | FORALYN™ | | | | 5.00 | 5.00 | 5.00 |
| Active Ingredient | Ziram Phyto 97% | 44.44 | 44.44 | 44.44 | | 44.44 | 44.44 |
| | Thiram Phyto 99% | | | | 44.44 | | |
| | RHODOPOL® 23 | 0.22 | 0.22 | 0.22 | 0.22 | 0.22 | 0.22 |

[1]During the addition of the Ziram or Thiram to the formulations containing a sulfopolymer, a paste formed that required high shear mixing to resolve. After mixing, the formulations provided stable, pourable mixtures.

Stability testing of an SC Formulation

Suspensions were poured into a 250 ml small neck bottle (having a bottle diameter of 6 cm, and height to the shoulder of 4.2 cm), capped and stored at rt for the time indicated in Table 2. Stability was determined by visual inspection, examining each for settling or layer formation. The settling or layer formation was measured with a ruler and expressed as a percentage of the height of the clear layer relative to the total height of the formulation. Each suspension was evaluated for caking and solidification by inverting the bottles five times, for 2 seconds per inversion and visually examining for hard cake layer formation on the bottom.

TABLE 2

Stability testing at RT of Ex 1-6

| Time | Ex 1 | Ex 2 | Ex 3 | Ex 4 | Ex 5 | Ex 6 |
|---|---|---|---|---|---|---|
| T = 0 | Stable | Stable | Stable | Stable | Stable | Stable |
| 1 Day | V Sm. Top Layer | V Sm. Top Layer | V Sm. Top Layer | V Sm. Top Layer | V Sm. Top Layer | V Sm. Top Layer |
| 5 Days | V Sm. Top Layer | V Sm. Top Layer | V Sm. Top Layer | V Sm. Top Layer | V Sm. Top Layer | V Sm. Top Layer |
| 10 Days | V Sm. Top Layer | V Sm. Top Layer | V Sm. Top Layer | V Sm. Top Layer | V Sm. Top Layer | V Sm. Top Layer |

Dispersibility Testing

Water (100 ml) was added to a series of 100 ml graduated cylinders. Aliquots (1-5 ml) of the suspensions prepared in Ex 1-6 were added to the graduated cylinders. For each of the suspension concentrates prepared in Ex 1-6, the aliquot sunk to the bottom of the graduated cylinder. The cylinder was capped with PARAFILM® and inverted several times for 2 sec resulted in homogeneous dispersion of the concentrate formulation.

Examples 7-10

Water, DEG, emulsifier, BC Antifoam FDK and FORALYN™ (if used) were added to a beaker at rt with mechanical stirring. Active ingredient was added slowly while stirring to obtain a homogeneous suspension. Following addition of the active, the mixture was stirred under high shear while RHODOPOL® 23 was added slowly. Following the addition of the RHODOPOL®, the mixture was stirred at 10,000 rpm for an additional 10 min to provide the suspension concentrates described in Table 3.

TABLE 3

Suspension Concentrate Compositions (w/w %).

| | Component | Ex 7 | Ex 8 | Ex 9[1] | Ex 10[1] |
|---|---|---|---|---|---|
| | Water | 49.27 | 35.88 | 33.88 | 47.27 |
| | DEG | 2.50 | 2.50 | 2.50 | 2.50 |
| Emulsifier | SOPROPHOR® FLK | 3.26 | | | 3.26 |
| | SPE2 (30 wt % Dispersion) | | 16.65 | 16.65 | |
| | BC Antifoam FDK | 0.43 | 0.43 | 0.43 | 0.43 |
| | FORALYN ™ | | | 2.00 | 2.00 |
| Active Ingredient | Ziram Phyto 97% | 44.44 | 44.44 | 44.44 | |
| | Thiram Phyto 99% | | | | 44.44 |
| | RHODOPOL® 23 | 0.10 | 0.10 | 0.10 | 0.10 |

[1] During the addition of the Ziram or Thiram to the formulations containing a sulfopolymer, a paste formed that required high shear mixing to resolve. After mixing, the formulations provided stable pourable mixtures.

Stability Testing of an SC Formulation

Suspensions were poured into a 250 ml small neck bottle (having a bottle diameter of 6 cm, and height to the shoulder of 4.2 cm), capped and stored at 54° C. for the time indicated in Table 4. Stability was determined by visual inspection, examining each for settling or layer formation. After 10 days, each suspension was evaluated visually for settling by measuring the amount of clear liquid on top of the formulation, relative to the total height of the formulation (data reported as percentage in Table 4 and for caking and solidification by inverting the bottles five times, for 2 sec per inversion and visually examining for hard cake layer formation on the bottom. The bottles were stored at 54° C. for an additional 4 days after this inversion to provide a total of 14 days storage at 54° C. Images of the bottles after 10 days at 54° C. are shown in FIG. 1.

TABLE 4

Stability testing at 54° C. of Ex 7-10

| Time | Ex 7 | Ex 8 | Ex 9 | Ex 10 |
|---|---|---|---|---|
| T = 0 | Stable | Stable | Stable | Stable |
| 10 Days | 9% | 12% | 12% | 14% |
| 10 day inversions | No Caking | No Caking | No Caking | No Caking |

Dispersibility Testing

Figure 2:
FIG. 2 is a photograph of SC formulations from Ex 7-10, showing dilutions after standing 2 h at rt.

Water (100 ml) was added to a series of 100 ml graduated cylinders. Aliquots (1-5 ml) of the suspension concentrates prepared in Ex 7-10 were added to the graduated cylinders. Following the addition of the formulation concentrate prepared in Ex 7-10, the graduated cylinders were capped with PARAFILM® and inverted 1-5 times for 2 sec per inversion. Visual inspection of the diluted formulation was done immediately following inversion and after standing at rt for 2 h. Settling of the diluted formulation was noted as a less opaque layer on the top of the cylinder and was measured using the graduates. Samples of the diluted formulations were also stored at 54° C. for 14 days, after which minimal settling was noted. All redispersed easily by inversion 1 to 5 times for 2 sec per inversion. Results are tabulated in Table 5. Images of the formulations from Ex 7-10 following dilution and settling for 2 h at rt are shown in FIG. 2.

TABLE 5

Dilution results and Stability of Ex 7-10

| Concentrate Source | Ex 7 | Ex 8 | Ex 9 | Ex 10 |
|---|---|---|---|---|
| Water (ml) | 100 | 100 | 100 | 100 |
| Formulation Concentrate (ml) | 10 | 10 | 10 | 10 |
| t = 0 Clearing Layer Height (ml) | 4 | 0 | 0 | 4 |
| t = 2 hrs Clearing Layer Height (ml) | 20 | 0 | 0 | 4 |

Examples 11-14

Water, DEG, emulsifier, BC Antifoam FDK and FORALYN™ (if used) were added to a beaker at rt with mechanical stirring. Active ingredient was added slowly while stirring to obtain a homogeneous suspension. Following addition of the active, the mixture was stirred under high shear while RHODOPOL® 23 was added over a period of 10 min to provide the suspension concentrates described in Table 6.

TABLE 6

Suspension Concentrates (w/w %)

| | Component | Ex 11 | Ex 12 | Ex 13[1] | Ex 14[1] |
|---|---|---|---|---|---|
| | Water | 50.53 | 45.87 | 43.87 | 48.53 |
| | DEG | 2.50 | 2.50 | 2.50 | 2.00 |
| Emulsifier | SOPROPHOR® FLK | 2.00 | | | 3.26 |
| | SPE2 (30 wt % Dispersion) | | 6.66 | 6.66 | |
| | BC Antifoam FDK | 0.43 | 0.43 | 0.43 | 0.43 |
| | FORALYN ™ | | | 2.00 | 2.00 |
| Active Ingredient | Ziram Phyto 97% | 44.44 | 44.44 | 44.44 | |
| | Thiram Phyto 99% | | | | 44.44 |
| | RHODOPOL® 23 | 0.10 | 0.10 | 0.10 | 0.10 |

[1] During the addition of the Ziram or Thiram to the formulations containing a sulfopolymer, a paste formed that required high shear mixing to resolve. After mixing, the formulations provided stable pourable mixtures.

Stability Testing of an SC Formulation

Suspensions concentrates were poured into a 250 ml small neck bottle (having a bottle diameter of 6 cm, and height to the shoulder of 4.2 cm), capped and stored at 54° C. for the time indicated in Table 7. Stability was determined by visual inspection, examining each for settling or layer formation. The amount of settling was quantified by measuring the height of the clear layer on top of the formulation, expressing the relative settling as a percentage of the total height of the formulation. After 10 days, each suspension was evaluated for caking and solidification by inverting the bottles three times, for 2 sec per inversion and visually examining for hard cake layer formation on the bottom. Following inversion, the samples were poured out of the bottles to examine for precipitate formation. Ex 13 and 14 produced a small layer of precipitate on the bottom of the bottle, which appeared to be a viscous paste. The paste was easily resolved by addition of a small amount of water and manual stirring.

TABLE 7

Stability testing at 54° C. of Ex 11-14

| Time | Exit | Ex 12 | Ex 13 | Ex 14 |
|---|---|---|---|---|
| T = 0 | Stable | Stable | Stable | Stable |
| 5 Days | 4% | 3% | Stable | 2% |
| 10 Days | 8% | 6% | 14% | 6% |
| 10 day after inversions | No Caking | No Caking | No Caking | No Caking |

Dispersibility Testing

Figure 3:
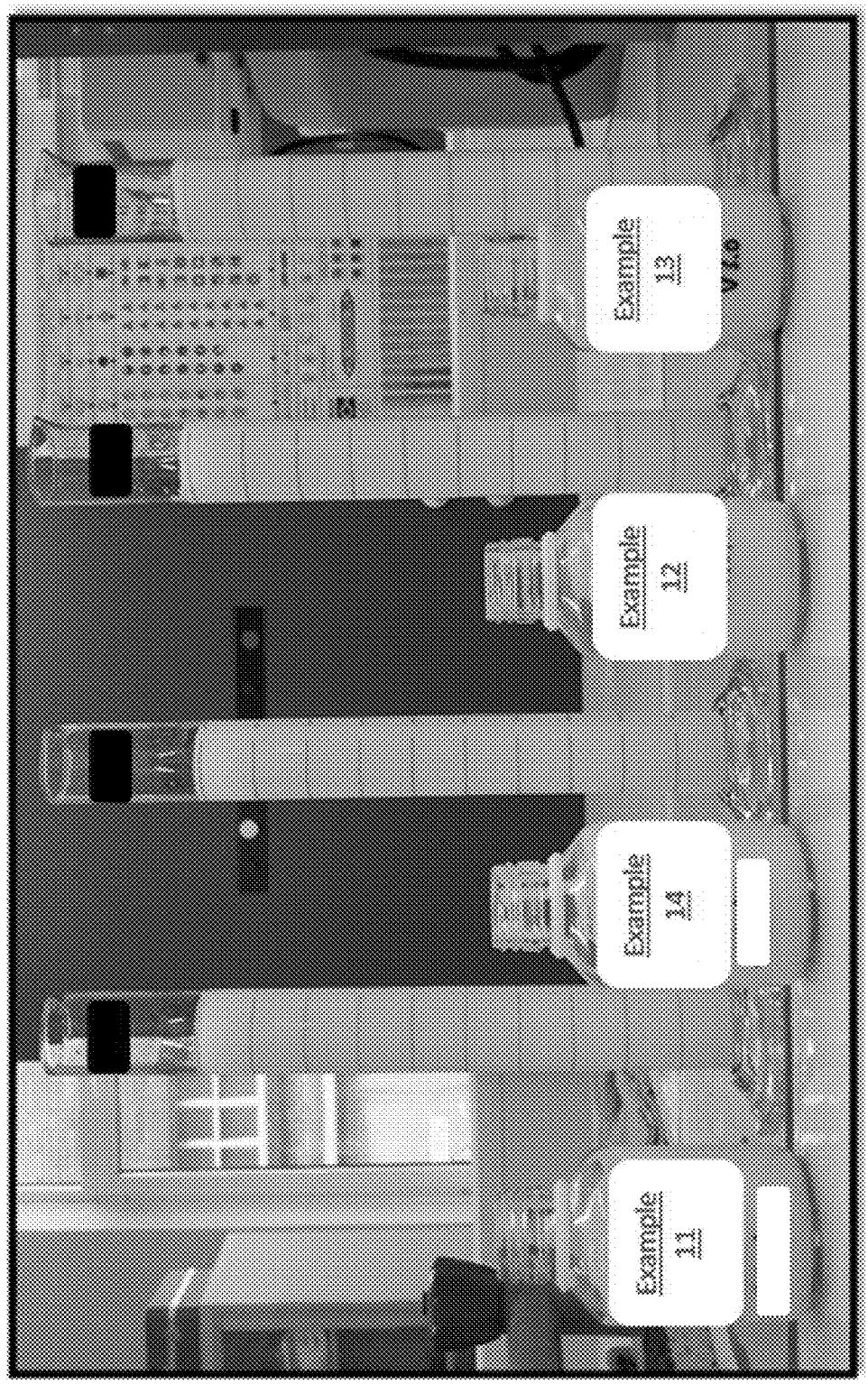
FIG. 3 is a photograph of SC formulations form Ex 11-14, showing dispersion results after standing 1 h at rt.

Water (100 ml) was added to a series of 100 ml graduated cylinders. Aliquots (1 ml) of the suspensions prepared in Ex 11-14 were added to the graduated cylinders. Following the addition of the formulation concentrate prepared in Ex 7-10, the graduated cylinders were inverted 1-5 times for 2 sec. Visual inspection of the diluted formulation was done immediately following inversion and after standing at rt for 1 hour. Settling of the diluted formulation was noted as a less opaque layer on the top of the cylinder and was measured using the graduates. Samples of the diluted formulations were also stored at 54° C. for 14 days, after which minimal settling was noted. All redispersed easily by inversion 1 to 5 times for 2 sec per inversion. Results are tabulated in Table 8. Images of the diluted samples after standing for 1 hour are shown in FIG. 3.

TABLE 8

Dilution results and Stability of Ex 11-14

| Concentrate Source | Ex 11 | Ex 12 | Ex 13 | Ex 14 |
|---|---|---|---|---|
| Water (ml) | 100 | 100 | 100 | 100 |
| Formulation Concentrate (ml) | 1 | 1 | 1 | 1 |
| t = 0 Clearing Layer Height (ml) | 0 | 0 | 0 | 0 |
| t = 1 hrs Clearing Layer Height (ml) | 0 | 0 | 0 | 0 |

Examples 15-18

Water, DEG, emulsifier, BC Antifoam FDK and FORALYN® (if used) were added to a beaker at rt with mechanical stirring. For examples including TERGITOL™ XD, the resulting suspensions were mildly heated while stirring. Active ingredient was added slowly while stirring to obtain a homogeneous suspension. Following addition of the active, the mixture was stirred under high shear while RHODOPOL® 23 was added over a period of 10 min to provide the suspension concentrates described in Table 9.

TABLE 9

Suspension Concentrates (w/w %)

| | Component | Ex 15 | Ex 16 | Ex 17 | Ex 18 |
|---|---|---|---|---|---|
| | Water | 48.32 | 36.67 | 46.32 | 34.67 |
| | DEG | 6.00 | 6.00 | 6.00 | 6.00 |
| Emulsifier | TERGITOL ™ XD | 5.00 | | 5.00 | |
| | SPE2 (30 wt % Dispersion) | | 16.65 | | 16.65 |
| | BC Antifoam FDK | 0.50 | 0.50 | 0.50 | 0.50 |
| | FORALYN ™ | | | 2.00 | 2.00 |
| Active Ingredient | Ziram Phyto 97% | 40.00 | 40.00 | 40.00 | 40.00 |
| | RHODOPOL ® 23 | 0.18 | 0.18 | 0.18 | 0.18 |

Stability Testing of an SC Formulation

Figure 4:
FIG. 4 is a photograph of SC formulations from Ex 15-18, showing the amount of splitting after 10 days at 54° C.

Suspension concentrates were poured into a 250 ml small neck bottle (having a bottle diameter of 6 cm, and height to the shoulder of 4.2 cm), capped and stored at 54° C. for the time indicated in Table 10. Stability was determined by visual inspection, examining each for settling or layer formation. The amount of settling was quantified by measuring the height of the clear layer on top of the formulation, expressing the relative settling as a percentage of the total height of the formulation. After 14 days, each suspension was evaluated for caking and solidification by inverting the bottles three times, for 2 sec per inversion and visually examined for hard cake layer formation on the bottom. Following inversion, the samples were poured out of the bottles to examine for precipitate formation. Ex 13 and 14 produced a thin layer of precipitate on the bottom of the bottle, which appeared to be a viscous paste. The paste was easily resolved by addition of a small amount of water and manual stirring. Images of the formulations after 14 days at 54° C. are shown in FIG. 4.

TABLE 10

Stability Testing at 54° C.

| Time | Ex 15 | Ex 16 | Ex 17 | Ex 18 |
|---|---|---|---|---|
| T = 0 | Stable | Stable | Stable | Stable |
| 5 Days | Stable | Stable | Stable | Stable |
| 10 Days | 5% | 3% | 3% | 3% |
| 14 day | 5% | 3% | 3% | 3% |
| 14 days + inversion | No caking | No caking | No caking | No caking |

Dispersibility Testing: Visual evaluation

Figure 5:
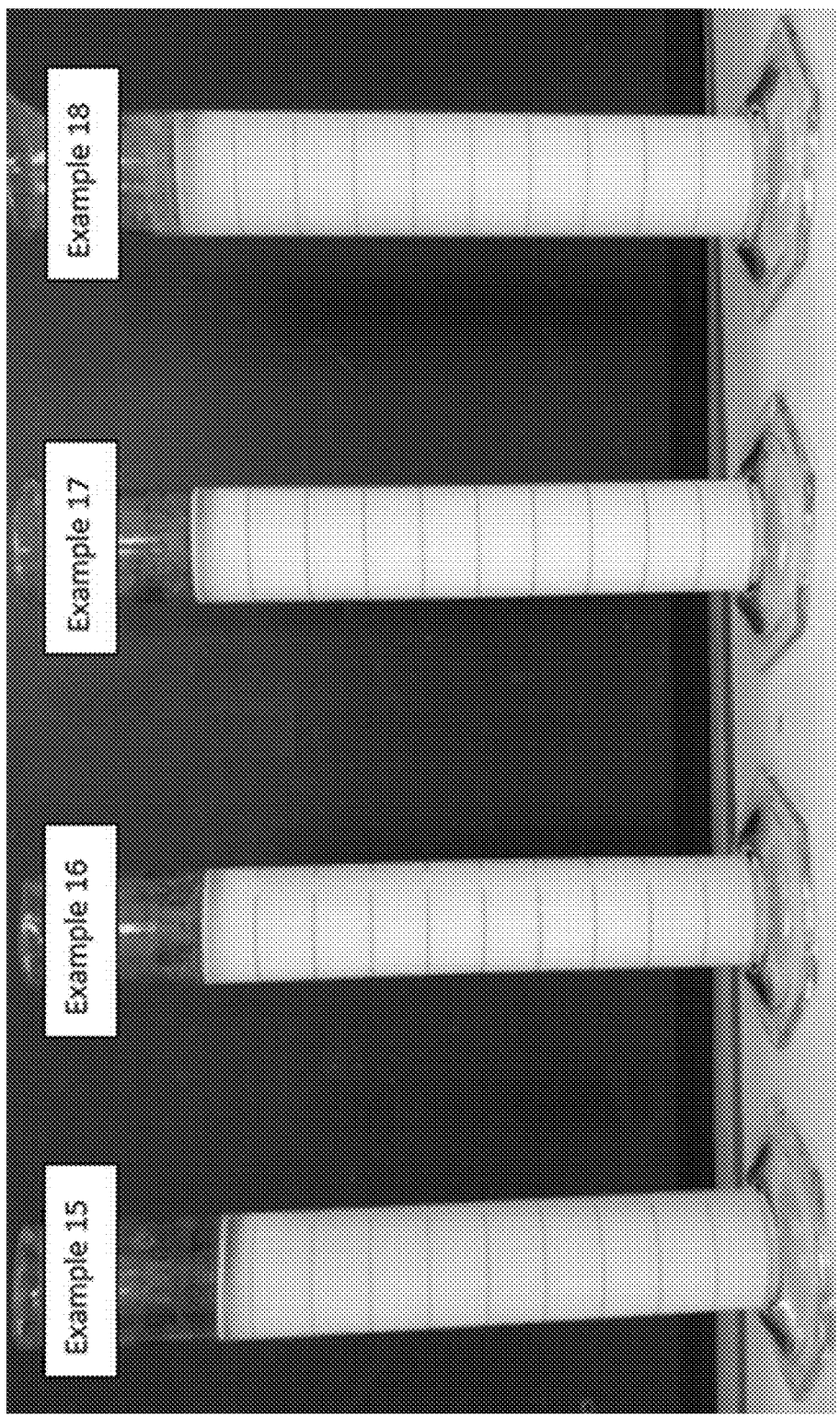
FIG. 5 is a photograph of SC formulations from Ex 15-18, showing dilutions after standing 8 h at rt.

Water (100 ml) was added to a series of 100 ml graduated cylinders. Aliquots (1-5 ml) of the suspensions prepared in Ex 15-18 were added to the graduated cylinders. Following the addition of the formulation concentrate prepared in Ex 15-18, the graduated cylinders were inverted 1-5 times for 2 sec. Visual inspection of the diluted formulation was done immediately following inversion and after standing at rt for 8 h. Settling of the diluted formulation was noted as a less opaque layer on the top of the cylinder and was measured using the graduates. Results are tabulated in Table 11. Images of the diluted samples after standing for 8 h are shown in FIG. 5.

Samples of the diluted formulations were also stored at 54° C. for 14 days, after which minimal settling was noted and they all redispersed easily by inversion 1 to 5 times for 2 sec per inversion. All of the formulations prepared in Ex 15-18 were stable, with no settling noted in the dilution testing.

TABLE 11 results dispersibility after 8 h at rt for Ex 15-18

| Concentrate Source | Ex 15 | Ex 16 | Ex 17 | Ex 18 |
|---|---|---|---|---|
| Water (ml) | 100 | 100 | 100 | 100 |
| Formulation Concentrate (ml) | 1 | 1 | 1 | 1 |
| t = 0 Clearing Layer Height (ml) | 0 | 0 | 0 | 0 |
| t = 8 hrs Clearing Layer Height (ml) | 3 | 2 | 2 | 2 |

Dispersibility Testing: Residual Evaluation

A total of 5.00 g suspension (equals to 2.5 g dry matter) was added in a beaker of 100 ml before adding 15 ml of standard water 'Type D' (342 ppm Hardness, pH 6-7). This was shaken by hand for 2 min with a frequency of 120 rotations per minute.

After shaking, the suspension was left to rest for 4 min. The suspension then was transferred quantitatively into a specifically made 250 ml measuring cylinder with glass cap; the distance between the 0 ml and 250 ml mark contained 20 to 21.5 cm and the distance between the 250 ml mark and the glass cap was 4 to 6 cm. The cylinder was graduated per 5 ml. Once the suspension was transferred into this cylinder, the mixture was diluted with Standard water type D, up to the 250 ml mark. Then the glass cap was installed before the mixture was inverted 30 times (180° inversion) in 1 minute. After inverting, the cylinder was left to rest for 30 min. After 1 min rest, foam formation can also be evaluated.

After the 30 min rest, the top part of the liquid was removed by suction using a glass suction tube of 40 cm long, diameter 5 mm so that only the bottom 25 ml of the suspension remained in the cylinder. This 25 ml was then transferred quantitatively into a tarred petri dish and left on a warm water bath (70-100° C.) to dry. Once the largest part of the water was evaporated, the petri dish was left in a drying oven (70-90° C.) for about 2 h, to remove the residual amount of water. The petri dish was then left to cool to rt before the amount of precipitate was weighed. The amount of precipitation in relation to the amount of dry matter (introduced to the cylinder) was then calculated to give a percentage of dispersibility.

Dispersibility testing was of the formulations of Ex 15-18 was performed on both before and after storage (14 days at 54° C.). Results are shown in Table 12.

TABLE 12

Dispersibility results of Ex 15-18

|  | Ex 15 | Ex 16 | Ex 17 | Ex 18 |
|---|---|---|---|---|
| Before Storage | 99.20% | 98.29% | 98.72% | 97.11% |
| After 14 days @ 54° C. | 98.70% | 97.63% | 98.52% | 97.29% |

Examples 19-24

Water, DEG, emulsifier, BC Antifoam FDK and FORALYN® (if used) were added to a beaker at rt with mechanical stirring. Captan 95% fungicide/bactericide was added slowly while stirring to obtain a homogeneous suspension. Following addition of the active, the mixture was stirred under high shear while RHODOPOL® 23 was added over a period of 10 min to provide the suspension concentrates described in Table 13.

TABLE 13

Suspension Concentrates (w/w %)

| | Component | Ex 19 | Ex 20 | Ex 21 | Ex 22 | Ex 23 | Ex 24 |
|---|---|---|---|---|---|---|---|
| | Water | 49.15 | 19.11 | 19.11 | 44.15 | 14.11 | 14.11 |
| | DEG | 2.50 | 2.50 | 2.50 | 2.50 | 2.50 | 2.50 |
| Emulsifier | SOPROPHOR® FLK | 3.26 | | | 3.26 | | |
| | SPE2 (30 wt % Dispersion) | | 33.30 | | | 33.30 | |
| | SPE1 (30% Dispersion) | | | 33.30 | | | 33.30 |
| | BC Antifoam FDK | 0.43 | 0.43 | 0.43 | 0.43 | 0.43 | 0.43 |
| | FORALYN™ | | | | 5.00 | 5.00 | 5.00 |
| Active | Captan 95% | 44.44 | 44.44 | 44.44 | 44.44 | 44.44 | 44.44 |
| Ingredient | RHODOPOL® 23 | 0.22 | 0.22 | 0.22 | 0.22 | 0.22 | 0.22 |

Stability Testing of an SC Formulation

Figure 6:
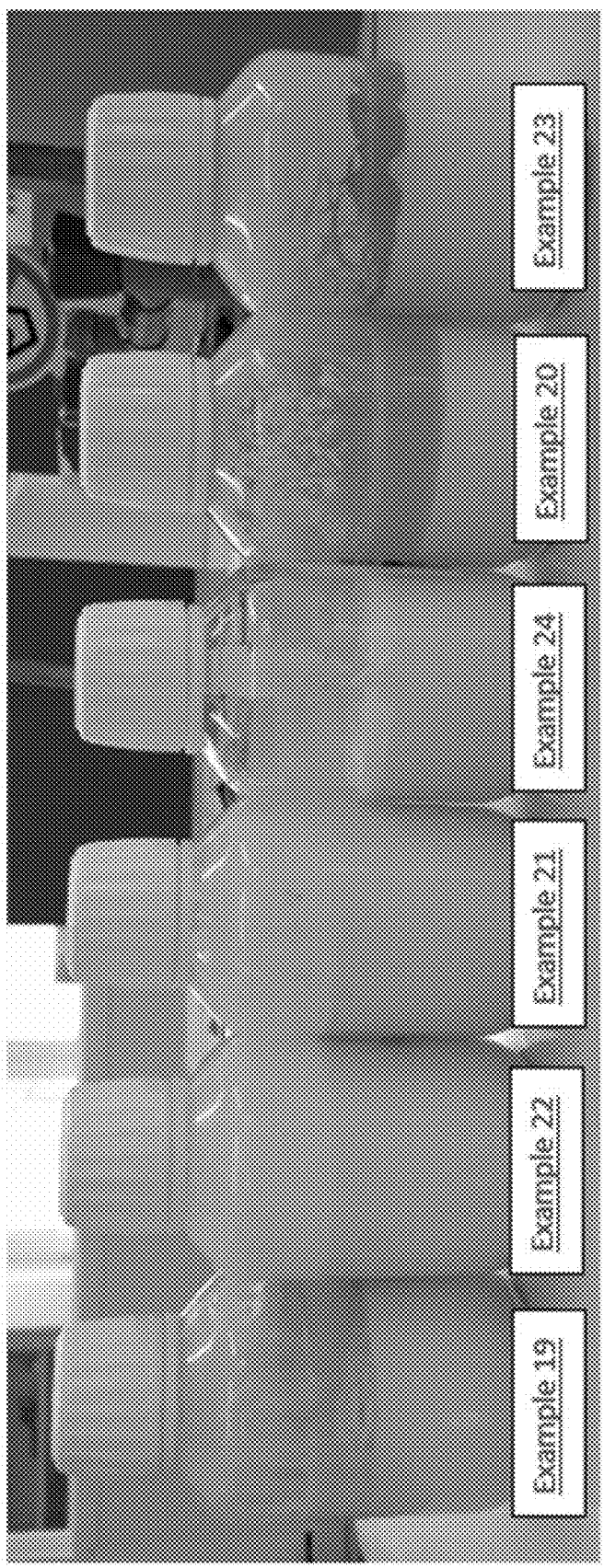
FIG. 6 is a photograph of SC formulations from Ex 19-24, showing the amount of splitting after 10 days at rt.

Suspensions were poured into a 250 ml small neck bottle (having a bottle diameter of 6 cm, and height to the shoulder of 4.2 cm), capped and stored at rt for the time indicated in Table 14. Stability was determined by visual inspection, examining each for settling or layer formation. If layer formation was noticed, it was quantified by measuring the height of the clear layer on top and expressed as a percentage of clear layer relative to the total height of the formulation. After 10 days, each suspension was evaluated for caking and solidification by inverting the bottles three times, for 2 sec per inversion and visually examining for hard cake layer formation on the bottom. Results of the stability testing are shown in Table 14. Images of the formulations for Ex 19-24 are shown in FIG. 6.

TABLE 14

Stability Testing at Rt

| Time | Ex 19 | Ex 20 | Ex 21 | Ex 22 | Ex 23 | Ex 24 |
|---|---|---|---|---|---|---|
| T = 0 | Stable | Stable | Stable | Stable | Stable | Stable |
| 1 day | Sm. Top Layer | Sm Top Layer | Gel | Stable | Sm Top Layer | Gel |

TABLE 14-continued

| | Stability Testing at Rt | | | | | |
|---|---|---|---|---|---|---|
| Time | Ex 19 | Ex 20 | Ex 21 | Ex 22 | Ex 23 | Ex 24 |
| 10 Days | Sm. Top Layer | Large Top Layer | Gel | Stable | Large Top Layer | Gel |
| 10 day inversions | No Caking | Cake Formed | Gel | no Caking | Cake Formed | Gel |

Examples 25-47 and 49

Preparation and Characterization of Representative EW Formulations General Experimental Procedures for EW Formulations:

Water used in the following examples was tap water from the Ghent, BE municipal water system and was used without further purification or filtration. RHODOPOL® 23 and SOPROPHOR® FLK are products of Solvay and were obtained through distribution. BC Antifoam FDK is a product of Basildon Chemical Company and was obtained through distribution. TERGITOL™ is a product of Dow and was obtained through distribution. Radia 7956—Methylated seed oil (MSO) was obtained from Oleon. Petronas White Oil (PWO) was obtained from Petronas Lubricants. Banana Oil was obtained from Petronas Lubricants. Rosins FORALYN™ and ABALYN™ were obtained from Eastman Chemical Company. Sulfopolyester 1 (SPE1) and Sulfopolyester 2 (SPE2) were obtained from Eastman Chemical Company. SOLVESSO™ 150ND is a product of ExxonMobil and was obtained through distribution. For small volume formulations, stirring was accomplished by the use of an IKA® MINISTAR 40 control fitted with an IKA® four blade stirrer of 5 cm or 10 cm diameter. For high shear mixtures, stirring was accomplished by the use of an IKA® T25 digital ULTRA-TURRAX® mixer stirring at 10,000 RPM.

Preparation of a 30% Dispersion of SPE1:

A stock dispersion of SPE1 in water was prepared by suspending pellets of SPE1 (1500 g) in water (3500 ml). The resulting suspension was heated with stirring to 80° C. and held at 80° C. for 30 min then cooled to rt to provide a light-yellow 30% stock dispersion, which was used without further purification.

Preparation of a 30 wt % Dispersion of SPE2:

A stock dispersion of SPE2 in water was prepared by suspending pellets of SPE2 (1500 g) in water (3500 ml). The resulting suspension was heated with stirring to 80° C. and held at 80° C. for 30 min then cooled to rt to provide a light-yellow 30% stock dispersion, which was used without further purification.

Emulsions characterized in these examples were prepared according to one of the following two general methods. Details of the formulations preparations are shown in Table 15.

Emulsion Preparation Method 1:

Water was placed in a beaker and heated to 80° C. with stirring. Solid pellets (an amount required to achieve the desired wt % in the final formulation) of Sulfopolyester (SPE1) were added and the suspension was stirred at 80° C. until the pellets were completely dispersed. In a separate beaker, the oil phase was warmed to 80° C. with stirring. Following complete dispersion of the sulfopolyester, BC Antifoam FDK was added to the beaker containing sulfopolyester under high shear. Following the addition of the Antifoam, the oil phase was added to the aqueous layer over approximately 1 minute at 80° C. The resulting mixture was stirred under high shear for 10 min. Rosin was added (if used) at 80° C. while stirring under high shear. Following the addition of the rosin (if used) the mixture was cooled to rt over 25 min while continuing to stir under high shear to afford a milky white emulsion.

Emulsion Preparation Method 2:

Water was placed in a beaker and heated to 80° C. with stirring. Solid pellets (an amount required to achieve the desired wt % in the final formulation) of Sulfopolyester (SPE1) were added and the suspension was stirred at 80° C. until the pellets were completely dispersed. Following complete dispersion of the sulfopolyester, BC Antifoam FDK was added to the beaker containing sulfopolyester under high shear. Following the addition of the Antifoam, the oil phase (at rt) was added to the aqueous layer over approximately 1 min at 80° C. The resulting mixture was stirred under high shear for 10 min. Rosin was added (if used) at 80° C. while stirring under high shear. Following the addition of the rosin (if used) the mixture was cooled to rt over 25 min while continuing to stir under high shear to afford a milky white emulsion.

TABLE 15

| | | | Emulsion Formulations | | | | | | |
|---|---|---|---|---|---|---|---|---|---|
| | | | | | | Oil Phase (wt %) | | | |
| Ex # | Method | SP1 (wt %) | SP2 (wt %) | FDK | MSO | PWO | Banana Oil | Abalyn | Foralyn | Water |
| 25 | 2 | | 10 | 8 | | | | | | 82 |
| 26 | 2 | | 10 | 8 | | | | | 5 | 77 |
| 27 | 2 | | 10 | 8 | | | | 5 | | 77 |
| 28 | 2 | 10 | | 8 | | | | | | 82 |
| 29 | 2 | 10 | | 8 | | | | | 5 | 77 |
| 30 | 2 | 10 | | 8 | | | | 5 | | 77 |
| 31 | 2 | | 2 | 2 | | | | | | 96 |
| 32 | 2 | | 2 | 2 | | | | | 2 | 94 |
| 33 | 1 | | 1 | 6 Drops | 50 | | | | | 49 |
| 34 | 2 | | 1 | 6 Drops | 50 | | | | | 49 |
| 35 | 1 | 1 | | 6 Drops | 50 | | | | | 49 |
| 36 | 2 | 1 | | 6 Drops | 50 | | | | | 49 |

TABLE 15-continued

Emulsion Formulations

| | | | | Oil Phase (wt %) | | | | | |
|---|---|---|---|---|---|---|---|---|---|
| Ex # | Method | SP1 (wt %) | SP2 (wt %) | FDK | MSO | PWO | Banana Oil | Abalyn | Foralyn | Water |
| 37 | 1 | | 1.5 | 6 Drops | 50 | | | | | 48.5 |
| 38 | 1 | 1.5 | | 6 Drops | 50 | | | | | 48.5 |
| 39 | 2 | 1 | | 6 Drops | 60 | | | | | 39 |
| 40 | 2 | 1 | | 6 Drops | 60 | | | | | 39 |
| 41 | 2 | 1 | | 6 Drops | | 60 | | | | 39 |
| 42 | 2 | | 1 | 6 Drops | 65 | | | | | 34 |
| 43 | 2 | 1 | | 6 Drops | | 65 | | | | 34 |
| 44 | 2 | | 1 | 6 Drops | 70 | | | | | 29 |
| 45 | 2 | 1 | | 6 Drops | | 70 | | | | 29 |
| 46 | 2 | | 1 | 6 Drops | 60 | | | | 2 | 37 |
| 47 | 2 | | 1 | 0.2 | 65 | | | | 2 | 31.8 |
| 48 | 2 | | 1 | 0.2 | | 65 | | | 2 | 31.8 |
| 49 | 2 | | 1 | 0.2 | | | 65 | | 2 | 31.8 |

Figure 7:
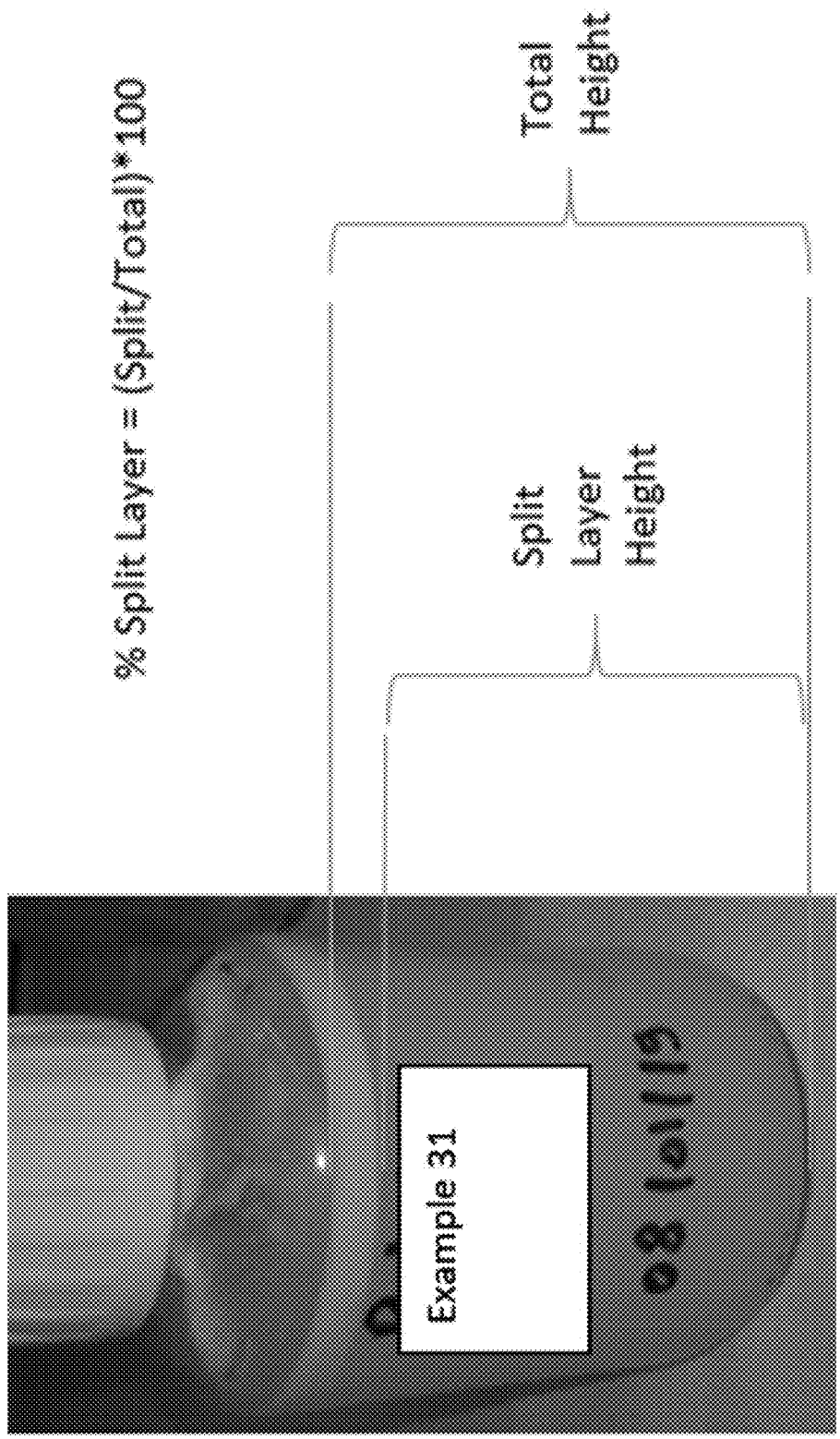
FIG. 7 illustrates the method used for quantifying the percentage of the split layer. It is a photograph of an EW formulation from Ex 31, showing the amount of splitting after 1 h at rt.

Stability Testing of EWs:

The EWs at rt were poured into a 250 ml small neck bottle (having a bottle diameter of 6 cm, and height to the shoulder of 4.2 cm), capped and stored at rt for the time indicated in Table 16-Table 19. Stability was determined by visual inspection, examining each for split layer formation. The extent of split layer formation was measured using a ruler, and expressed as a percentage of the total emulsion height. Each EW was evaluated for easy re-emulsification by inverting the bottle up to five times, for 2 sec per inversion. Measurement of the split layer and calculation of the % split is shown in FIG. 7.

Figure 8:
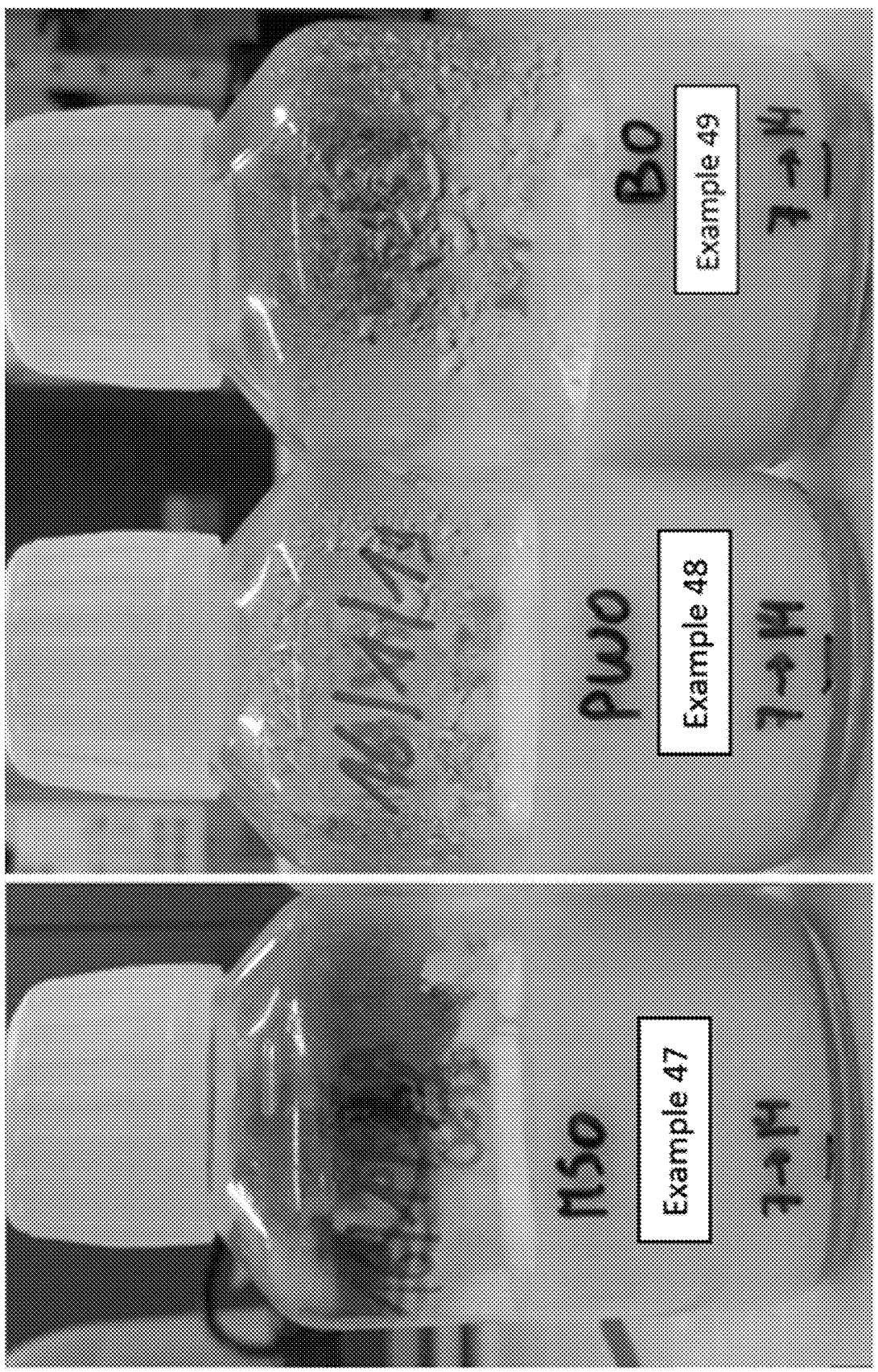
FIG. 8 is a photograph of EW formulations from Ex 47, 48, and 49, showing the amount of splitting after 14 days at 54° C.

Stability Testing of EWs at 54° C.:

Formulations prepared in Ex 23, 24, and 26 were poured into a 250 ml small neck bottle (having a bottle diameter of 6 cm, and height to the shoulder of 4.2 cm), capped and stored at 54° C. for 14 days. Stability was determined by visual inspection, examining each for split layer formation. The extent of split layer formation was measured with a ruler and expressed as a percentage of the total emulsion height. Results of the elevated temperature testing are shown in Table 19. Images of Ex 47-49 are shown in FIG. 8, after 14 days storage at 54° C.

TABLE 16

Ex 25-32 Stability

| | Ex 25 | Ex 26 | Ex 28 | Ex 29 | Ex 30 | Ex 31 | Ex 32 |
|---|---|---|---|---|---|---|---|
| 1 hour | 69% | 69% | 76% | 63% | 63% | 88% | 93% |

TABLE 17

Ex 33-39 Stability

| | Ex 33 | Ex 34 | Ex 36 | Ex 37 | Ex 38 | Ex 39 |
|---|---|---|---|---|---|---|
| 5 days | 14% | 18% | 27% | | | |
| 4 days | | | | 8% | 12% | 6% |

TABLE 18

Ex 40-45 Stability

| | Ex 40 | Ex 41 | Ex 43 | Ex 44 | Ex 45 |
|---|---|---|---|---|---|
| 4 days | 7% | 9% | 5% | no split | no split |

TABLE 19

Ex 47, 48, and 49 Stability

| | Ex 47 | Ex 48 | Ex 49 |
|---|---|---|---|
| 14 Days (RT) | 9% | 3% | 19% |
| 14 days (54° C.) | 4% | 7% | 18% |

Figure 9:
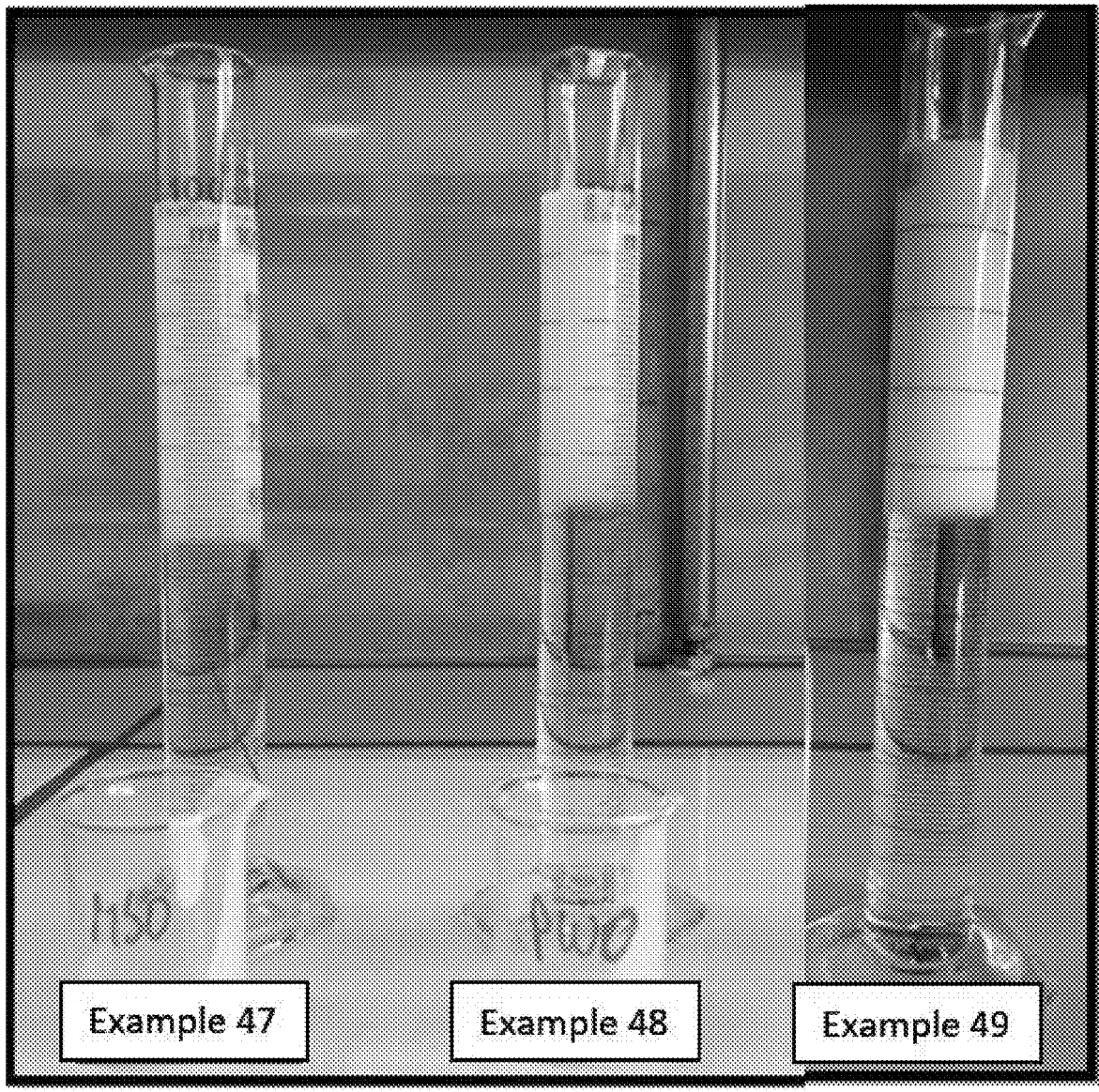
FIG. 9 is a photograph of EW formulations from Ex 47, 48, and 49, showing dispersion immediately after dilution and prior to inversion, at rt.
Figure 10:
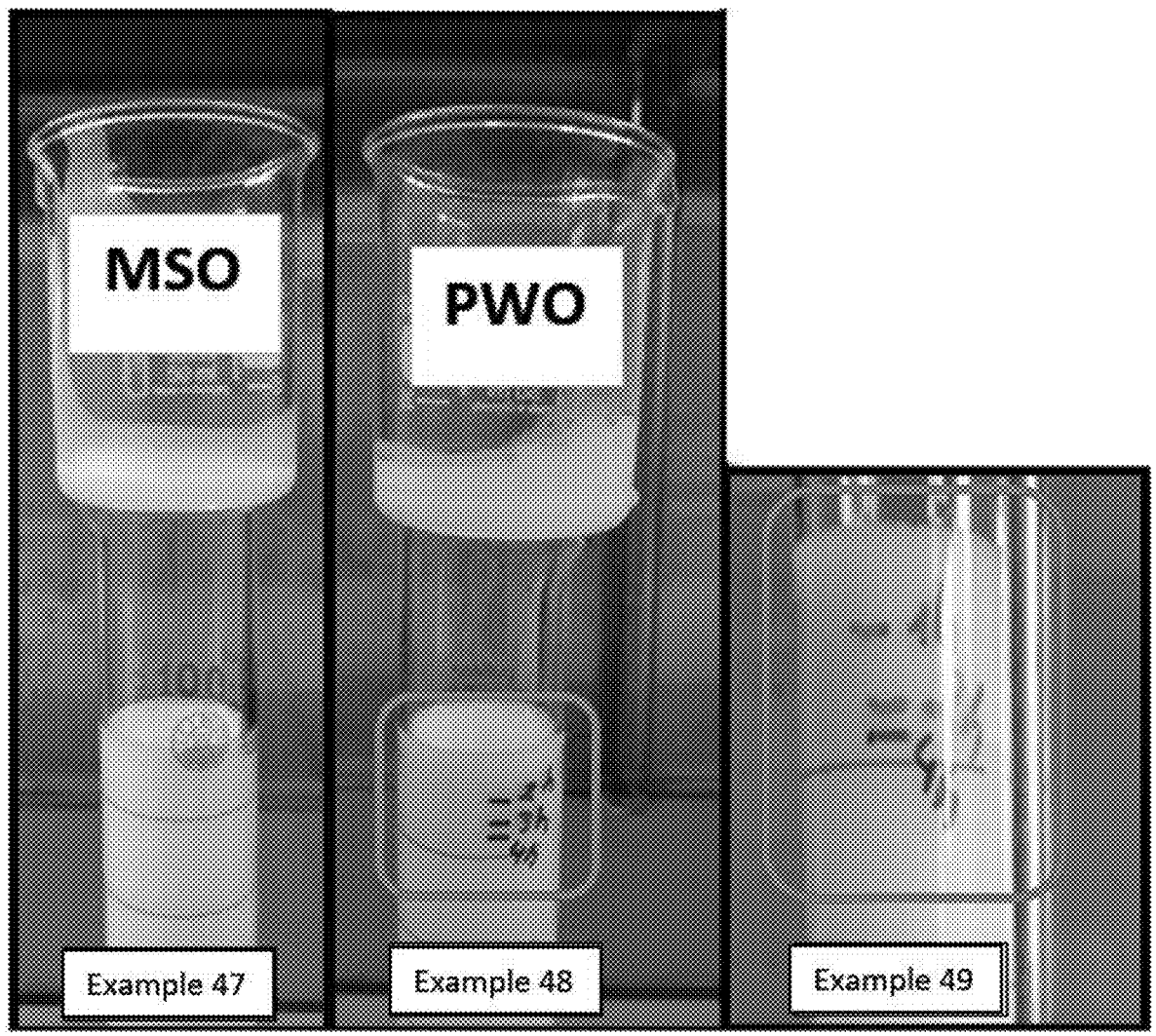
FIG. 10 is a photograph of EW formulations from Ex 47, 48, and 49, showing dispersion 4 h after dilution and inversion, at rt.

Dispersibility Testing:

Water (100 ml) was added to a series of 100 ml graduated cylinders. Aliquots (1-5 ml) of the suspensions prepared in Ex 47-49 were added to the graduated cylinders. Following the addition of the formulation concentrate prepared in Ex 47, 48, and 49, the extent of spontaneous dispersion was determined by measurement of the cloudy layer formed using the graduates on the cylinder and calculated by the following formula: % Dispersion =(height of cloudy top layer/total height of liquid)*100. Images of the samples immediately after dilution but before inversion are shown in FIG. 9. The graduated cylinders were capped with parafilm and inverted up to 5 times for 2 sec. Visual inspection, looking for a more clear layer in the milky emulsions, of the diluted formulation was done immediately following inversion and after standing at rt for 4 h. Results are tabulated in Table 20. Images of the top of the column 4 h after inversion are shown in FIG. 10. For any of the diluted formulations that showed a splitting character, a single inversion for two sec re-dispersed the emulsion evenly throughout the cylinder (data not shown). Illustrative images are provided in FIG. 10.

TABLE 20

Dispersion results for Representative Emulsions

|  | Ex 47 | Ex 48 | Ex 49 |
|---|---|---|---|
| t = 0, Spontaneous Dispersion | 50% | 45% | 43% |
| t = 0 h split after inversion | 0% | 0% | 0% |
| t = 4 h split after inversion | 0% | 7% | 8% |

Example 50: Preparation of an Emulsion of NEEM Oil

Water (26.8 ml) is placed in a beaker and heated to 80° C. with stirring. Solid pellets (1 g) of Sulfopolyester (SPE1 or SP) are added and the suspension is stirred at 80° C. until the pellets are completely dispersed. Following complete dispersion of the sulfopolyester, BC Antifoam FDK (0.2 g) is added to the beaker containing sulfopolyester with stirring at 10,000 rpm. Following the addition of the Antifoam, Neem Oil (70 g) (at rt) is added to the aqueous layer over approximately 1 min at 80° C. with stirring at 10,000 rpm. The resulting mixture is stirred under high shear for 10 min following the completion of the addition of the oil. The mixture is cooled to rt over 25 min while continuing to stir under high shear to afford a milky white emulsion.

Example 51: Preparation of an Emulsion of NEEM Oil with Rosin

Water (26.8 ml) is placed in a beaker and heated to 80° C. with stirring. Solid pellets (1 g) of sulfopolyester (SPE1 or another SP) are added and the suspension is stirred at 80° C. until the pellets are completely dispersed. Following complete dispersion of the sulfopolyester, BC Antifoam FDK (0.2 g) is added to the beaker containing sulfopolyester with stirring at 10,000 rpm. Following the addition of the Antifoam, Neem Oil (70 g) (at rt) is added to the aqueous layer over approximately 1 minute 80° C. with stirring at 10,000 rpm. The resulting mixture is stirred under high shear for 10 min following the completion of the addition of the oil. FORALYN™ (2 g) (or another rosin) is added at 80° C. while stirring under high shear. Following the addition of the FORALYN™, the mixture is cooled to rt over 25 min while continuing to stir under high shear to afford a milky white emulsion.

Example 52: Preparation of Pyraclostrobin (21 wt % Formulation)

Pyraclostrobin (35 g) is added to SOLVESSO™ 150ND (73.4 ml) at rt and stirred until complete dissolution to provide a 35 wt % solution. Water (38.8 ml) is placed in a beaker and heated to 80° C. with stirring. Solid pellets (1 g) of sulfopolyester (SPE1 or another SP) are added and the suspension is stirred at 80° C. until the pellets are completely dispersed. Following complete dispersion of the sulfopolyester, the solution is cooled to rt and BC Antifoam FDK (0.2 g) is added with stirring at 10,000 rpm. Following the addition of the Antifoam, the Pyraclostrobin solution (60 g) (at rt) is added to the aqueous layer over approximately 1 min at rt with stirring at 10,000 rpm. The resulting mixture is stirred under high shear for 25 min to afford a milky white emulsion.

Example 53: Preparation of Pyraclostrobin (21 wt % Formulation) with Rosin

Pyraclostrobin (35 g) is added to SOLVESSO™ 150ND (73.4 ml) at rt and stirred until complete dissolution to provide a 35 wt % solution. Water (36.8 ml) is placed in a beaker and heated to 80° C. with stirring. Solid pellets (1 g) of sulfopolyester (SPE1 or another SP) are added and the suspension is stirred at 80° C. until the pellets are completely dispersed. Following complete dispersion of the sulfopolyester, the solution is cooled to rt and BC Antifoam FDK (0.2 g) is added with stirring at 10,000 rpm. Following the addition of the Antifoam, the Pyraclostrobin solution (60 g) (at rt) is added to the aqueous layer over approximately 1 min at rt with stirring at 10,000 rpm (high shear). The resulting mixture is stirred under high shear for 10 min following the completion of the addition of the organic solution. FORALYN™ (2 g) (or another rosin) is added while stirring under high shear. Following the addition of the FORALYN™, the mixture is stirred under high shear for 25 min to afford a milky white emulsion.

Examples 54-59: Rainfastness Characterization of Representative Formulations General Experimental Procedures for SC Formulations: Water used in the following examples was tap water from the Ghent, BE municipal water system and was used without further purification or filtration. RHODOPOL® 23 and SOPROPHOR® FLK are products of Solvay and were obtained through distribution. BC Antifoam FDK is a product of Basildon Chemical Company and was obtained through distribution. TERGITOL™ is a product of Dow and was obtained through distribution. Sulfopolyester 1 (SPE1) and Sulfopolyester 2 (SPE 2), FORALYN™ Ziram Phyto 97% and Thiram Phyto 99% were products of Eastman Chemical and were obtained from Eastman Chemical. For small volume formulations, stirring was accomplished by the use of an IKA® minister 40 control fitted with an IKA® four blade stirrer of 5 cm or 10 cm diameter. For high shear mixtures, stirring was accomplished using an IKA® T25 digital ULTRA TURRAX® mixer stirring at 10,000 RPM.

Example 54: Preparation of a 30% Dispersion of SPE2

A stock dispersion of SPE2 Sulfopolyester in water was prepared by suspending pellets of SPE2 (1500 g) in water (3500 ml). The resulting suspension was heated with stirring to 80° C. and held at 80° C. for 30 min then cooled to rt to provide a light-yellow stock dispersion, which was used without further purification. A similar preparation can be made using SPE1 in place of SPE2.

Example 55: Preparation of a Concentrated Formulation containing SPE2

Ziram Phyto (44.44 g) is added slowly to a mixture of water (35.88 g), fluorescein (1 g) DEG (2.5 g), SPE2 (16.65 g, 30% dispersion prepared in Ex 54), and BC Antifoam FDK (0.43 g) with mechanical stirring at rt. The resulting suspension is stirred at 10,000 rpm while RHODOPOL 23 (0.10 g) is added. The resulting suspension is stirred for an additional 10 min at 10,000 rpm to provide a milky white suspension.

Example 56: Preparation of a Concentrated Formulation not Containing SPE2

Ziram Phyto (44.44 g) is added slowly to a mixture of water (35.88 g), fluorescein (1 g) DEG (2.5 g), SOPROPHOR® FLK (3.26 g), and BC Antifoam FDK (0.43 g) with mechanical stirring at rt. The resulting suspension is stirred at 10,000 rpm while RHODOPOL® 23 (0.10 g) is added. The resulting suspension is stirred for an additional 10 min at 10,000 rpm to provide a milky white suspension.

Example 57: Preparation of a Spray Mix using Concentrate from Example 54

The suspension from Ex 54 (1 g) is added to water (99 ml) at rt with stirring. The resulting mixture is stirred for an additional 10 min at 5000 rpm to afford a milky white suspension. The suspension is transferred to a hand-held spray bottle.

Example 58: Preparation of a Spray Mix using Concentrate from Example 56

The suspension from Ex 56 (1 g) is added to water (99 ml) at rt with stirring. The resulting mixture is stirred for an additional 10 min at 5000 rpm to afford a milky white suspension. The suspension is transferred to a hand-held spray bottle.

Example 59: Rainfastness Testing

The diluted formulations (1 ml) prepared in Ex 57 and Ex 58 are sprayed onto a set (3 each) of 3 inch square parafilm sheets stretched across stainless steel plates that have been pre-weighed. Following deposition of the spray, the parafilm sheets and backing are allowed to dry overnight and weighed. An initial count of the fluorescence intensity is done using a UV light and digital camera.

Following the initial image, the samples are exposed to simulated rain at a rate of 1 inch/h in an environmental chamber at rt. The samples are removed at 15, 30 and 60 min time. Following removal from the chamber, the samples are dried and weighed. The residual fluorescence is measured using a UV light and a digital camera and is evaluated visually and expressed as a comparative.

The formulations containing SPE1 and SPE2 are expected to demonstrate a higher residual fluorescence (and therefore better rainfastness), both in terms of absolute fluorescence and as a percentage of the initial fluorescence for all durations of rain exposure.

Examples 60-63: Drift Reduction Characterization of Representative Formulations

General Experimental Procedures for SC Formulations:

Water used in the following examples was tap water from the Ghent, BE municipal water system and was used without further purification or filtration. RHODOPOL® 23 and SOPROPHOR® FLK are products of Solvay and were obtained through distribution. BC Antifoam FDK is a product of Basildon Chemical Company and was obtained through distribution. TERGITOL™ is a product of Dow and was obtained through distribution. Sulfopolyester 1 (SPE1) and Sulfopolyester 2 (SPE2), FORALYN™, Ziram Phyto 97% and Thiram Phyto 99% were products of Eastman Chemical and were obtained from Eastman Chemical. Dicamba 48% SL is a 48% solution in water of the dimethyl amine salt of dicamba and is a product of AgLogic Chemical and is obtained through distribution. For small volume formulations, stirring was accomplished by the use of an IKA® minister 40 control fitted with an IKA® four blade stirrer of 5 cm or 10 cm diameter. For high shear mixtures, stirring was accomplished using an IKA® T25 digital ULTRA TURRAX® mixer stirring at 10,000 RPM.

Example 60: Preparation of a 30 wt % Dispersion of SPE2

A stock dispersion of SPE2 Sulfopolyester in water was prepared by suspending pellets of SPE2 (1500 g) in water (3500 ml). The resulting suspension was heated with stirring to 80° C. and held at 80° C. for 30 min then cooled to rt to provide a light-yellow stock dispersion, which was used without further purification. A similar preparation can be made using SPE1 in place of SPE2.

Example 61: Preparation of a 4.8 wt % Solution of Dicamba

Dicamba 48 wt % SL (10 ml) is added with stirring at rt to water (90 ml). The resulting solution is stirred for 10 min at rt, transferred to a glass bottle and sealed with a screw cap to afford a clear liquid EP1.

Example 62: Preparation of a 4.8 wt % Solution of Dicamba with 1.5% SPE2

The dispersion of SPE2 prepared in Ex 60 (5 ml) is added with stirring to water (85 ml) at rt. Dicamba 48 wt % SL (10 ml) is added to the mixture with stirring.

The resulting solution is stirred at rt for 10 min, transferred to a glass bottle and capped with a screw cap to afford a clear liquid EP2.

Example 63: Evaluation of Volatility

While there are many methods available to determine the impact of spray drift of agricultural products such as herbicides, volatility is often difficult to measure. This exemplary method is derived from a method described in US2016/0015033A1.

Non-Dicamba tolerant soy beans are grown to a stage of 2-4 leaves in 10 cm square peat pots in a growth chamber.

An aliquot (1 ml) of the solution prepared in Ex 61 is transferred into a petri dish. Into a second petri dish is transferred an aliquot (0.5 ml) of the solution prepared in Ex 61. The process is repeated for two additional petri dishes, using aliquots from the solution prepared in Ex 62 to obtain four petri dishes in total, two with solution from Ex 61 (EP1) and two with solution from Ex 62 (EP2). The dishes are allowed to dry completely at rt, then placed in the end of four flats designed to hold small potted plants (one petri dish per flat). At the opposite end of the flat are placed four pots containing the non-dicamba tolerant soy bean plants. The flat is covered with a clear plastic grow dome, that has multiple ½" holes cut in each end. A fan is used to draw air across the dome, end to end, with the air flow going from the end with the petri dish to the end with the soy bean seedlings. After 24 h, the seedlings are removed and allowed to grow in the green house for an additional 7 days. Following the 7 day growth period, the plants are evaluated for damage due to exposure to Dicamba vapors. It is predicted that visual observation will indicate that the plants in the growth chambers with solution EP2 from Ex 62 (containing SPE2) suffered less injury than those from the growth chambers with solution EP1 from Ex 61 (containing no sulfopolymer).

Examples 64-67: Sticker Characterization of Representative Formulations General Experimental Procedures for SC Formulations Water used in the following examples was tap water from the Ghent, BE municipal water system and was used without further purification or filtration. RHODOPOL® 23 and SOPROPHOR® FLK are products of Solvay and were obtained through distribution. BC Antifoam FDK is a product of Basildon Chemical Company and was obtained through distribution. TERGITOL™ is a product of Dow and was obtained through distribution. Sulfopolyester 1 (SPE1) and Sulfopolyester 2 (SPE 2), FORALYN™, Ziram Phyto 97% and Thiram Phyto 99% are products of Eastman Chemical and were obtained from Eastman Chemical. For small volume formulations, stirring was accomplished by the use of an IKA® minister 40 control fitted with an IKA® four blade stirrer of 5 cm or 10 cm diameter. For high shear mixtures, stirring was accomplished using an IKA® T25 digital ULTRA TURRAX® mixer stirring at 10,000 rpm.

Example 64: Preparation of a 30 wt % Dispersion of SPE2

A stock dispersion of SPE2 Sulfopolyester in water was prepared by suspending pellets of SPE2 (1500 g) in water (3500 ml). The resulting suspension was heated with stirring to 80° C. and held at 80° C. for 30 min then cooled to rt to provide a light-yellow stock dispersion, which was used without further purification.

Example 65: Preparation of SPE2 (2% w/w %) SC formulation

Water (45.87 ml), DEG (2.5 g), SPE2 (6.66 g of 30 wt % Dispersion), and BC Antifoam FDK (0.43 g) were added to a beaker at rt with mechanical stirring. Ziram Phyto (44.44 g) was added slowly while stirring. During the addition of the Ziram to the formulation a paste formed that required high shear mixing to resolve. Following addition of the active, the mixture was stirred under high shear while RHODOPOL® 23 (0.1 g) was added slowly. Following the addition of the RHODOPOL®, the mixture was stirred at 10,000 rpm for 10 min to provide the suspension concentrate E1 as a milky white suspension.

Example 66: Preparation of SOPROPHOR® FLK SC Formulation

Water (50.53 ml), DEG (2.5 g), SOPROPHOR® FLK (2.00), and BC Antifoam FDK (0.43 g) were added to a beaker at rt with mechanical stirring. Ziram Phyto (44.44 g) was added slowly while stirring. During the addition of the Ziram to the formulation a paste formed that required high shear mixing to resolve. Following addition of the active, the mixture was stirred under high shear while RHODOPOL® 23 (0.1 g) was added slowly. Following the addition of the RHODOPOL®, the mixture was stirred at 10,000 rpm for 10 min to provide the suspension concentrate CE1 as a milky white suspension.

Example 67: Sticker Characterization of Formulations

Parafilm is used to mimic the waxy surface of a leaf. The SC formulations of Ex 65 and Ex 66 are diluted at 10:1 into water and mixed to provide milky white dispersions. 0.5 ml of each dispersion is coated onto individual 2 cm square films of parafilm and allowed to dry overnight. The film is then dipped 100 times into a water bath at rt for 2 sec per dip. The film is again allowed to dry. The mass of the film containing the coatings is measured and compared to the mass of the film prior to dipping. Results are expressed as a ratio of mass after dipping to before dipping to evaluate SPE2 as a sticker adjuvant. The residual mass is higher for the coatings containing SPE2 than in the comparative example. This method is adapted from a method taught in U.S. Pat. No. 9,668,472.

Examples 68-72: Spreader Characterization of Representative Formulations

It is understood in the art that contact angle measurement is one methodology used to determine the ability of an adjuvant to effect spreading on a waxy substrate, such as a leaf. For example, WO97/23281 describes the use of contact angle measurements in an agricultural adjuvant.

General Experimental Procedures for SC Formulations:

Water used in the following examples was tap water from the Ghent, BE municipal water system and was used without further purification or filtration. RHODOPOL® 23 and SOPROPHOR® FLK are products of Solvay and were obtained through distribution. BC Antifoam FDK is a product of Basildon Chemical Company and was obtained through distribution. TERGITOL™ is a product of Dow and was obtained through distribution. Sulfopolyester 1 (SPE1) and Sulfopolyester 2 (SPE 2), FORALYN™, Ziram Phyto 97% and Thiram Phyto 99% were products of Eastman Chemical and were obtained from Eastman Chemical. For small volume formulations, stirring was accomplished by the use of an IKA® minister 40 control fitted with an IKA® four blade stirrer of 5 cm or 10 cm diameter. For high shear mixtures, stirring was accomplished using an IKA® T25 digital ULTRA TURRAX® mixer stirring at 10,000 RPM. Contact angle measurements were done on a KRUSS DSA100 drop shape analyzer, using 200 µl sample size and Parafilm as the substrate.

Measurements were made at 10 sec time and 5.0 fps.

Examples 68-72

Water, DEG, emulsifier, BC Antifoam FDK and FORALYN™ (if used) were added to a beaker at rt with mechanical stirring. For examples including TERGITOL™ XD, the resulting suspensions were mildly heated while stirring. Active ingredient was added slowly while stirring. During the addition of the Ziram to the formulations containing SPE polymers, a paste formed that required high shear mixing to resolve. Following addition of the active, the mixture was stirred under high shear while RHODOPOL® 23 was added slowly. Following the addition of the RHODOPOL®, the resulting mixture was stirred at 10,000 rpm for an additional 10 min to provide the suspension concentrates described in Table 21.

TABLE 21

Suspension Concentrates (w/w %)

| | Component | Ex 68 | Ex 69 | Ex 70 | Ex 71 | Ex 72 |
|---|---|---|---|---|---|---|
| | Water | 48.32 | 36.67 | 46.32 | 34.67 | 100.00 |
| | DEG | 6.00 | 6.00 | 6.00 | 6.00 | |
| Emulsifier | TERGITOL™ XD | 5.00 | | 5.00 | | |
| | SPE2 (30 wt % Dispersion) | | 16.65 | | 16.65 | |
| | BC Antifoam FDK | 0.50 | 0.50 | 0.50 | 0.50 | |
| | FORALYN™ | | | 2.00 | 2.00 | |
| Active Ingredient | Ziram Phyto 97% | 40.00 | 40.00 | 40.00 | 40.00 | |
| | RHODOPOL® 23 | 0.18 | 0.18 | 0.18 | 0.18 | |

Contact Angle Measurements

The suspension concentrates prepared in Ex 68-72 were diluted with water (1:10). The contact angle was measured on a Parafilm substrate by depositing 200 μl on the parafilm surface. As can be seen, relative to a blank sample of water, the contact angle for the SPE containing suspensions is lower than the blank, indicating the drop has spread on the surface relative to water alone. All examples were measured 4 times, results shown are calculated mean values. Results are shown in Table 22.

TABLE 22

Contact Angle Measurements for Suspension Concentrates 1-4

| Ex # | Dilution Rate | Mean contact angle (°) |
|---|---|---|
| 68 | 1:10 | 73.57 |
| 69 | 1:10 | 75.66 |
| 70 | 1:10 | 99.03 |
| 71 | 1:10 | 95.51 |
| 72 | — | 112.2 |

Examples 73-74: Phytotoxicity Characterization of Representative Formulations General Experimental Procedures for Phytotoxicity Studies Corn and soy bean seedlings are grown to a stage of 2-4 leaves in 10 cm square peat pots. Once the seedlings reach the 2-4 leaf stage, they are segregated into three different test groups, containing a minimum of 5 pots per test group for each plant species. The plants are placed in growth chambers, where they are grown throughout the study at constant temperature and humidity levels, with light cycles corresponding to 14 h on 10 h off. Phytotoxicity results are measured visually. The experimental solutions are applied by means of a hand sprayer until the leaves are visually covered with solution. Water is tap water and is used without purification.

Examples 73-74 Dilution of SPE2 Master Batches

Water is added to a beaker. Aliquots of a 30 wt % dispersion of SPE2 are added to the water with stirring at rt to provide dispersion of 10% and 1% SPE. The resulting dispersions are poured into glass bottles and capped to be used throughout the phytotoxicity studies.

Dilution of SPE2 Master Batches

| Ex # | Water (ml) | SPE2 30 wt % (ml) | Final Concentration |
|---|---|---|---|
| 73 | 200 | 100 | 10% |
| 74 | 290 | 10 | 1% |

Each seedling is watered every other day at the soil level. The seedlings in the experimental groups (non-control group) are treated with the solutions, via hand sprayer, of SPE2 (either from Ex 73 or Ex 74) at the outset of the experiment (day 0), and every five days thereafter. Results are measured on day 14 and day 30. The seedlings are grown for a total of 30 days, continuing as described with watering every other day and experimental solution application to the leaves every 5 days. No measured difference between the control (water only) and the experimental plants are expected to be noted during the experiment.

Spraying of Formulations onto Inert Surfaces and Contact Angle Measurements

The spray behavior of suspension concentrates and emulsions containing Sulfopolyesters was assessed in experiments. The amount of Sulfopolyester (SPE2), Tergitol XD and Foralyn 5020-F used in the example suspension concentrates tested are shown in Table 23 (wt %, as a percentage of the total formulation concentrate weight). In addition to the ingredients listed in Table 23, all formulations contained 40 wt % ziram, 6 wt % diethylene glycol, 0.5 wt % BC Antifoam FDK (Basildon Chemical Co., Ltd.), and 0.18 wt % Rhodopol 23 xanthan gum (Solvay SA), with the remainder being demineralized water (weight %, as a percentage of the total formulation concentrate weight).

TABLE 23

Surfactant Package Compositions for SC1-SC4

| Ex | Tergitol XD, % | SPE2, % | Foralyn 5020-F, % |
|---|---|---|---|
| SC1 | 5 | 0 | 0 |
| SC2 | 5 | 0 | 2 |
| SC3 | 0 | 5 | 0 |
| SC4 | 0 | 5 | 2 |

Determination of Percent Coverage

SC1-SC4 were diluted at 1% and 10% with demineralized water and sprayed onto Petri dishes using a spray cabinet. Formulations were applied using a Teejet XR 11003 nozzle with an air pressure of 3 bars. The treated Petri dishes were photographed after spraying, and percentage of the surface covered and number of droplets were counted. The data were statistically analyzed using Revolution Analytics R software version 3.5.2. In Table 24, the averages and standard deviations of the percent coverage and number of droplets are listed.

TABLE 24

Percent Coverage and Number of Droplets from Suspension Concentrate Spray Trials

| | | % Coverage | | Number of Droplets | |
|---|---|---|---|---|---|
| Ex | % Dilution | Average | Standard Deviation | Average | Standard Deviation |
| SC1 | 1 | 22.24 | 1.73 | 158 | 18 |
| SC2 | 1 | 18.98 | 1.79 | 122 | 20 |
| SC3 | 1 | 51.56 | 5.01 | 70 | 11 |
| SC4 | 1 | 60.84 | 4.02 | 41 | 16 |
| SC1 | 10 | 26.86 | 1.80 | 169 | 10 |
| SC2 | 10 | 25.51 | 1.01 | 131 | 15 |
| SC3 | 10 | 96.45 | 1.11 | 1 | 0 |
| SC4 | 10 | 97.76 | 0.67 | 1 | 0 |

Analysis of Variance and a post-hoc Tukey test indicated that the higher coverage with the Sulfopolyester formulations SC3 and SC4 compared to control formulations SC1 and SC2 was statistically significant, both at 1% and at 10% dilution. At 10% dilution, Sulfopolyester formulations SC3 and SC4 covered basically the entire Petri dish.

Figure 11:
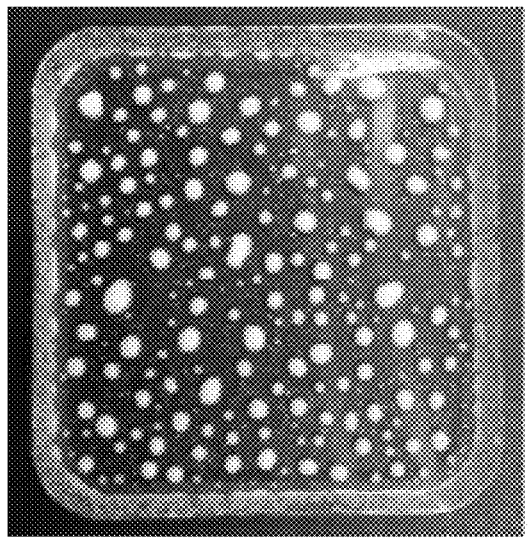
FIG. 11 shows photographs of petri dishes used to test for wt % Coverage for SC formulations at 1 wt % dilution for Ex SC1-SC4.
Figure 11:
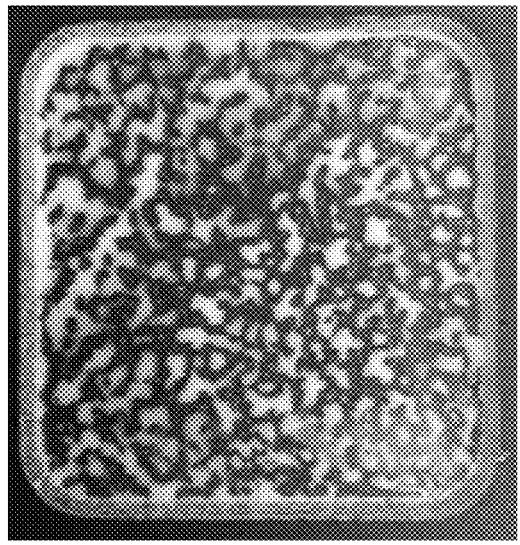
Figure 11:
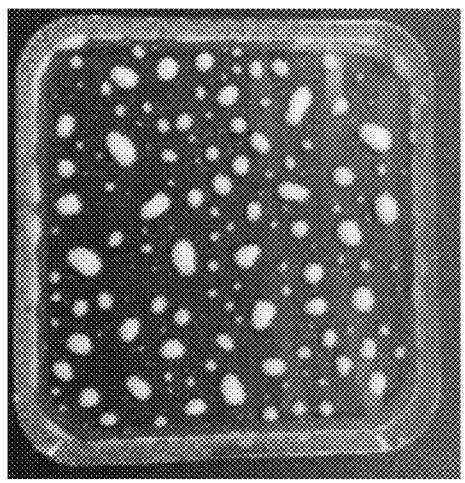
Figure 11:
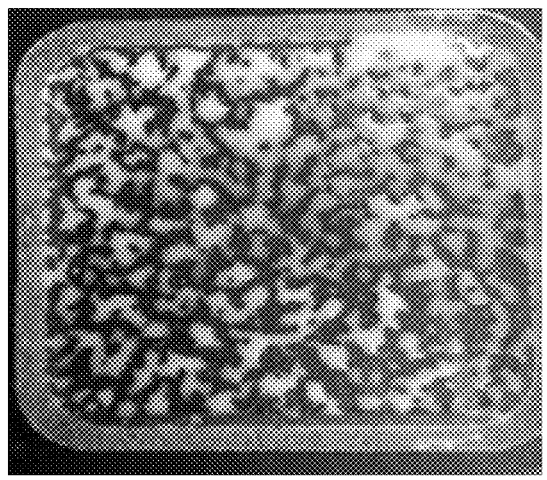
Figure 12:
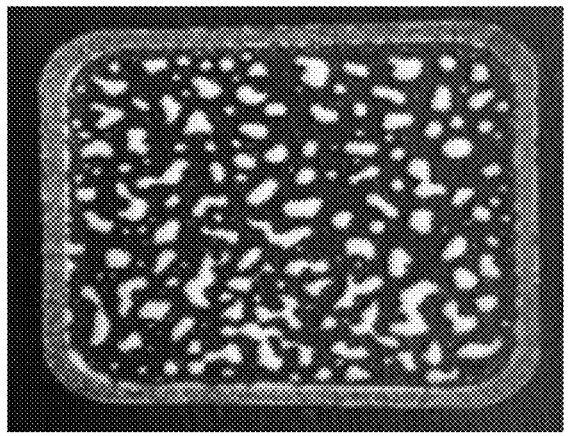
FIG. 12 shows photographs of petri dishes used to test for wt % Coverage for SC formulations at 10 wt % dilution for Ex SC1-SC4.
Figure 12:
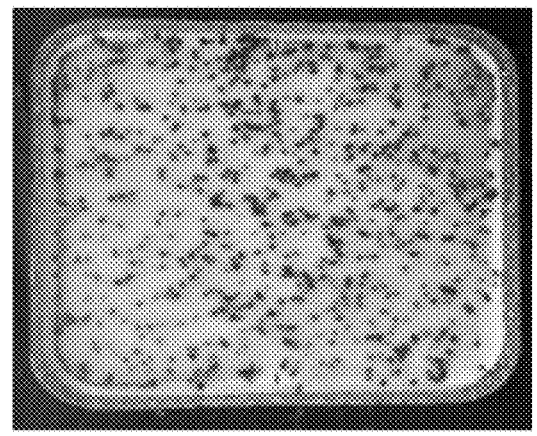
Figure 12:
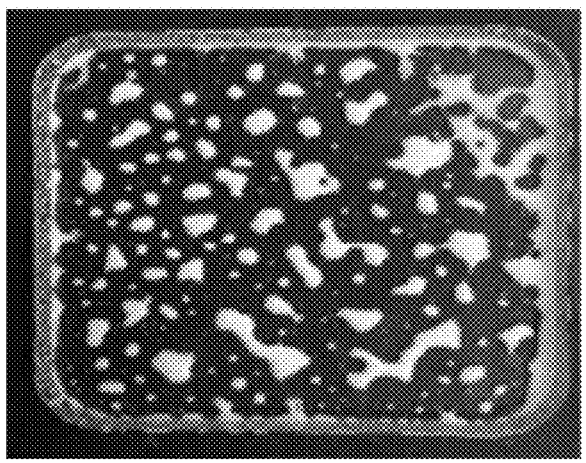
Figure 12:
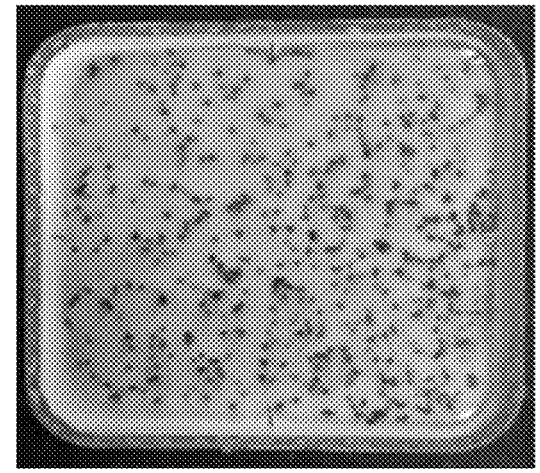

FIG. 11 shows photographs of the SC1, SC2, SC3, and SC4 formulations at 1% dilution, and FIG. 12 has photographs of the same formulations at 10% dilution.

The higher coverage obtained with the Sulfopolyester formulations was not predicted by contact angle measurements. These measurements were performed using a Kruss DSA 100 Drop Shape Analyzer, using the 10% dilutions of SC1, SC2, SC3, and SC4. A drop size of 2 μl was used with Parafilm as the substrate. Each sample was measured four times. The averages of the contact angle measurements are described in Table 25.

TABLE 25

Contact Angle Measurements of Suspension Concentrates, 10% Dilution

| Ex | Average Contact Angle, ° |
|---|---|
| SC1 | 73.57 |
| SC2 | 75.66 |
| SC3 | 99.03 |
| SC4 | 95.51 |

The use of SPE2 resulted in a higher contact angle, but significantly better coverage of a surface after spraying. The wetting results in the spray behavior experiment are clearly unexpected considering the contact angle measurements.

Tolerance of Emulsions and Suspension Concentrates Towards Hard Water

The tolerance of emulsions in water and suspension concentrates towards hard water was assessed using standard test methods published by the Collaborative International Pesticides Analytical Council (CIPAC). Waters used for the testing contained calcium and magnesium ions and were prepared in accordance with CIPAC Method MT 18. CIPAC Standard Waters D (342 ppm hardness, MT 18.1.4) and C (500 ppm hardness, MT 18.1.3) were prepared. Also prepared were custom waters with 1000 ppm and 2000 ppm hardness, according to CIPAC Method MT 18.4.3. Testing with these waters was compared to demineralized water, 0 ppm hardness. Although there is not a rigorous standard for tolerance to hard water, maintaining performance up to 342 ppm is generally considered as a requirement for agricultural chemicals in regions with hard water, and maintenance of performance up to 500 ppm is considered desirable.

Emulsions in water were prepared using the 0, 342, 500, 1000, and 2000 ppm waters described above. The emulsions were formulated with 65% of an oil, either Methylated Seed Oil or Petronas White Oil, commonly used in agricultural chemicals. Formulations contained 1 wt % of Sulfopolyester SPE2 introduced as a 30 wt % dispersion in water, 2 wt % Foralyn 5020-F, and 0.2 wt % BC Antifoam FDK (Basildon Chemical Co., Ltd.). The standard water was placed in a beaker and heated to 80° C. with stirring. Solid pellets of Sulfopolyester SPE2 were added and the suspension was stirred at 80° C. until the pellets were completely dispersed. Following complete dispersion of the sulfopolyester, BC Antifoam FDK was added to the beaker containing sulfopolyester under high shear. Following the addition of the antifoam, the oil phase (at room temperature) was added to the aqueous layer over approximately 1 min at 80° C. The resulting mixture was stirred under high shear for 10 min. Foralyn 5020-F was added at 80° C. while stirring under high shear. Following the addition of the Foralyn, the mixture was cooled to room temperature over 25 min while continuing to stir under high shear to afford a milky white emulsion.

All emulsions containing 65% Methylated Seed Oil were homogeneous when produced. The emulsion prepared with 2000 ppm hard water and 65 wt % methylated seed oil began to separate after 30 min and had completely separated after 2 h. Attempts to produce a uniform emulsion with 65% Petronas White Oil containing 2000 ppm water failed. All other emulsions produced with water of lower hardness, up to 1000 ppm, were homogeneous using both oils.

The first test was a visual comparison of the concentrated emulsions as produced, after aging up to 14 days at rt and at 54° C. as described in CIPAC Method 46.1.3, "Accelerated Storage Procedure Emulsion Concentrates". The emulsions produced as described above were transferred to a glass jar and capped for the aging testing. Samples were observed for any free oil separating at the top of the jar, and for separation of a less concentrated, more clear layer at the bottom of the jar.

The rt aging results are described in Table 26.

TABLE 26

Room Temperature Aging of Concentrated Oil Emulsions

| Sample | Water Hardness (ppm) | Initial | 4 Hours | 7 Days | 14 Days |
|---|---|---|---|---|---|
| Methylated Seed Oil | 0 | Homogeneous | Homogeneous | 4% bottom layer | 4% bottom layer |
| | 342 | Homogeneous | Homogeneous | 4% bottom layer | 5% bottom layer |
| | 500 | Homogeneous | Homogeneous | 4% bottom layer | 5% bottom layer |
| | 1000 | Homogeneous | Homogeneous | 4% bottom layer | 5% bottom layer |
| Petronas White Oil | 0 | Homogeneous | Homogeneous | 5% bottom layer | 6% bottom layer |
| | 342 | Homogeneous | Homogeneous | 5% bottom layer | 6% bottom layer |
| | 500 | Homogeneous | Homogeneous | 5% bottom layer | 6% bottom layer |
| | 1000 | Homogeneous | Homogeneous | 5% bottom layer | 7% bottom layer |

No oil separation was observed in the room temperature aging. All aged samples could be readily re-emulsified with minimal agitation, no more than five inversions without swirling or shaking.

The aging results at 54° C. are described in Table 27.

TABLE 27

54° C. Aging of Concentrated Oil Emulsions

| Sample | Water Hardness (ppm) | Initial | 7 Days | 14 Days |
|---|---|---|---|---|
| Methylated Seed Oil | 0 | Homogeneous | 6% bottom layer, no free oil | 4% bottom layer, minimal free oil |
| | 342 | Homogeneous | 7% bottom layer, minimal free oil | 5% bottom layer, <1% free oil |
| | 500 | Homogeneous | 6% bottom layer, minimal free oil | 5% bottom layer, <1% free oil |
| | 1000 | Homogeneous | 7% bottom layer, <1% free oil ring | 5% bottom layer, 1% free oil ring |
| Petronas White Oil | 0 | Homogeneous | 7% bottom layer, no free oil | 7% bottom layer, no free oil |
| | 342 | Homogeneous | 7% bottom layer, minimal free oil | 7% bottom layer, minimal free oil |
| | 500 | Homogeneous | 7% bottom layer, minimal free oil | 7% bottom layer, minimal free oil |
| | 1000 | Homogeneous | 8% bottom layer, minimal free oil | 8% bottom layer, minimal free oil |

All aged samples could be readily re-emulsified with minimal agitation, no more than five inversions without swirling or shaking.

In addition to the visual evaluation, the quality of emulsions was assessed using CIPAC Method MT 36, "Emulsion Characteristics of Emulsifiable Concentrates", part 36.1, "Five percent v/v oil phase". Each emulsion described above, maintained at 30° C., was diluted at 5% concentration into a 100 ml stoppered graduated cylinder containing the corresponding standard water with which it was produced, also at 30° C. The cylinder was stoppered and inverted once, and after 30 sec standing an assessment of whether the mixture had emulsified spontaneously into a uniform diluted emulsion was made. The initial emulsion quality results are described in Table 28. The cylinder was then inverted ten times, and the diluted emulsions were maintained at 30° C. for 24 h. The volume of free oil and cream were recorded 30 min, 2 h, and 24 h after the series of inversions. The results of the evaluation of the emulsion stability at various times up to 24 h at 30° C. following the inversions are shown in Table 29. No free oil was observed during the 24 h test period, except for the Methylated Seed Oil at 2000 ppm water hardness. The bottom portion of each emulsion became less turbid over the test period, but there was no clear separation between the oil and aqueous phases. At 1000 ppm and less, relative insensitivity to water hardness was demonstrated.

At the end of the 24 h period, the graduated cylinder was inverted ten times. The cylinder was allowed to stand for 30 sec, after which an assessment of whether the mixture had re-emulsified into a uniform diluted emulsion was made. The volume of free oil and cream were recorded at that time and at 30 min after the second series of inversions. Results for the re-emulsification of the emulsions following the inversions of the samples after aging for 24 h are shown in Table 30. All emulsions were homogeneous 30 sec after the re-emulsification. The Methylated Seed Oil emulsions produced and tested with demineralized and 1000 ppm water remained homogeneous after 30 min. The bottom portion of the other emulsions became less turbid after the 30 min, but there was no clear separation between the oil and aqueous phases.

TABLE 28

Emulsion Quality According to CIPAC MT 36.1, 30 Seconds after Initial Inversion

| Sample | Water Hardness (ppm) | Spontaneity of Emulsification |
|---|---|---|
| Methylated Seed Oil | 0 | Good |
| | 342 | Good |
| | 500 | Good |
| | 1000 | Good |
| | 2000 | Good |
| Petronas White Oil | 0 | Good |
| | 342 | Good |
| | 500 | Good |
| | 1000 | Good |

TABLE 29

Emulsion Quality, CIPAC MT 36.1, of Aged Emulsions

| Sample | Water Hardness, ppm | Top Cream Layer, ml | | |
|---|---|---|---|---|
| | | 30 Min | 2 h | 24 h |
| Methylated Seed Oil | 0 | 2 | 3 | 6 |
| | 342 | 2 | 4 | 6 |
| | 500 | 2 | 4 | 5 |
| | 1000 | 2 | 4.5 | 5.5 |
| | 2000 | 5 | | Separated |
| Petronas White Oil | 0 | 5 | 7 | 7 |
| | 342 | 3 | 5 | 6 |
| | 500 | 3 | 5 | 5 |
| | 1000 | 4 | 7 | 7 |

TABLE 30

Re-emulsification of Aged Emulsions, CIPAC Method 36.1

| Sample | Water Hardness (ppm) | Top Cream Layer (ml) | | Free Oil (ml) | |
|---|---|---|---|---|---|
| | | 30 Sec | 30 Min | 30 Sec | 30 Min |
| Methylated Seed Oil | 0 | <1 | 1.5 | None | None |
| | 342 | <1 | 2 | None | <1 |
| | 500 | <1 | 2 | None | <1 |
| | 1000 | <1 | 3 | None | <1 |
| Petronas White Oil | 0 | <1 | 5 | None | <1 |
| | 342 | <1 | 3 | None | <1 |
| | 500 | <1 | 3.5 | None | <1 |
| | 1000 | <1 | 3 | None | <1 |

Two suspension concentrates were formulated containing 40wtw % Ziram, 5 wt % of Sulfopolyester SPE2, either 0 or 2 wt % Foralyn 5020-F, 6t % diethylene glycol, 0.5 wt % BC Antifoam FDK (Basildon Chemical Co., Ltd.), 0.18 wt % Rhodopol 23 xanthan gum (Solvay SA), and the remainder demineralized water. In the first, water, diethylene glycol, SPE2 (as a 30 wt % dispersion in water), and BC antifoam FDK were added to a beaker at room temperature with mechanical stirring. Rhodopol 23 was added slowly with intense mechanical stirring. Following addition of the Rhodopol 23, high shear mixing was applied. Ziram Phyto was added slowly while stirring mechanically. During the addition of the Ziram to the formulation a paste formed that required high shear mixing to resolve. Following the addition of the Ziram, the mixture was stirred at 10000 rpm for 10 min to provide the suspension concentrate as a milky white suspension. The second suspension concentrate was prepared in a similar manner, except that Foralyn 5020-F was added after the Rhodopol 23 and prior to the high shear mixing.

The tolerance of these suspension concentrates towards hard water was measured according to CIPAC Method MT 160, "Spontaneity of Dispersion of Suspension Concentrates". Waters used for the testing were 0, 342, 500, 1000, and 2000 ppm hardness prepared in accordance with CIPAC Method MT 18, as described under the emulsions. The standard waters and suspension concentrates were equilibrated at rt. The density of the suspension concentrates was determined and the mass equal to a volume of 12.5 ml was calculated. A stoppered graduated cylinder was placed on a top loading balance and 237.5 ml of the standard water was added. The suspension concentrate was added, the stopper was closed and the cylinder with the diluted suspension was inverted once. The cylinder was allowed to stand undisturbed for 5 min and the top 225 ml of the diluted suspension was removed with a suction tube connected to a pump. The solids content was measured on the remaining 25 ml, and on the suspension concentrate. Spontaneity of Dispersion was calculated using the formula:

Spontaneity of Dispersion (%)=111$(c-Q)/c$ where Q=the mass of the 25 ml sample remaining in the cylinder, c=(wa)/100, a=percentage by mass of the formulation, and w=the mass of formulation added to the cylinder. Each measurement was performed in duplicate. The averages from the duplicate runs are shown in Table 31.

TABLE 31

Spontaneity of Dispersion of Suspension Concentrates, CIPAC Method MT 160

| Water Hardness | Spontaneity of Dispersion (%) | |
| --- | --- | --- |
| (ppm) | SPE 2, No Foralyn | SPE 2, with 2% Foralyn |
| 0 | 100 | 94 |
| 342 | 99 | 94 |
| 500 | 95 | 95 |
| 1000 | 94 | 95 |
| 2000 | Not tested | <87%; dispersion not homogeneous |

Once again, Sulfopolyester SPE2 enabled suspension concentrates to be relatively insensitive to hard water at 1000 ppm and less.

Concentrated Terpenoid Phenol Emulsions

Concentrated emulsions of the terpenoid phenols carvacrol (CAS Registry #499-75-2) and thymol (CAS Registry #89-83-8) were prepared in water. The emulsions were formulated with 30 wt %, 47.5 wt %, and 65 wt % of each oil, respectively. All formulations contained 1 wt % emulsifier, either SPE2, Soprophor FL/60, or Tergitol XD. Each emulsion contained 0.2 wt % BC Antifoam FDK. Two carvacrol emulsions also contained 2 wt % Foralyn 5020-F. The remainder of the emulsion was CIPAC standard water C, 500 ppm hardness, to reach 100 wt %. The carvacrol emulsions are described in Table 32, and the thymol emulsions in Table 33.

TABLE 32

Carvacrol Emulsions, 1 wt % Emulsifier

| Sample # | Emulsifier | Carvacrol (wt %) | Foralyn 5020-F (wt %) |
| --- | --- | --- | --- |
| CE1 | SPE2 | 30 | 0 |
| CE2 | SPE2 | 47.5 | 0 |
| CE3 | SPE2 | 65 | 0 |
| CE4 | SPE2 | 65 | 2 |
| CE5 | Soprophor FL/60 | 30 | 0 |
| CE6 | Soprophor FL/60 | 47.5 | 0 |
| CE7 | Soprophor FL/60 | 65 | 0 |
| CE8 | Soprophor FL/60 | 65 | 2 |

TABLE 33

Thymol Emulsions, 1 wt % Emulsifier

| Sample # | Emulsifier | Thymol (wt %) |
| --- | --- | --- |
| TE1 | SPE2 | 30 |
| TE2 | SPE2 | 47.5 |
| TE3 | SPE2 | 65 |
| TE4 | Soprophor FL/60 | 30 |
| TE5 | Soprophor FL/60 | 47.5 |
| TE6 | Tergitol XD | 65 |

All emulsions were evaluated visually immediately after being formed. The samples were divided and the resulting two samples were stored at room temperature and 54° C., respectively, for 14 days and evaluated as described in CIPAC Method 46.1.3, "Accelerated Storage Procedure Emulsion Concentrates". Each emulsion was transferred to a glass jar and capped for the aging testing. Samples were observed for any free oil separating at the top of the jar, and for separation of a less concentrated, more clear layer at the bottom of the jar. After the aging period, each emulsion was assessed for re-emulsifiability with minimal agitation, by inverting the emulsion no more than five times without swirling or shaking and assessing separation after 30 min.

The rt aging results for the carvacrol emulsions are described in Table 34, and for the thymol emulsions in Table 35. The 54° C. aging results for the carvacrol emulsions are described in Table 36, and for the thymol emulsions in Table 37.

TABLE 34

Room Temperature Aging of Concentrated Carvacrol Emulsions

| Sample | Initial | 14 days | Re-emulsifiability |
| --- | --- | --- | --- |
| CE1 | Homogeneous | Separated | Not homogeneous |
| CE2 | Homogeneous | Separated | Homogeneous |
| CE3 | Homogeneous | 5% bottom layer | Homogeneous |
| CE4 | Homogeneous | 3% bottom layer, oil droplets visible | Homogeneous |
| CE5 | Homogeneous | Separated | Homogeneous |
| CE6 | Homogeneous | Separated | Not homogeneous |
| CE7 | Homogeneous | Separated | Not homogeneous |
| CE8 | Homogeneous | Separated | Not homogeneous |

TABLE 35

Room Temperature Aging of Concentrated Thymol Emulsions

| Sample | Initial | 14 days | Re-emulsifiability |
|---|---|---|---|
| TE1 | Not homogeneous | Separated | Not homogeneous |
| TE2 | Homogeneous | Separated | Homogeneous |
| TE3 | Homogeneous | 18% bottom layer, oil droplets visible | Homogeneous |
| TE4 | Homogeneous | Separated | Homogeneous |
| TE5 | Homogeneous | Separated | Not homogeneous |
| TE6 | Not homogeneous | Separated | Not homogeneous |

TABLE 36

54° C. Aging of Concentrated Carvacrol Emulsions

| Sample | Initial | 14 days | Re-emulsifiability |
|---|---|---|---|
| CE1 | Homogeneous | Separated | Not homogeneous |
| CE2 | Homogeneous | Separated | Homogeneous |
| CE3 | Homogeneous | 4% top layer, 20% bottom layer | Homogeneous |
| CE4 | Homogeneous | 12% top layer, 16% bottom layer, oil droplets visible | Homogeneous |
| CE5 | Homogeneous | Separated | Homogeneous |
| CE6 | Homogeneous | Separated | Not homogeneous |
| CE7 | Homogeneous | Separated | Not homogeneous |
| CE8 | Homogeneous | Separated | Not homogeneous |

TABLE 37

54° C. Aging of Concentrated Thymol Emulsions

| Sample | Initial | 14 days | Re-emulsifiability |
|---|---|---|---|
| TE1 | Not homogeneous | Separated | Not homogeneous |
| TE2 | Homogeneous | Separated | Homogeneous |
| TE3 | Homogeneous | Separated | Not homogeneous |
| TE4 | Homogeneous | Separated | Homogeneous |
| TE5 | Homogeneous | Separated | Not homogeneous |
| TE6 | Not homogeneous | Separated | Not homogeneous |

Two experimental suspension concentrates were formulated, with 40 wt % Ziram, 2.5 wt % of Sulfopolyester SPE2, either 0 or 2 wt % Foralyn 5020-F, 6 wt % diethylene glycol, 0.5 wt % BC Antifoam FDK (Basildon Chemical Co., Ltd.), 0.2 wt % Rhodopol 23 xanthan gum (Solvay SA), and the remainder CIPAC Standard Water C (500 ppm hardness, prepared according to CIPAC MT 18.1.3). In the first, water, diethylene glycol, SPE2 (as a 30% dispersion in CIPAC Standard Water C), and BC antifoam FDK were added to a beaker at rt with mechanical stirring. Rhodopol 23 was added slowly with intense mechanical stirring. Following addition of the Rhodopol 23, high shear mixing was applied (approximately 4 min at 3500 rpm using a general purpose disintegrating head). Ziram Phyto was added slowly while stirring mechanically. During the addition of the Ziram to the formulation a paste formed that required high shear mixing to resuspend (approximately 4 min at 3500 rpm using a general purpose disintegrating head) to provide a milky white suspension concentrate. The second suspension concentrate was prepared in a similar manner, except that Foralyn 5020-F was added after the Rhodopol 23 and prior to the high shear mixing. A third control suspension concentrate was prepared using the same procedure and ingredients as the first, except that 2.5% Tergitol XD (Dow Chemical Company) was added instead of Sulfopolyester SPE2.

A visual comparison of the suspension concentrates as produced, and after aging for 14 days at 54° C. as described in CIPAC Method 46.1.3, "Accelerated Storage Procedure Emulsion Concentrates," was performed. The suspension concentrates produced as described above were transferred to a glass jar and capped for the aging. After 14 days the samples were inverted once; no caking or sedimentation was observed. The samples were inverted a total of ten times and were observed for any free oil separating at the top of the jar, compaction and sedimentation, and for formation of any small lumps or clots. The results are shown in Table 38.

TABLE 38

Appearance of Ziram Suspension Concentrates as Produced and after Aging at 54° C.

| Sample | As Produced Visual | After 14 Days at 54° C. | | | |
|---|---|---|---|---|---|
| | | Compaction | Sedimentation | Clot Formation | % Top Layer |
| SPE2 | Homogeneous | No | No | No | 5% |
| SPE2/Foralyn | Homogeneous | No | No | Yes | 5% |
| Tergitol XD | Homogeneous | No | No | No | 4% |

Another measure of stability employed was CIPAC Method MT 161, "Suspensibility of Aqueous Suspension Concentrates". CIPAC Standard Water C (500 ppm hardness, prepared according to CIPAC MT 18.1.3) was used for the testing. The standard water, suspension concentrates, and a 250 ml graduated cylinder fitted with a stopper were equilibrated at rt. Into the graduated cylinder was placed 100 ml of the standard water. The density of the suspension concentrates was determined, and the mass equal to a volume of 12.5 ml was calculated and weighed into a 50 ml beaker. The contents of the beaker were transferred into the graduated cylinder, quantitatively using the standard water, and more standard water was added to the cylinder to make a total of 250 ml. The graduated cylinder with the diluted suspension was stoppered and inverted 30 times. The cylinder was allowed to stand undisturbed for 30 min and the top 225 ml of the diluted suspension was removed with a suction tube connected to a pump. The solids content was measured on the remaining 25 ml, and on the suspension concentrate. Suspensibility was calculated using the formula:

$$\text{Suspensibility (\%)} = 111(c-Q)/c$$

where Q=the mass of the 25 ml sample remaining in the cylinder, c=(wa)/100, a=percentage by mass of the formulation, and w=the mass of formulation added to the cylinder. Each measurement was performed in duplicate. Samples were tested as produced and after 14 days aging at 54° C. as described in CIPAC Method 46.1.3. The averages from the duplicate runs are shown in Table 39. Suspensibility of formulations produced with the Sulfopolyester, both as produced and after aging, was well in excess of the 80% considered desirable in this test.

TABLE 39

Suspensibility of Ziram Suspension Concentrates, CIPAC Method MT 161

| Sample | Suspensibility, % | |
|---|---|---|
| | As Produced | After 14 Days at 54° C. |
| SPE2 | 97.4 | 97.6 |
| SPE2/Foralyn | 98.7 | 96.3 |
| Tergitol XD | 97.0 | 95.1 |

Active ingredients in agricultural suspension concentrates are typically provided at a low particle size, in order to maximize pesticidal efficiency and to prevent application problems such as nozzle blockage. It can be challenging though to prevent agglomeration of the suspension concentrate particles upon storage. Combinations of surfactants are often required to prevent sedimentation, flocculation, and crystal growth.

The particle sizes of these suspension concentrates were measured before and after aging for 14 days at 54° C. using a Mastersizer 2000 laser diffraction particle size analyzer (Malvern Panalytical), equipped with a Hydro 2000G measuring cell. One gram of the suspension concentrate was added to 10 ml of a 1% by weight solution of Tamol DN in demineralized water and the mixture was agitated with a pipette until homogeneous. This sample is then added to the mixing tank of the Hydro 2000G sampler. The amount of suspension concentrate is automatically determined by the Mastersizer 2000 by measuring the obscuration while slowly adding the sample. Once the obscuration is between pre-set limits, a sufficient amount of sample has been added and the measurement can take place (all automatically performed by the software) Particle sizes are described by three measures: d10 is the particle size at which 90% of the particles are larger and 10% are smaller, d90 is the particle size at which 10% of the particles are larger and 90% smaller, and d50 is the particle size with equal numbers of larger and smaller particles. These particle sizes for the two experimental suspension concentrates and the control suspension concentrate are shown in Table 40.

TABLE 40

Particle Sizes of Initial Ziram Suspension Concentrates and after Aging at 54° C.

| | Particle Size Distribution, microns | | | | | | | | |
|---|---|---|---|---|---|---|---|---|---|
| | d10 | | | d50 | | | d90 | | |
| Sample | Initial | Aged | % Change | Initial | Aged | % Change | Initial | Aged | % Change |
| SPE2 | 1.310 | 1.326 | 1.2 | 3.054 | 2.880 | −5.7 | 7.317 | 6.536 | −10.7 |
| SPE2/Foralyn | 1.332 | 1.330 | −0.2 | 2.931 | 2.794 | −4.7 | 6.791 | 6.266 | −7.7 |
| Tergitol XD | 1.294 | 1.410 | 9.0 | 3.007 | 3.234 | 7.5 | 7.173 | 7.636 | 6.5 |

Little to no increase in particle size was observed for suspension concentrates formulated with the Sulfopolyester, in contrast to the control dispersant.

The particle sizes of these suspension concentrates were also measured after aging for 14 days at 54° C., followed by standing at rt for an additional 64 days. The suspension concentrates were shaken 30 times by hand to completely redisperse the solid particles. One gram of the suspension concentrate was added to 10 ml of demineralized water and the mixture was agitated with a pipette until homogeneous. Other aspects of the particle size measurement were performed as previously described. The particle sizes for the two experimental suspension concentrates and the control suspension concentrate are shown in Table 41.

TABLE 41

Particle Sizes of Initial Ziram Suspension Concentrates and after 14 Days Aging at 54° C. Followed by 64 Days at rt

| | Particle Size Distribution, microns | | | | | | | | |
|---|---|---|---|---|---|---|---|---|---|
| | d10 | | | d50 | | | d90 | | |
| Sample | Initial | Aged | % Change | Initial | Aged | % Change | Initial | Aged | % Change |
| SPE2 | 1.310 | 1.310 | 0 | 3.054 | 3.043 | −0.4 | 7.317 | 7.278 | −0.5 |
| SPE2/Foralyn | 1.332 | 1.368 | 2.7 | 2.931 | 3.892 | 32.8 | 6.791 | 15.87 | 133.8 |
| Tergitol XD | 1.294 | 1.393 | 7.7 | 3.007 | 3.191 | 6.1 | 7.173 | 7.552 | 5.3 |

It is desirable for the viscosity of suspension concentrates to remain stable through the lifetime of the product. A Brookfield DVII+Pro Viscometer was used to measure viscosity at 20° C. of the as produced suspension concentrates, and after aging for 14 days at 54° C. A ULA-DIN-86 spindle was used at a shear rate of 150 rpm, with the viscosity measured after 1 min. The viscosities are shown in Table 42.

TABLE 42

Viscosities of Ziram Suspension Concentrates as Produced and after Aging at 54° C.

| | Brookfield Viscosity, mPa · sec | |
|---|---|---|
| Sample | As Produced | After 14 Days at 54° C. |
| SPE2 | 84.6 | 61.1 |
| SPE2/Foralyn | 197 | 170 |
| Tergitol X | 69 | 46.5 |

Stable viscosities were obtained with the Sulfopolyester. Foralyn increases the suspension concentrate viscosity but does not lead to an increase in the viscosity after aging.

(XIII) CLOSING PARAGRAPHS

As will be understood by one of ordinary skill in the art, each embodiment disclosed herein can comprise, consist essentially of or consist of its particular stated element, step, ingredient or component. Thus, the terms "include" or "including" should be interpreted to recite: "comprise, consist of, or consist essentially of." The transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment. A material effect, in this context, is a statistically significant alteration in at least one adjuvant characteristic of an agrochemical formulation. For instance, a material effect may be anything that would significantly alter the ability to form an agrochemical formulation as described herein, and/or that would significantly alter a functionality of that formulation.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles and other written text throughout this specification (referenced materials herein). Each of the referenced materials is individually incorporated herein by reference in its entirety for the referenced teaching, to the extent it does not contradict any specific teachings provided herein.

It is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Definitions and explanations used in the present disclosure are meant and intended to be controlling in any future construction unless clearly and unambiguously modified in the example(s) or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

What is claimed:

1. An agrochemical formulation, comprising:
at least one agrochemical active ingredient, and a sulfopolymer that has not been lyophilized; wherein the sulfopolymer is a sulfopolyester that includes 4 to 40% mole % based on the total repeating units of sulfoisophthalic moieties; and wherein the agrochemical active ingredient or a mixture of two or more agrochemical active ingredients are in the range of 5 wt % to 90 wt % of the agrochemical formulation, and wherein the sulfopolyester that has not been lyophilized is present in an amount up to 15 wt %, relative to the total weight of the formulation.

2. The agrochemical formulation of claim 1, which is an agrochemical concentrate formulation comprising the at least one agrochemical active ingredient at a level at least twice as high as its as-applied level.

3. The formulation of claim 1, wherein the active ingredient comprises one or more of a fertilizer, a hormone or other plant growth regulator, an insecticide, a larvicide, a miticide, an herbicide, a fungicide, a nematicide, an acaricide, a molluscicide, a miticide, a larvicide, a fertilizer, and/or a hormone or other growth regulator.

4. The formulation of claim 1, wherein the formulation, composition, or mixture further comprises a rosin.

5. The formulation of claim 4, wherein the rosin comprises a rosin ester.

6. An as-applied agrochemical composition comprising the formulation of claim 1, diluted in water.

7. The as-applied agrochemical composition of claim 6, wherein the water has a total water hardness of from 0 to 1500 ppm.

8. The as-applied agrochemical composition of claim 6, comprising: at least 0.001 wt % concentrate formulation, relative to the total weight of the composition.

9. The as-applied agrochemical formulation of claim 6 comprising:
0.05 wt % to 20 wt % agrochemical active ingredient or a mixture of two or more agrochemical active ingredients, and
up to 5 wt % of a sulfopolymer that has not been lyophilized, relative to the total weight of the formulation.

* * * * *